(12) United States Patent
Tanaka

(10) Patent No.: US 6,245,472 B1
(45) Date of Patent: *Jun. 12, 2001

(54) PHTHALOCYANINE COMPOUNDS, PROCESS FOR PRODUCTION THEREOF AND ELECTROPHOTOGRAPHIC PHOTOSENSITIVE MEMBER USING THE COMPOUNDS

(75) Inventor: Masato Tanaka, Shizuoka-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 13 days.

(21) Appl. No.: 09/150,836

(22) Filed: Sep. 10, 1998

(30) Foreign Application Priority Data

Sep. 12, 1997 (JP) .................................... 9-248694

(51) Int. Cl.$^7$ ....................................... G03G 5/06
(52) U.S. Cl. ............................. 430/78; 430/59.4
(58) Field of Search .............. 430/59.4, 78, 83, 430/96

(56) References Cited

U.S. PATENT DOCUMENTS

| | | | |
|---|---|---|---|
| 5,302,710 | 4/1994 | Nukuda et al | 540/140 |
| 5,663,327 | 9/1997 | Tambo et al. | 540/139 |
| 5,876,887 | * 3/1999 | Nakamura et al. | 430/59.4 |

FOREIGN PATENT DOCUMENTS

| | | |
|---|---|---|
| 33 32 005 | 3/1984 | (DE) . |
| 34 11 070 | 10/1984 | (DE) . |
| 0 584 754 | 3/1994 | (EP) . |
| 2 255 569 | 11/1992 | (GB) . |
| 50-38543 | 4/1975 | (JP) . |
| 51-108847 | 9/1976 | (JP) . |
| 57-14875 | 9/1982 | (JP) . |
| 60-59354 | 4/1985 | (JP) . |
| 61-217050 | 9/1986 | (JP) . |
| 61-239248 | 10/1986 | (JP) . |
| 62-67094 | 3/1987 | (JP) . |
| 1-17066 | 1/1989 | (JP) . |
| 3-128973 | 5/1991 | (JP) . |
| 5-98181 | 4/1993 | (JP) . |
| 5-194523 | 8/1993 | (JP) . |
| 5-263007 | 10/1993 | (JP) . |
| 8-100134 | 4/1996 | (JP) . |

OTHER PUBLICATIONS

Database WPI, Sec. Ch., Wk. 1985 25, Derwent, XP–002142313, AN 1985–119271.
Patent Abstrs. of Japan, vol. 013, No. 536 (C–660), Nov. 1989.
Database WPI, Sec. Ch., Wk. 1982 42, AN 1982–89429E, Derwent XP–002142307.
Chem. Abstr., vol. 119, No. 14, Oct. 1993, Abst. No. 141192 (b), XP–002142312.

* cited by examiner

Primary Examiner—John Goodrow
(74) Attorney, Agent, or Firm—Fitzpatrick, Cella, Harper & Scinto

(57) ABSTRACT

Iodogallium phthalocyanine and bromogallium phthalocyanine having novel crystalline forms characterized by X-ray diffraction patterns according to CuKα characteristic X-ray diffraction method and exhibiting excellent zirconium phthalocyanine can be obtained through appropriate selection of a reaction solvent, followed by milling or stirring in an appropriate solvent. For example, α-chloronaphthalene is a suitable solvent for reaction between phthalonitrile and gallium triiodide or tribromide to provide iodogallium phthalocyanine or bromogallium phthalocyanine. Reaction of chlorogallium phthalocyanine or hydroxygallium phthalocyanine with hydroiodic (or hydrobromic) acid is also effective for providing a novel crystal form of iodo- (or bromo-)gallium phthalocyanine. Zirconium phthalocyanine exhibiting good electrophotographic performances can be obtained through a similar process.

23 Claims, 77 Drawing Sheets

PHTHALOCYANINE COMPOUNDS, PROCESS FOR PRODUCTION THEREOF AND ELECTROPHOTOGRAPHIC PHOTOSENSITIVE MEMBER USING THE COMPOUNDS

FIELD OF THE INVENTION AND RELATED ART

The present invention relates to phthalocyanine compounds, more specifically iodogallium phthalocyanine compound, bromogallium phthalocyanine compound and zirconium phthalocyanine compound, having novel crystal forms. The present invention further relates to a process for producing the phthalocyanine compounds and an electrophotographic photosensitive member using the phthalocyanine compounds.

Hitherto, phthalocyanine pigments have been noted and studied not only as coloring agents but also as electronic materials for constituting electrophotographic photosensitive members, solar batteries, photosensors, etc.

On the other hand, non-impact type printers utilizing electrophotography have been widely used as terminal printers in recent years, in place of conventional impact type printers. These printers are principally constituted as laser beam printers using a laser as a light source. As the light source, a semiconductor laser has been predominantly used in view of its cost and apparatus size. A semiconductor laser principally used at present has an emission wavelength in a long wavelength region around 790 nm, so that electrophotographic photoconductors having a sufficient sensitivity to such a long-wavelength light have been developed.

The sensitivity region of an electrophotographic photoconductor principally varies depending on a charge-generating material, and many studies have been made on charge-generating materials having a sensitivity to a long-wavelength light including metallic phthalocyanines and non-metallic phthalocyanines, such as aluminum chlorophthalocyanine, chloroindium phthalocyanine, oxy-vanadium phthalocyanine, hydroxygallium phthalocyanine, chlorogallium phthalocyanine, magnesium phthalocyanine, and oxytitanium phthalocyanine.

Many of these phthalocyanine compounds are known to have various crystal forms. For example, non-metallic phthalocyanine is known to have α-form, β-form, γ-form, δ-form, ε-form, χ-form, τ-form, etc., and copper phthalocyanine is known to have α-form, β-form, γ-form, ε-form, χ-form, etc. Specific examples of these phthalocyanine compounds are disclosed in, e.g., Japanese Laid-Open Patent Application (JP-A) 50-38543, JP-A 51-108847, and JP-A 53-37423. Oxytitaniun phthalocyanines are reported in JP-A 61-217050, JP-A 61-239248, JP-A 62-67094, JP-A 64-17066 and JP-A 3-128973. Further, gallium phthalocyanines are disclosed in JP-A 5-98181 and JP-A 5-263007 with respect to chlorogallium phthalocyanine and hydroxygallium phthalocyanine together with their crystal forms. Further, iodogallium phthalocyanine is disclosed in JP-A 60-59354, and bromogallium phthalocyanine is disclosed in JP-A 57-148745 but with no specific disclosure regarding their crystal forms.

However, many electrophotographic photosensitive members using such known phthalocyanine compounds only show a low sensitivity and are liable to cause fluctuation in dark-part potential and light-part potential during repetitive use.

SUMMARY OF THE INVENTION

An object of the present invention is to provide phthalocyanine compounds having a novel crystal form, and a process producing the compounds.

Another object of the present invention is to provide an electrophotographic photosensitive member having a very high sensitivity to long-wavelength light and having excellent potential stability.

According to the present invention, there is provided iodogallium phthalocyanine having a crystal form selected from those characterized by X-ray diffraction patterns (a)–(e) shown below respectively obtained by a CuKα characteristic X-ray diffraction method:

(a) having a strongest peak at a Bragg angle ($2\theta \pm 0.2$ deg.) of 9.6 deg. and free from another peak having an intensity of 30% or more of that of the strongest peak, (b) having a strongest peak and a second strongest peak at Bragg angles ($2\theta \pm 0.2$ deg.) of 9.4 deg. and 27.1 deg. wherein the second strongest peak has an intensity of at least 30% of that of the strongest peak, (c) having a strongest peak and a second strongest peak at Bragg angles ($2\theta \pm 0.2$ deg.) of 7.5 deg. and 27.7 deg., (d) having a strongest peak and a second strongest peak at Bragg angles ($20\theta \pm 0.2$ deg.) of 7.5 deg. and 26.4 deg., and (e) having two peaks among a strongest peak, a second strongest peak and a third strongest peak at Bragg angles ($2\theta \pm 0.2$ deg.) of 8.8 deg. and 27.2 deg.

According to the present invention, there is also provided bromogallium phthalocyanine having a crystal form selected from those represented by X-ray diffraction patterns (f)–(j) shown below respectively obtained by a CuKα characteristic X-ray diffraction method:

(f) having a strongest peak at a Bragg angle ($2\theta \pm 0.2$ deg.) of 27.3 deg. and free from another peak having an intensity of 30% or more of that of the strongest peak, (g) having a strongest peak and a second strongest peak at Bragg angles ($2\theta \pm 0.2$ deg.) of 9.0 deg. and 27.1 deg., wherein the second strongest peak has an intensity of at least 30% of that of the strongest peak, (h) having a strongest peak and a second strongest peak at Bragg angles ($2\theta \pm 0.2$ deg.) of 7.4 deg. and 27.9 deg., (i) having a strongest peak and a second strongest peak at Bragg angles ($2\theta \pm 0.2$ deg.) of 7.5 deg. and 26.4 deg., and (j) having a strongest peak and a second strongest peak at Bragg angles ($2\theta \pm 0.2$ deg.) of 6.9 deg. and 26.7 deg.

Such iodo- (or bromo-)gallium phthalocyanine may effectively be produced through a process comprising: reacting chlorogallium phthalocyanine or hydroxygallium phthalocyanine with hydroiodic (or hydrobromic) acid under milling or stirring.

According to the present invention, there is further provided zirconium phthalocyanine having a crystal form represented by an X-ray diffraction pattern having a strongest peak at a Bragg angle ($2\theta \pm 0.2$ deg.) in a range of 7.0–9.0 deg. as measured by a CuKα characteristic X-ray diffraction method.

Such zirconium phthalocyanine may effectively be produced through a process comprising milling or stirring zirconium phthalocyanine in an organic solvent.

According to the present invention, there is also provided an electrophotographic photosensitive member, comprising a support, and a photosensitive layer formed on the support and containing one of the above-mentioned iodogallium phthalocyanine, bromogallium phthalocyanine and zirconium phthalocyanine.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
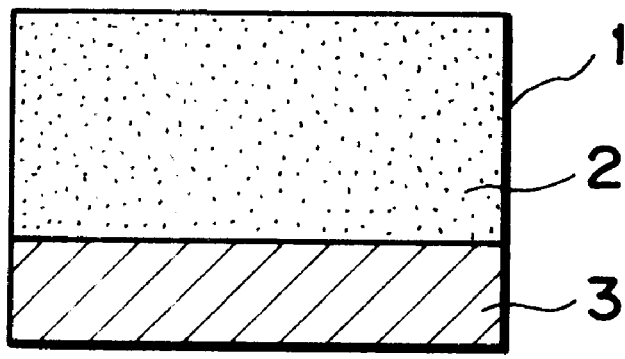
FIGS. 1 and 2 are sectional views each showing an example of laminar structure of an electrophotographic photosensitive member.

The iodogallium phthalocyanine according to the present invention has a crystal form selected from those characterized by X-ray diffraction patterns (a)–(e) shown below respectively obtained by a CuKα characteristic X-ray diffraction method:

(a) having a strongest peak at a Bragg angle (2θ±0.2 deg.) of 9.6 deg. and free from another peak having an intensity of 30% or more of that of the strongest peak, (b) having a strongest peak and a second strongest peak at Bragg angles (2θ±0.2 deg.) of 9.4 deg. and 27.1 deg. wherein the second strongest peak has an intensity of at least 30% of that of the strongest peak, (c) having a strongest peak and a second strongest peak at Bragg angles (2θ±0.2 deg.) of 7.5 deg. and 27.7 deg., (d) having a strongest peak and a second strongest peak at Bragg angles (2θ±0.2 deg.) of 7.5 deg. and 26.4 deg., and (e) having two peaks among a strongest peak, a second strongest peak and a third strongest peak at Bragg angles (2θ±0.2 deg.) of 8.8 deg. and 27.2 deg.

It is preferred that the diffraction pattern (b) further has strong peaks at Bragg angles (2θ±0.2 deg.) of 8.7 deg., 16.4 deg., 18.3 deg. and 27.2 deg.

It is preferred that the diffraction pattern (c) further has a strong peak at a Bragg angle (2θ±0.2 deg.) of 16.3 deg.

It is also preferred that the diffraction pattern (d) further has a strong peak at a Bragg angle (2θ±0.2 deg.) of 16.3 deg.

It is also preferred that the diffraction pattern (e) further has a strong peak at a Bragg angle (2θ±0.2 deg.) of 9.8 deg.

The iodogallium phthalocyanine according to the present invention has a structure represented by the following formula:

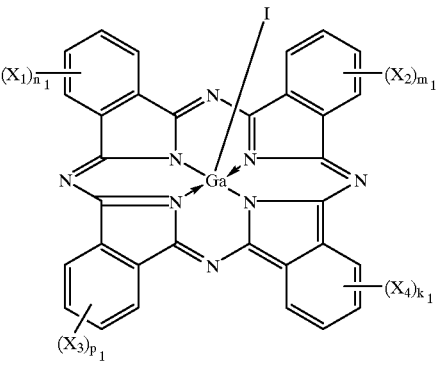

wherein $X_1$, $X_2$, $X_3$ and $X_4$ denote Cl or Br, $n_1$, $m_1$, p, and $k_1$ are respectively an integer of 0–4.

Iodogallium phthalocyanine may for example be formed by reacting phthalocyanine and gallium triiodide in α-chloronaphthalene solvent at 150–230° C. It has been also discovered that iodogallium phthalocyanine can be obtained by reacting chlorogallium phthalocyanine obtained through various process, e.g., one shown in JP-A 5-194523 or hydroxygallium phthalocyanine formed by hydrolyzing the chlorogallium phthalocyanine with hydroiodic acid under application of a shearing force, as by milling or stirring. This process is commercially desirable because inexpensive gallium chloride can be used instead of gallium iodide. The iodogallium phthalocyanine prepared according to the process is in an amorphous form.

More specifically, iodogallium phthalocyanine having a crystal form represented by a diffraction pattern (a) showing a strong peak at a Bragg angle (2θ±0.2 deg.) of 9.7 deg. (hereinafter, sometimes referred as "iodogallium phthalocyanine (a)") may be formed by reacting phthalonitrile and gallium triiodide in a reaction solvent of α-chloronaphthalene under stirring and heating at 150–230° C. It is possible to further subject the product iodogallium phthalocyanine to washing under heating dispersion within an amide solvent, such as N,N-dimethylformamide, or washing with an alcohol, such as ethanol. The crystal form is not changed by such washing.

Iodogallium phthalocyanine having a crystal form represented by a diffraction pattern (b) having strong peaks at Bragg angles (2θ±0.2 deg.) of 9.4 deg. and 27.1 deg. (hereinafter sometimes referred to as "iodogallium phthalocyanine (b)") may be obtained by subjecting iodogallium phthalocyanine (a) to dry milling exerting a relatively weak shearing force, as by a mortar.

Iodogallium phthalocyanine (b) may also be prepared by subjecting (i) amorphous iodogallium phthalocyanine prepared by milling or stirring chlorogallium phthalocyanine or hydroxygallium phthalocyanine together with hydroiodic acid, or (ii) iodogallium phthalocyanine (a), to dry milling exerting a relatively large shearing force, as by a sand mill or a paint shaker together with glass beads to obtain a crystal, and subjecting the crystal to milling in an appropriate solvent, examples of which may include: halogen-containing solvents, such as chloroform, chlorobenzene and dichlorobenzene; ketone solvents, such as cyclohexane, methyl ethyl ketone and acetone; nitrile solvents, such as acetonitrile and benzonitrile; ester solvents, such as ethyl acetate and butyl acetate; alcohol solvents, such as methanol, ethanol, propanol, ethylene glycol and polyethylene glycol, and ether solvents, such as tetrahydrofuran, 1,4-dioxane, propyl ether, and butyl ether. By milling or stirring iodogallium phthalocyanine in such a solvent, it is possible to obtain iodogallium phthalocyanine (b) in various crystallinities.

Iodogallium phthalocyanine having a crystal form represented by a diffracting pattern (c) showing strong peaks at Bragg angles (2θ±0.2 deg) of 7.5 deg and 27.7 deg. (hereinafter sometimes referred as "iodogallium phthalocyanine (c)") may be obtained by milling or stirring (i) a crystal formed by subjecting iodogallium phthalocyanine (a) to dry milling, as by a mortar, a sand mill, a ball mill, or a paint shaker, or (ii) amorphous iodogallium phthalocyanine obtained in the manner described above, in an amide solvent, such as N,N-dimethylformamide, or N-methylpyrrolidone.

Iodogallium phthalocyanine having a crystal form represented by a diffraction pattern (d) showing strong peaks at Bragg angles (2θ±0.2 deg.) of 7.5 deg. and 26.4 deg. (hereinafter sometimes referred to as "iodogallium phthalocyanine (d)") may be obtained by milling or stirring (i) a crystal formed by subjecting iodogallium phthalocyanine (a) to dry milling, as by a mortar, a sand mill, a ball mill, or a paint shaker, or (ii) amorphous iodogallium phthalocyanine obtained in the manner described above, in an amine solvent, such as N,N-dimethylaniline, N,N-diethylaniline or quinoline.

Iodogallium phthalocyanine having a crystal form represented by a diffraction pattern (e) showing strong peaks at Bragg angles (2θ±0.2 deg.) of 8.8 deg. and 27.1 deg. may be obtained by subjecting iodogallium phthalocyanine (a) to dry milling, as by a mortar, a sand mill or a paint shaker, or by stirring the above-mentioned amorphous iodogallium phthalocyanine in water.

Herein, "milling" means a treatment by using a milling device, such as a sandmill, a ball mill or a paint shaker together with dispersion media, such as glass beads, steel beads or alumina beads. On the other hand, "stirring" means a stirring treatment without using such dispersion media.

The bromogallium phthalocyanine according to the present invention has a crystal form selected from those represented by X-ray diffraction patterns (f)–(j) shown below respectively obtained by a CuKα characteristic X-ray diffraction method:

(f) having a strongest peak at a Bragg angle (2θ±0.2 deg.) of 27.3 deg. and free from another peak having an intensity of 30% or more of that of the strongest peak, (g) having a strongest peak and a second strongest peak at Bragg angles (2θ±0.2 deg.) of 9.0 deg. and 27.1 deg., wherein the second strongest peak has an intensity of at least 30% of that of the strongest peak, (h) having a strongest peak and a second strongest peak at Bragg angles (2θ±0.2 deg.) of 7.4 deg. and 27.9 deg., (i) having a strongest peak and a second strongest peak at Bragg angles (2θ±0.2 deg.) of 7.5 deg. and 26.4 deg., and (j) having a strongest peak and a second strongest peak at Bragg angles (2θ±0.2 deg.) of 6.9 deg. and 26.7 deg.

It is preferred that the diffraction pattern (g) further shows strong peaks at Bragg angles (2θ±0.2 deg.) of 9.7 deg., 18.2 deg. and 21.0 deg.; the diffraction pattern (h) further shows a strong peak at a Bragg angle (2θ±0.2 deg.) of 16.2 deg.; the diffraction pattern (i) further shows strong peaks at Bragg angles (2θ±0.2 deg.) of 16.3 deg. and 24.9 deg.; and the diffraction pattern (j) further shows strong peaks at Bragg angles (2θ±0.2 deg.) of 13.2 deg. and 16.6 deg.

The bromogallium phthalocyanine according to the present invention has a structure represented by the following formula:

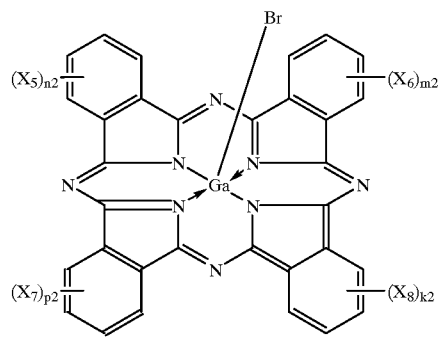

wherein $X_5$, $X_6$, $X_7$ and $X_8$ denote Cl or Br, $n_2$, $m_2$, $p_2$ and $k_2$ are respectively an integer of 0–4.

The above-mentioned bromogallium phthalocyanine may for example be formed by reacting phthalocyanine and gallium tribromide in α-chloronaphthalene solvent at 150–230° C. It has been also discovered that bromogallium phthalocyanine can be obtained by reacting chlorogallium phthalocyanine obtained through various process, e.g., one disclosed in JP-A 5-194523 or hydroxygallium phthalocyanine formed by hydrolyzing the chlorogallium phthalocyanine with hydrobromic acid under application of a shearing force, as by milling or stirring. This process is commercially desirable because inexpensive gallium chloride can be used instead of gallium bromide.

More specifically, bromogallium phthalocyanine having a crystal form represented by a diffraction pattern (f) showing a strong peak at a Bragg angle (2θ±0.2 deg.) of 27.3 deg. (hereinafter, sometimes referred as "bromogallium phthalocyanine (f)") may be formed by reacting phthalonitrile and gallium tribromide in a reaction solvent of α-chloronaphthalene under stirring and heating at 150–230° C. It is possible to further subject the product bromogallium phthalocyanine to washing under heating dispersion within an amide solvent, such as N,N-dimethylformamide, or washing with an alcohol, such as ethanol. The crystal form is not changed by such washing.

Bromogallium phthalocyanine having a crystal form represented by a diffraction pattern (g) having strong peaks at Bragg angles (2θ±0.2 deg.) of 9.0 deg. and 27.1 deg. (hereinafter sometimes referred to as "bromogallium phthalocyanine (g)") may be obtained by subjecting bromogallium phthalocyanine (f) to dry milling by a mortar.

Bromogallium phthalocyanine (g) may also be prepared by subjecting bromogallium phthalocyanine (f), to dry milling, as by a sand mill or a paint shaker together with glass beads to obtain a crystal, and subjecting the crystal to milling in an appropriate solvent, examples of which may include: halogen-containing solvents, such as chloroform, chlorobenzene and dichlorobenzene; ketone solvents, such as cyclohexane, methyl ethyl ketone and acetone; nitrile solvents, such as acetonitrile and benzonitrile; ester solvents, such as ethyl acetate and butyl acetate, alcohol solvents, such as methanol, ethanol, propanol, ethylene glycol and polyethylene glycol, and ether solvents, such as tetrahydrofuran, 1,4-dioxane, propyl ether, and butyl ether. By milling or stirring bromogallium phthalocyanine in such a solvent, it is possible to obtain bromogallium phthalocyanine (g) in various crystallinities.

Bromogallium phthalocyanine having a crystal form represented by a diffracting pattern (h) showing strong peaks at Bragg angles (2θ±0.2 deg) of 7.4 deg and 27.9 deg.

(hereinafter sometimes referred as "bromogallium phthalocyanine (h)") may be obtained by subjecting bromogallium phthalocyanine (f) to dry milling, as by a sand mill or a paint shaker, together with glass beads.

Bromogallium phthalocyanine (h) may also be obtained by milling or stirring (i) a crystal formed by subjecting bromogallium phthalocyanine (f) to dry milling, as by a mortar, or (ii) bromogallium phthalocyanine (g) obtained by treatment with hydrobromic acid, in an amide solvent, such as N,N-dimethylformamide, or N-methylpyrrolidone.

Bromogallium phthalocyanine having a crystal form represented by a diffraction pattern (i) showing strong peaks at Bragg angles (2θ±0.2 deg.) of 7.5 deg. and 26.4 deg. (hereinafter sometimes referred to as "bromogallium phthalocyanine (i)") may be obtained by milling or stirring (i) a crystal formed by subjecting bromogallium phthalocyanine (f) to dry milling, as by a mortar, a sand mill, a ball mill, or a paint shaker, or (ii) bromogallium phthalocyanine (g) obtained by treatment with hydrobromic acid in an amine solvent, such as N,N-dimethylaniline, N,N-diethylaniline or quinoline.

Bromogallium phthalocyanine having a crystal form represented by a diffraction pattern (j) showing strong peaks at Bragg angles (2θ±0.2 deg.) of 6.9 deg. and 26.7 deg. may be obtained by milling or stirring bromogallium phthalocyanine (g) obtained by treatment with hydrobromic acid in a weak alkaline aqueous solution (pH of at most 11), followed by washing with water.

Zirconium phthalocyanine according to the present invention has a crystal form represented by an X-ray diffraction pattern having a strongest peak at a Bragg angle (2θ±0.2 deg.) in a range of 7.0–9.0 deg. as measured by a CuKα characteristic X-ray diffraction method.

It is preferred that the X-ray diffraction pattern shows a strongest peak at a Bragg angle (2θ±0.2 deg.) of 8.0 deg. It is further preferred that the diffraction pattern further shows a strong peak at a Bragg angle (2θ±0.2 deg.) of 25.5 deg.

The zirconium phthalocyanine according to the present invention has a structure represented by the following formula:

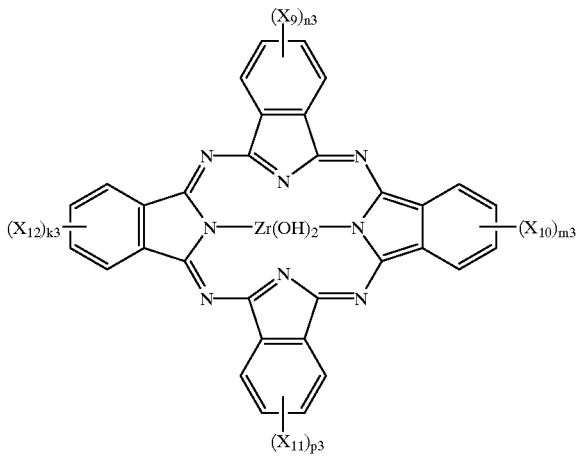

wherein $X_9$, $X_{10}$, $X_{11}$ and $X_{12}$ denote Cl or Br, $n_3$, $m_3$, $p_3$ and $k_3$ are respectively an integer of 0–4.

The zirconium phthalocyanine may for example be prepared by reacting phthalonitrile and zirconium tetrachloride in an appropriate solvent, such as quinoline, under an inert gas atmosphere at 150–230° C., and dispersing the reaction product in the reaction solvent or a solvent such as N,N-dimethylformamide. Various forms of zirconium phthalocyanine may be formed milling or stirring the thus synthesized zirconium phthalocyanine in an appropriate solvent, directly or after dry-milling, as by a mortar, a sand mill, a ball mill or a paint shaker.

Examples of appropriate solvent may include: halogen-containing solvents, such as chloroform, chlorobenzene and dichlorobenzene; ketone solvents, such as cyclohexane, methyl ethyl ketone and acetone; nitrile solvents, such as acetonitrile and benzonitrile; ester solvents, such as ethyl acetate and butyl acetate; alcohol solvents, such as methanol, ethanol, propanol, ethylene glycol and polyethylene glycol; ether solvents, such as tetrahydrofuran, 1,4-dioxane, propyl ether, and butyl ether; amine solvents, such as N,N-dimethylaniline and N,N-diethylaniline; and amide solvents, such as N,N-dimethylformamide and N-methylpyrrolidone.

The above-mentioned phthalocyanine compound of the invention functions as an excellent photoconductor and may be adapted for an electronic material such as an electrophotosensitive member, a solar cell, a sensor or a switching device.

Hereinafter, some examples of application of the phthalocyanine compound of the invention to a charge-generating material in an electrophotosensitive member will be explained.

Figure 2:
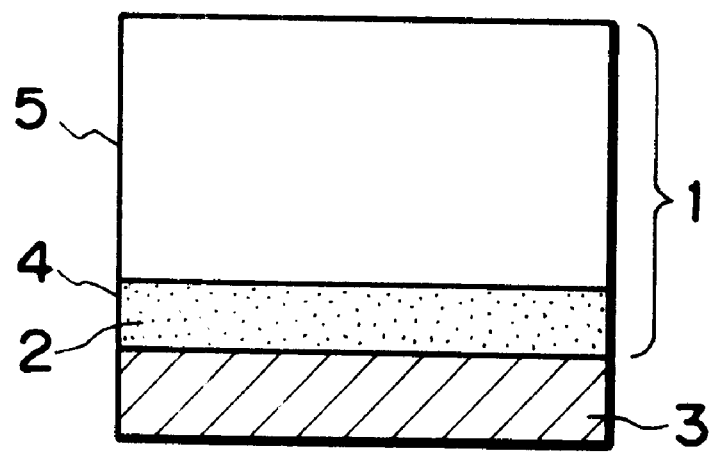

Representative embodiments of laminar structure of the electrophotosensitive member of the invention are shown in FIGS. 1 and 2. FIG. 1 shows an embodiment, wherein a photosensitive layer 1 is composed of a single layer and comprises a charge-generating material 2 and a charge-transporting material (not shown) together. The photosensitive layer 1 may be disposed on an electroconductive support 3. FIG. 2 shows an embodiment of laminated structure wherein a photosensitive layer 1 comprises a charge generation layer 4 comprising a charge-generating material 2 and a charge transport layer 5 comprising a charge-transporting material (not shown) disposed on the charge generation layer 4; and the charge transport layer 5 may be disposed on an electroconductive support 3. The charge generation layer 4 and the charge transport layer 5 can be disposed in reverse. The laminar structure of FIG. 2 is preferred in the present invention.

The electroconductive support 3 may comprise a material having an electroconductivity including: a metal such as aluminum or stainless steel; and metal, plastic or paper having an electroconductive layer. The support 3 may have a shape of a cylinder or a sheet.

Between the electroconductive support 3 and the photosensitive layer 1, there can be formed a primer or undercoat layer having a barrier function and an adhesive function as an intermediate layer. The primer layer may comprise a substance, such as polyvinyl alcohol, polyethylene oxide, ethyl cellulose, methyl cellulose, casein, polyamide, glue or gelatin. The above substance may be dissolved in an appropriate solvent and applied onto the electroconductive support 3 to prepare the primer layer. The thickness of the primer layer may be 0.2–3.0 μm.

The photosensitive layer which is composed of a single layer as shown in FIG. 2 may be formed by dispersing or dissolving the charge-generating material comprising the phthalocyanine compound of the invention and the charge-transporting material with an appropriate solution containing a binder resin, applying the resultant coating liquid and then drying the coating.

The charge generation layer of the photosensitive layer having a laminated structure as shown in FIG. 2 may be formed by dispersing the charge-generating material comprising the oxytitanium phthalocyanine crystal of the invention in an appropriate solution containing a binder resin, applying the resultant coating liquid and then drying the coating. Examples of the binder resin as described above may include: polyester, acrylic resins, polyvinylcarbazole, phenoxy resins, polycarbonate, polyvinyl butyral, polystyrene, vinyl acetate resins, polysulfone, polyarylate or vinylidene chloride-acrylonitrile copolymers.

The charge transport layer may be formed by dissolving a charge-transporting material and a binder resin in an appropriate solvent, applying the resultant coating liquid and then drying the coating. Examples of the charge-transporting material used may include: triaryl amine compounds, hydrazone compounds, stilbene compounds, pyrazoline compounds, oxazole compounds, thiazole compounds or triaryl methane compounds. As the binder resin, the above-mentioned resins can be used.

The method for applying the photosensitive layer(s) may be: dipping, spray coating, spinner coating, bead coating, blade coating or beam coating.

The thickness of the photosensitive layer composed of a single layer may preferably be 5–40 μm, more preferably 10–30 μm. When the photosensitive layer has a laminated structure, the thickness of the charge generation layer may preferably be 0.01–10 μm, more preferably 0.05–5 μm and the thickness of the charge transport layer may preferably be 5–40 μm, more preferably 10–30 μm.

In order to protect the photosensitive layer from external shock, a thin protective layer can be further disposed on the photosensitive layer.

When the phthalocyanine compound of the invention is used as the charge-generating material, it is possible to mix the phthalocyanine compound with another charge-generating material.

The electrophotographic photosensitive member according to the present invention can be applied to not only a laser beam printer, a light-emitting diode (LED) printer and a cathode-ray tube (CRT) printer but also an ordinary electrophotographic copying machine and other fields of applied electrophotography.

Figure 78:
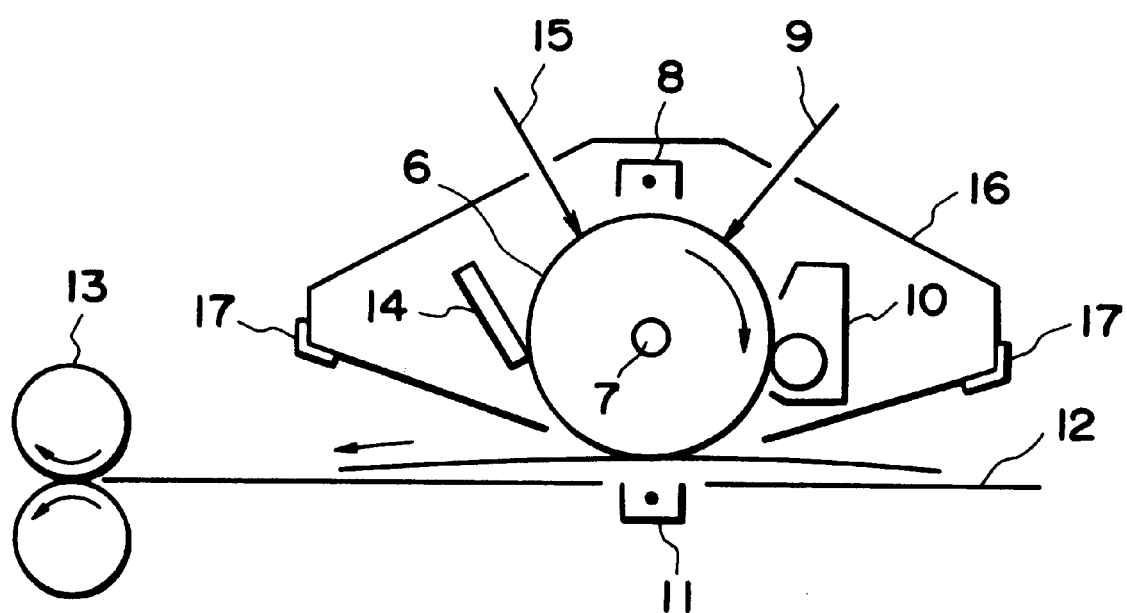
FIG. 78 schematically illustrates an electrophotographic apparatus in which a process cartridge including an electrophotographic photosensitive member according to the invention is mounted.

FIG. 78 shows an outline of an electrophotographic apparatus including an electrophotographic photosensitive member according to the present invention as an essential part of a process cartridge.

Referring to FIG. 78, a drum-shaped electrophotographic photosensitive member 6 according to the present invention is driven in rotation at a prescribed peripheral speed in an indicated arrow direction about an axis 7. During the rotation, the outer peripheral surface of the photosensitive member 6 is uniformly charged at a prescribed positive or negative potential, and then exposed to image light 9 (as by slit exposure or laser beam scanning exposure) by using an imagewise exposure means (not shown), whereby an electrostatic latent image is successively formed on the peripheral surface of the photosensitive member 6.

The thus-formed electrostatic latent image is then developed with a toner by developing means 10 to form a toner image on the photosensitive member 6. The toner image is transferred by a transfer means 11 onto a transfer(-receiving) material 12 which has been supplied from a paper supply unit (not shown) to a position between the photosensitive member 6 and the transfer means 11 in synchronism with the rotation of the photosensitive member 6.

The transfer material 12 carrying the received toner image is then separated from the photosensitive member 6 surface and guided to an image fixing means 13 to fix the toner image. The resultant print or copy comprising the fixed toner image is then discharged out of the electrophotographic apparatus.

The surface of the photosensitive member after the image transfer is subjected to removal of residual toner by a cleaning means 14 to be cleaned and then subjected to charge removal by exposure to pre-exposure light from a pre-exposure means (not shown) to be recycled for repetitive image formation. Incidentally, in case where the primary charging means 8 is a contact charging means, such s a charging roller, the pre-exposure is not necessarily required.

Plural members among the above-mentioned electrophotographic photosensitive member 6, primary charging means 8, developing means 10 and cleaning means 14 may be integrally supported to form a process cartridge so as to be detachably mountable to a main assembly of an electrophotographic apparatus, such as a copying machine or a laser beam printer. As shown in FIG. 78, for example, at least one of the primary charging means 8, the developing means 10 and the cleaning means 14 may be integrally supported together with the photosensitive member 6 to form a process cartridge 16, which is detachably mountable to an apparatus main assembly with the aid of a guide means, such as a rail 17 provided in the apparatus main assembly.

In case where the electrophotographic apparatus is used as a copying machine or a printer, exposure image light 9 may be given as reflected light from or transmitted light through an original, or as illumination light formed by reading data of an original by a sensor to provide a signal and driving a laser beam scanner, an LED array or a liquid crystal shutter array based on the signal.

Hereinbelow, the present invention will be described more specifically based on Examples, wherein "parts" used for describing compositions are by weight unless otherwise noted specifically.

Incidentally, X-ray diffraction data described herein as representing various crystal forms of phthalocyanine compounds are based on data measured by X-ray diffractometry using $CuK_\alpha$ characteristic X-rays according to the following conditions:

Apparatus: Full-automatic X-ray diffraction apparatus ("MXP18", available from MAC Science K.K.)

X-ray tube (Target): Cu

Tube voltage: 50 kV

Tube current: 300 mA

Scanning method: 2θ/θ scan

Scanning speed: 2 deg./min.

Sampling interval: 0.020 deg.

Starting angle (2θ): 5 deg.

Stopping angle (2θ): 40 deg.

Divergence slit: 0.5 deg.

Scattering slit: 0.5 deg.

Receiving slit: 0.3 deg.

Curved monochromator: used.

EXAMPLE 1

Figure 3:
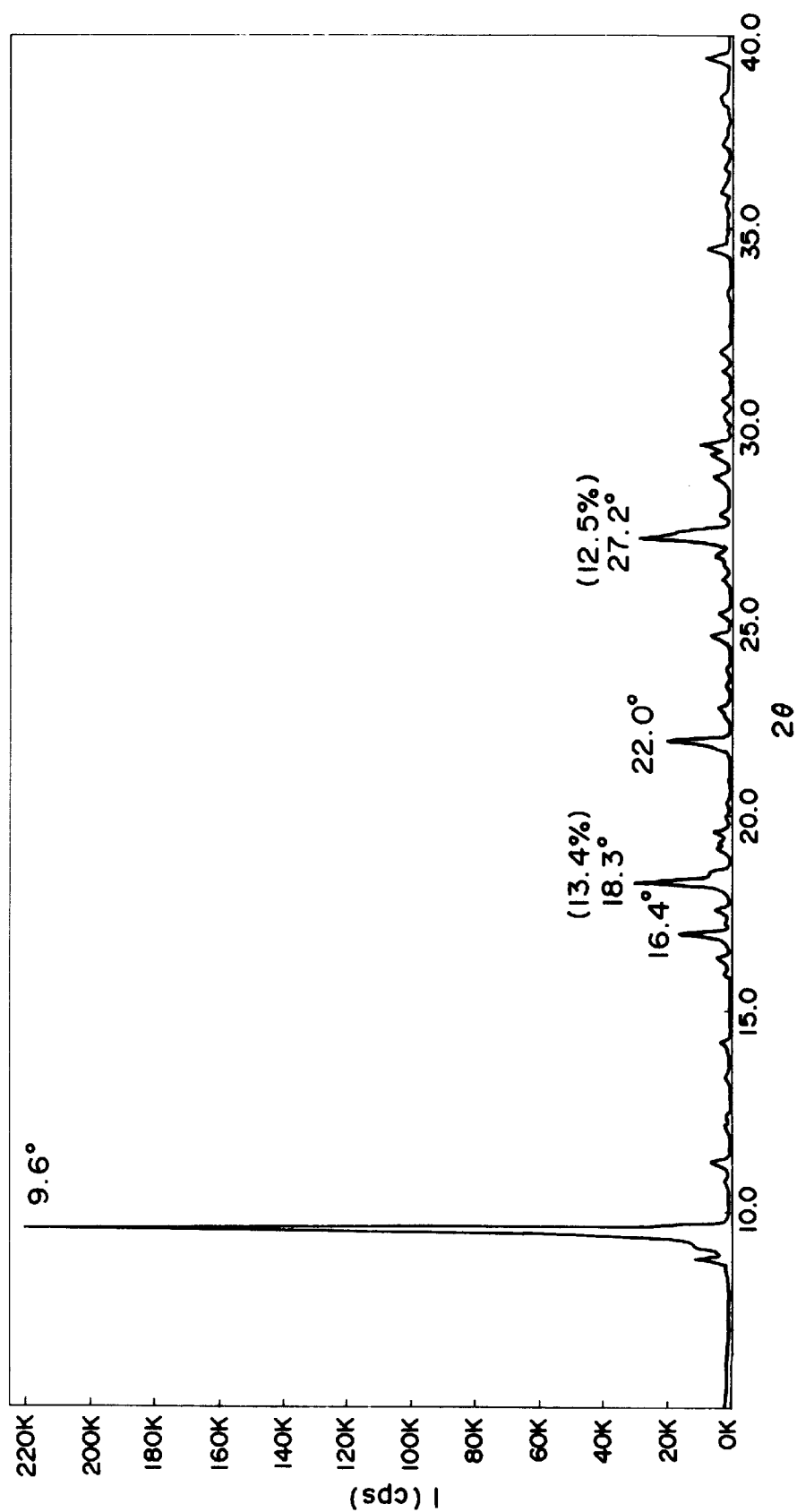
FIGS. 3–31 each show an X-ray diffraction pattern of an iodogallium phthalocyanine crystal according to the invention.

28 parts of phthalonitrile, 25 parts of gallium triiodide and 150 parts of α-chloronaphthalene were stirred for 4 hours under heating at 200° C. in a nitrogen atmosphere, followed by cooling to 130° C. and filtration. The recovered solid was washed with 200 parts of N,N-dimethylformamide at 130° C. under stirring for 2 hours, and was washed with methanol on a filter, followed by drying to 27 parts of a crystal, which was found to comprise iodogallium phthalocyanine (a) with an X-ray diffraction pattern shown in FIG. 3. The crystal also exhibited the following elementary analysis results ($C_{32}H_{16}N_8GaI$):

|  | C (%) | H (%) | N (%) | I (%) |
|---|---|---|---|---|
| Calculated value | 54.20 | 2.27 | 15.80 | 17.90 |
| Measured value | 54.20 | 2.21 | 16.96 | 17.4 |

EXAMPLE 2

Figure 4:
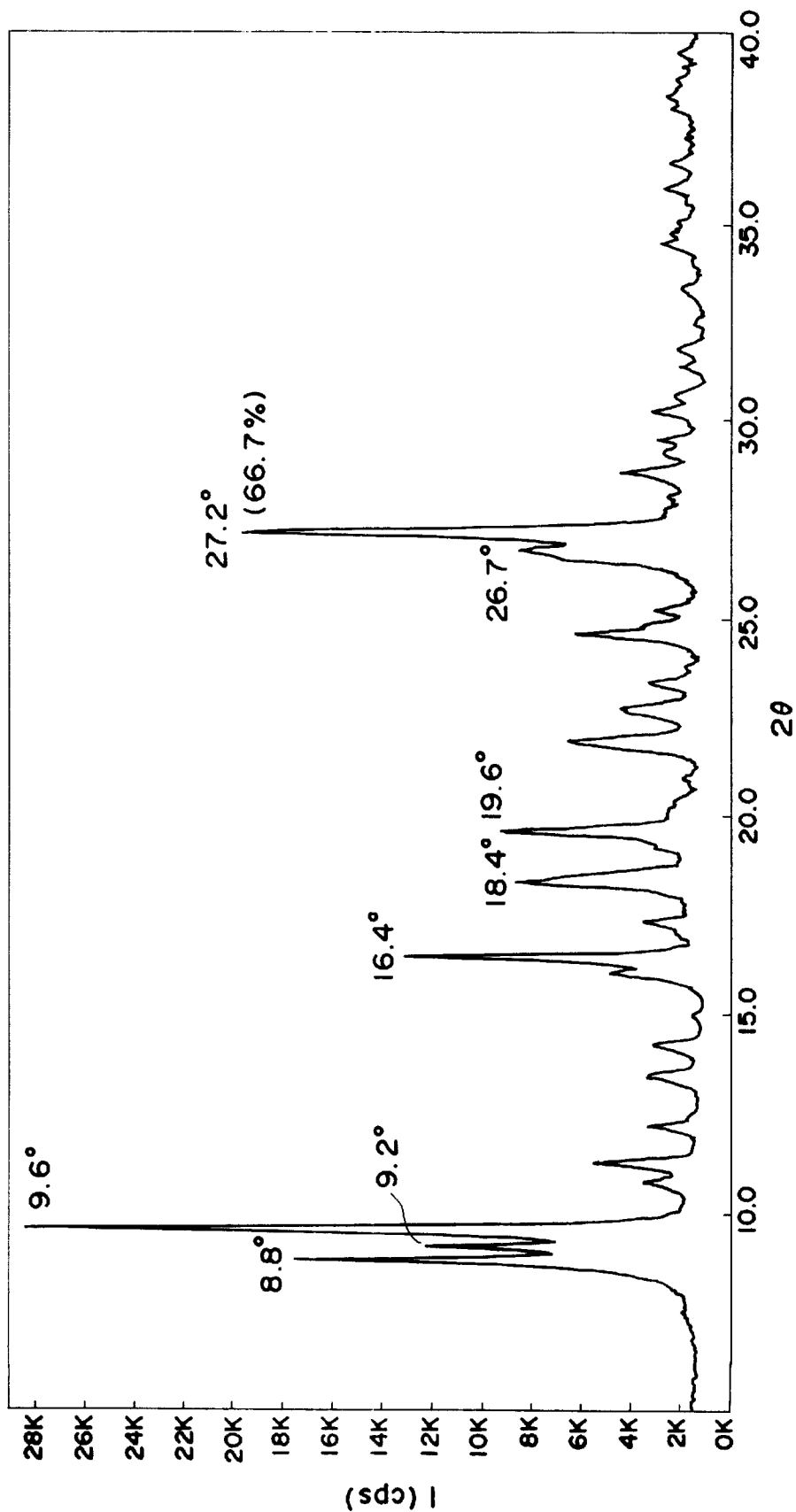

5 parts of the crystal obtained in Example 1 was treated for 3 hours in an automatic mortar ("ANM-150" (trade name), available from Nitto Kagaku K.K. and comprising a porcelain mortar and a porcelain pestle rotating at fixed speeds of 6 rpm and 100 rpm, respectively, in mutually reverse directions) to provide a crystal, which was found to comprise iodogallium phthalocyanine (b) with an X-ray diffraction pattern shown in FIG. 4.

EXAMPLE 3

Figure 5:
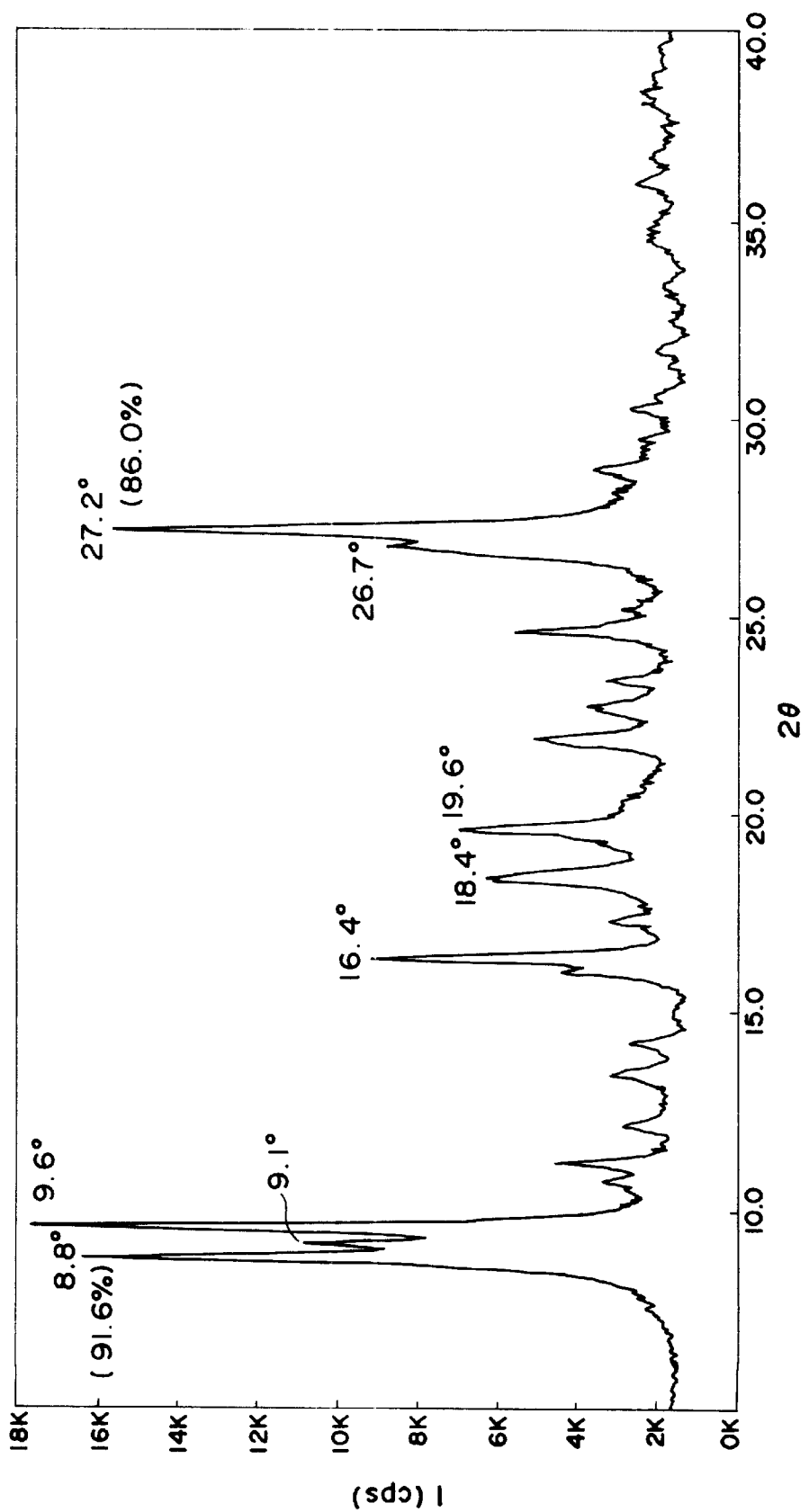

5 parts of the crystal obtained in Example 1 was treated for 9 hours in an automatic mortar identical to the one used in Example 2 to provide a crystal, which was found to comprise iodogallium phthalocyanine (e) with an X-ray diffraction pattern shown in FIG. 5.

EXAMPLE 4

Figure 6:
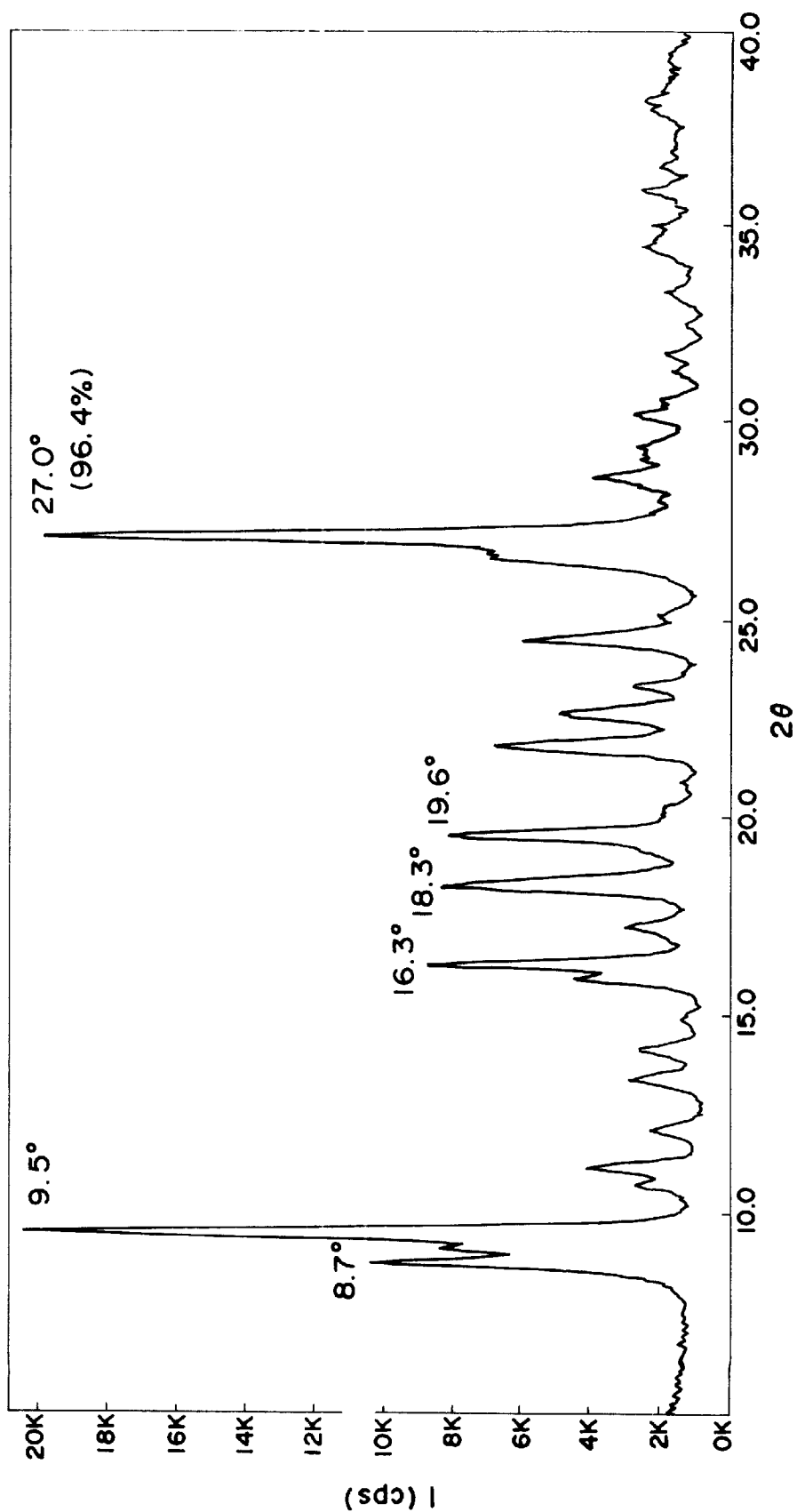

0.3 part of the crystal obtained in Example 2, 10 parts of cyclohexanone and 10 parts of 1 mm-dia. glass beads were dispersed for 24 hours in a paint shaker, followed by filtration, washing with methanol and drying to recover a crystal, which was found to comprise iodogallium phthalocyanine (b) with an X-ray diffraction pattern shown in FIG. 6.

EXAMPLE 5

Figure 7:
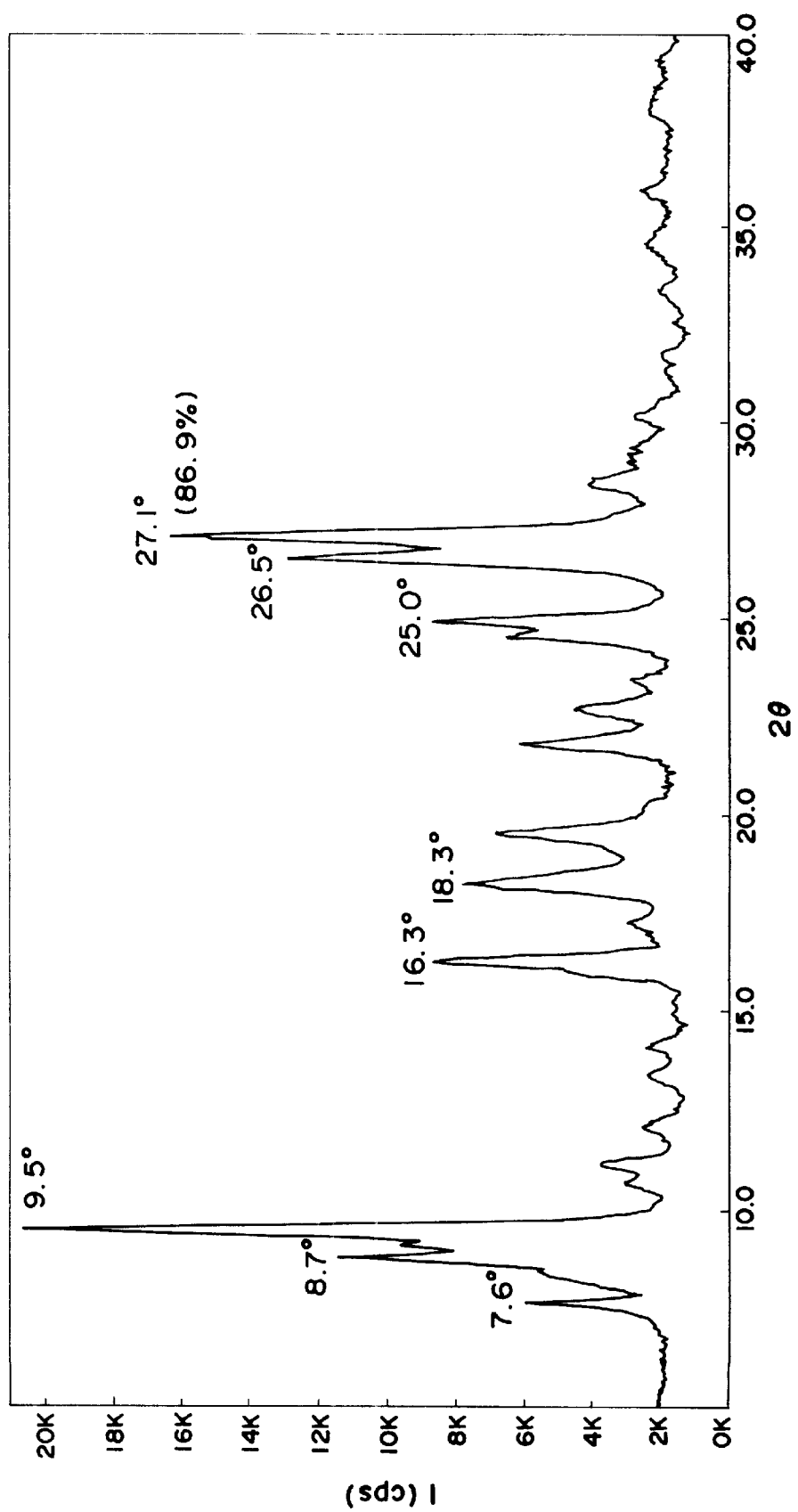

0.3 part of the crystal obtained in Example 2, 10 parts of acetonitrile and 10 parts of 1 mm-dia. glass beads were dispersed for 24 hours in a paint shaker, followed by filtration, washing with methanol and drying to recover a crystal, which was found to comprise iodogallium phthalocyanine (b) with an X-ray diffraction pattern shown in FIG. 7.

EXAMPLE 6

Figure 8:
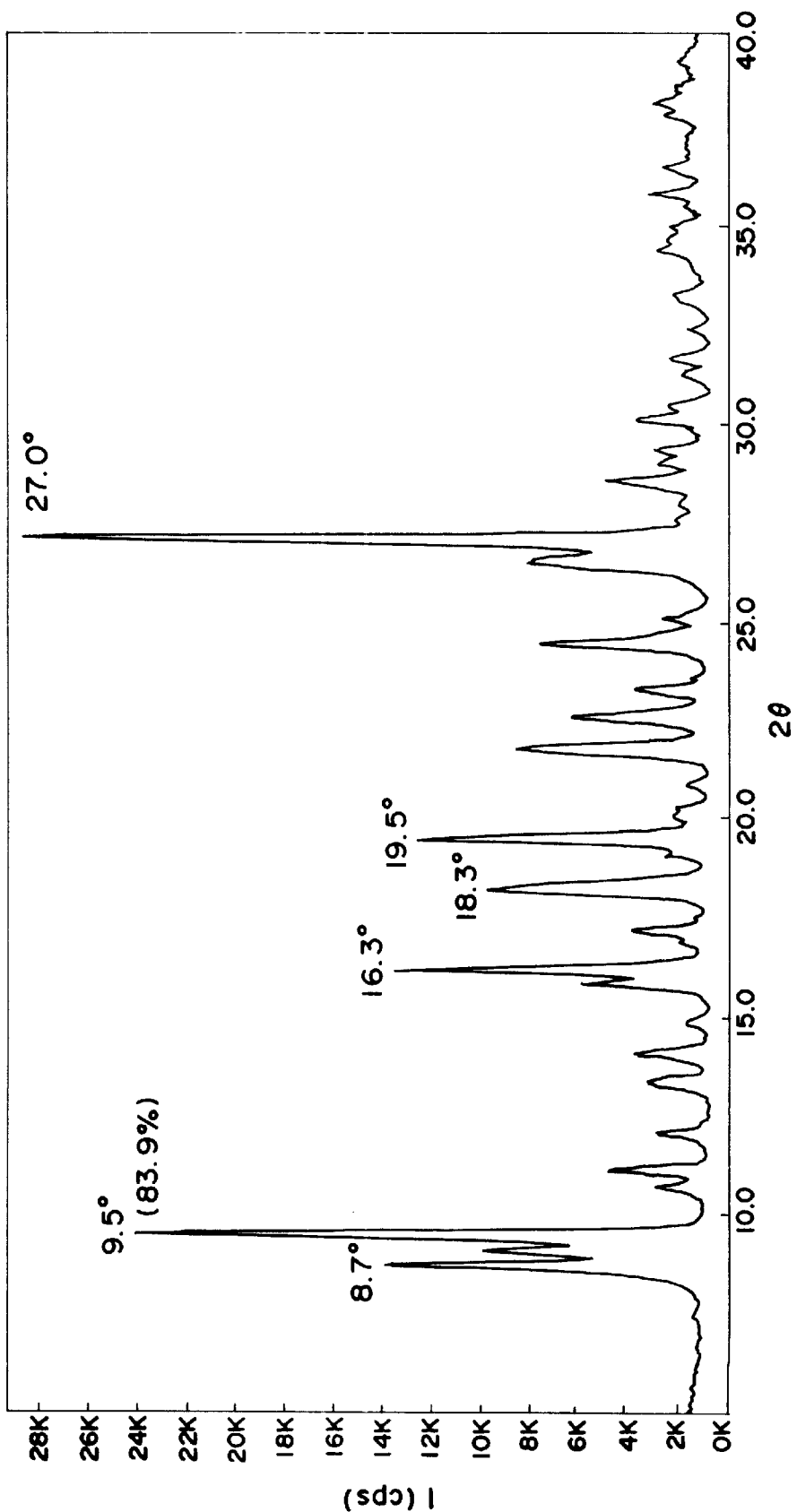

0.3 part of the crystal obtained in Example 2, 10 parts of butyl acetate and 10 parts of 1 mm-dia. glass beads were dispersed for 24 hours in a paint shaker, followed by filtration, washing with methanol and drying to recover a crystal, which was found to comprise iodogallium phthalocyanine (b) with an X-ray diffraction pattern shown in FIG. 8.

EXAMPLE 7

Figure 9:
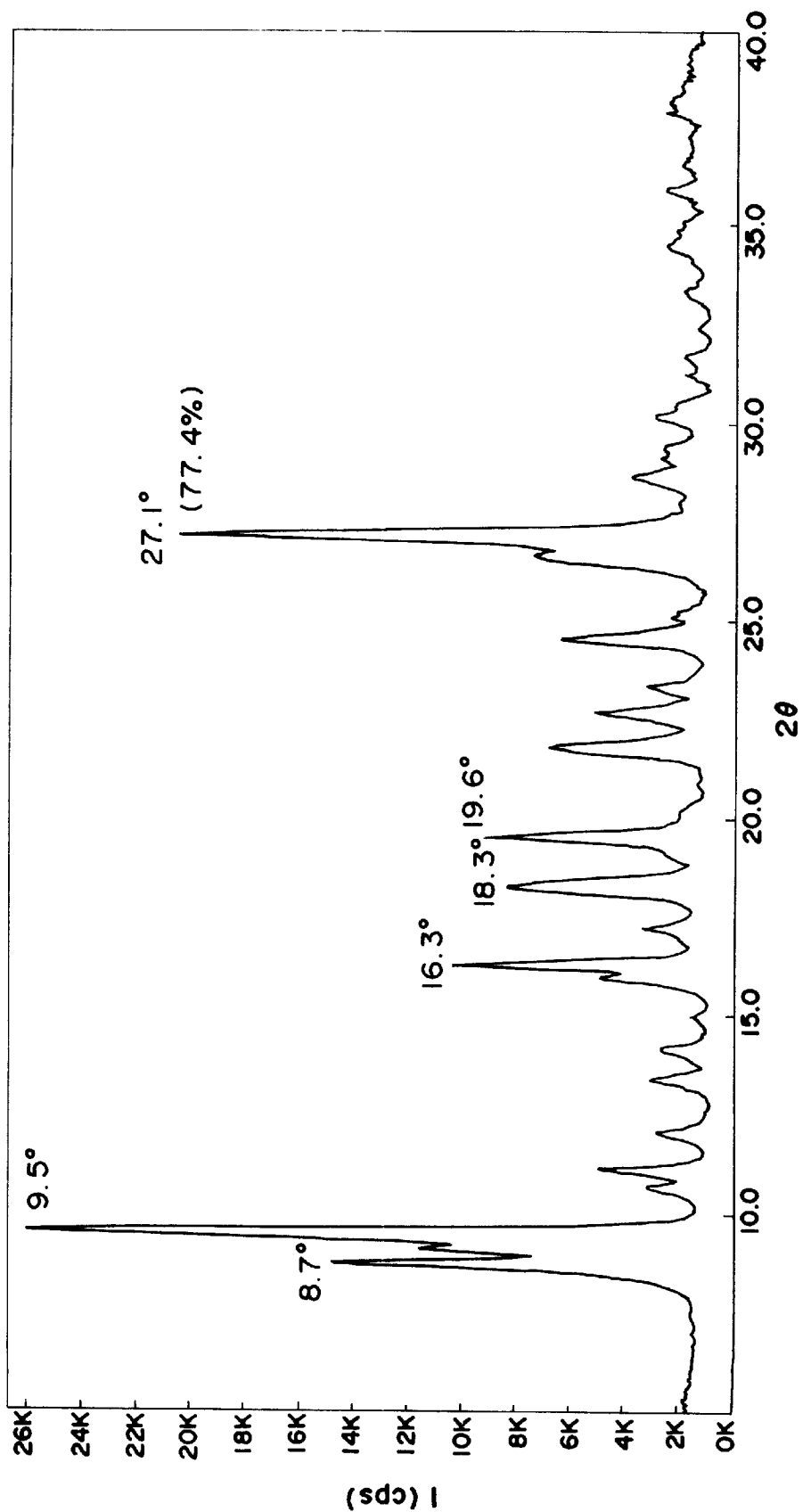

0.3 part of the crystal obtained in Example 2, 10 parts of ethylene glycol and 10 parts of 1 mm-dia. glass beads were dispersed for 24 hours in a paint shaker, followed by filtration, washing with methanol and drying to recover a crystal, which was found to comprise iodogallium phthalocyanine (b) with an X-ray diffraction pattern shown in FIG. 9.

EXAMPLE 8

Figure 10:
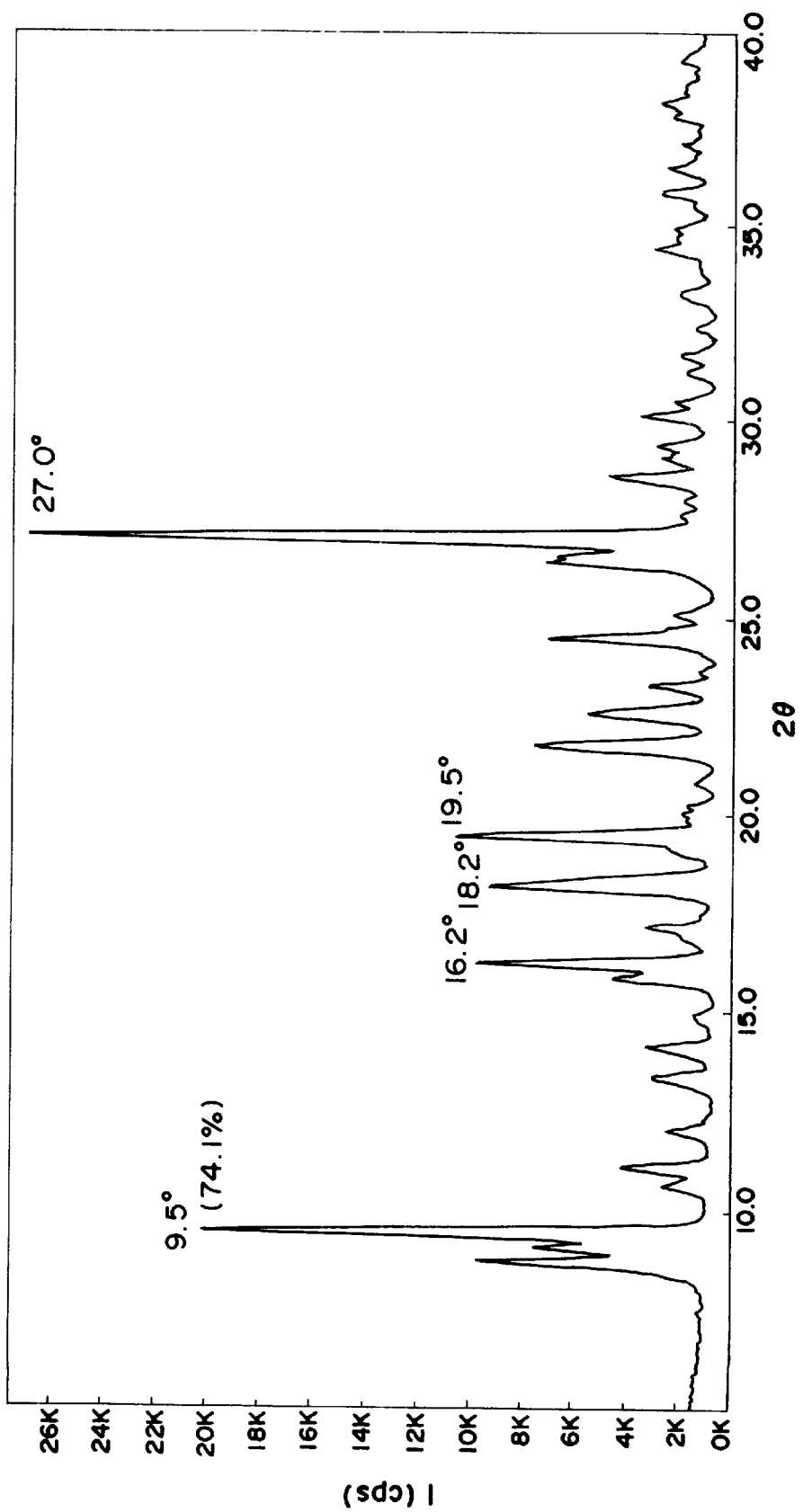

0.3 part of the crystal obtained in Example 2, 10 parts of monochlorobenzene and 10 parts of 1 mm-dia. glass beads were dispersed for 24 hours in a paint shaker, followed by filtration, washing with methanol and drying to recover a crystal, which was found to comprise iodogallium phthalocyanine (b) with an X-ray diffraction pattern shown in FIG. 10.

EXAMPLE 9

Figure 11:
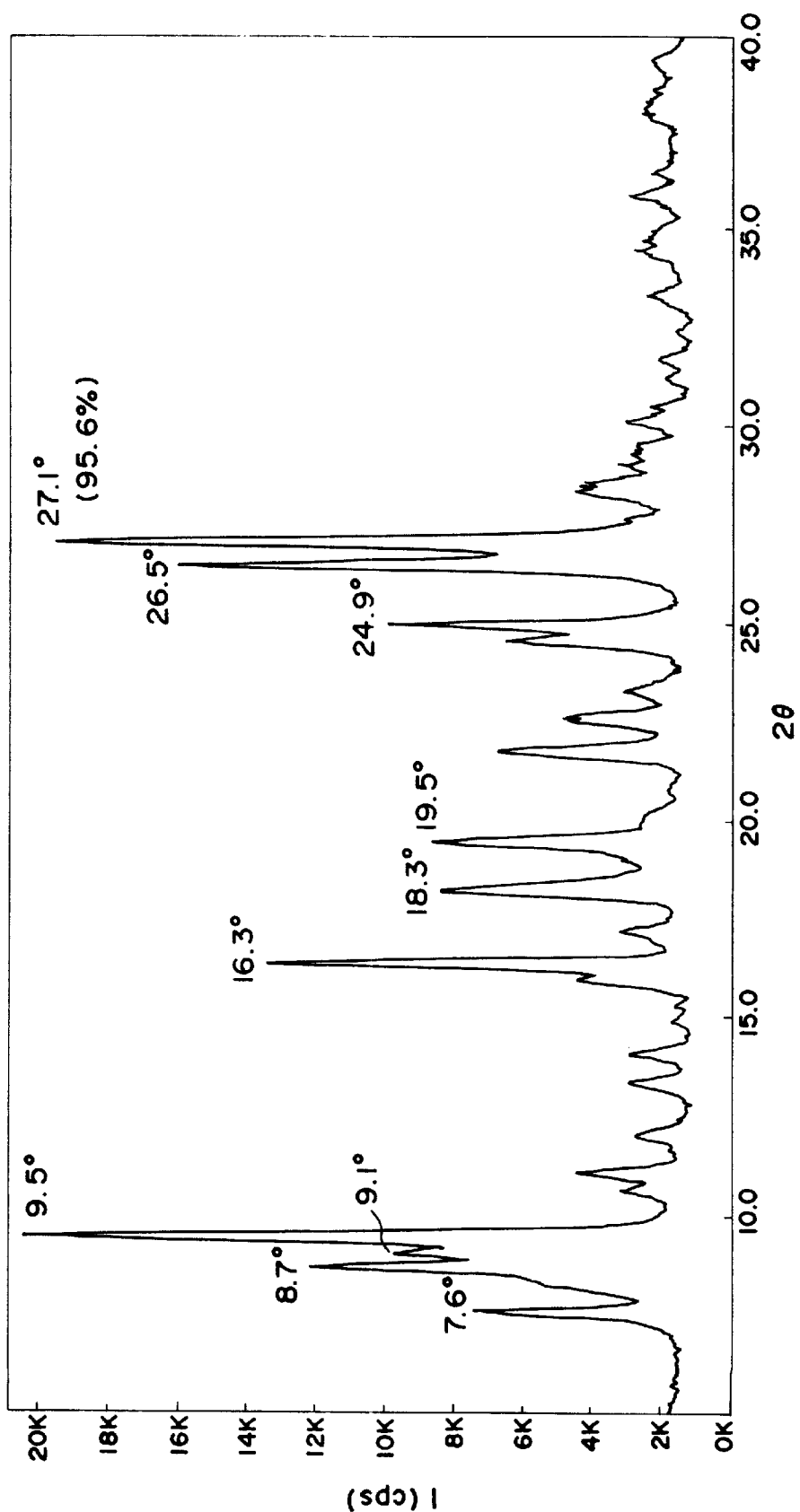

0.3 part of the crystal obtained in Example 2, 10 parts of tetrahydrofuran and 10 parts of 1 mm-dia. glass beads were dispersed for 24 hours in a paint shaker, followed by filtration, washing with methanol and drying to recover a crystal, which was found to comprise iodogallium phthalocyanine (b) with an X-ray diffraction pattern shown in FIG. 11.

EXAMPLE 10

Figure 12:
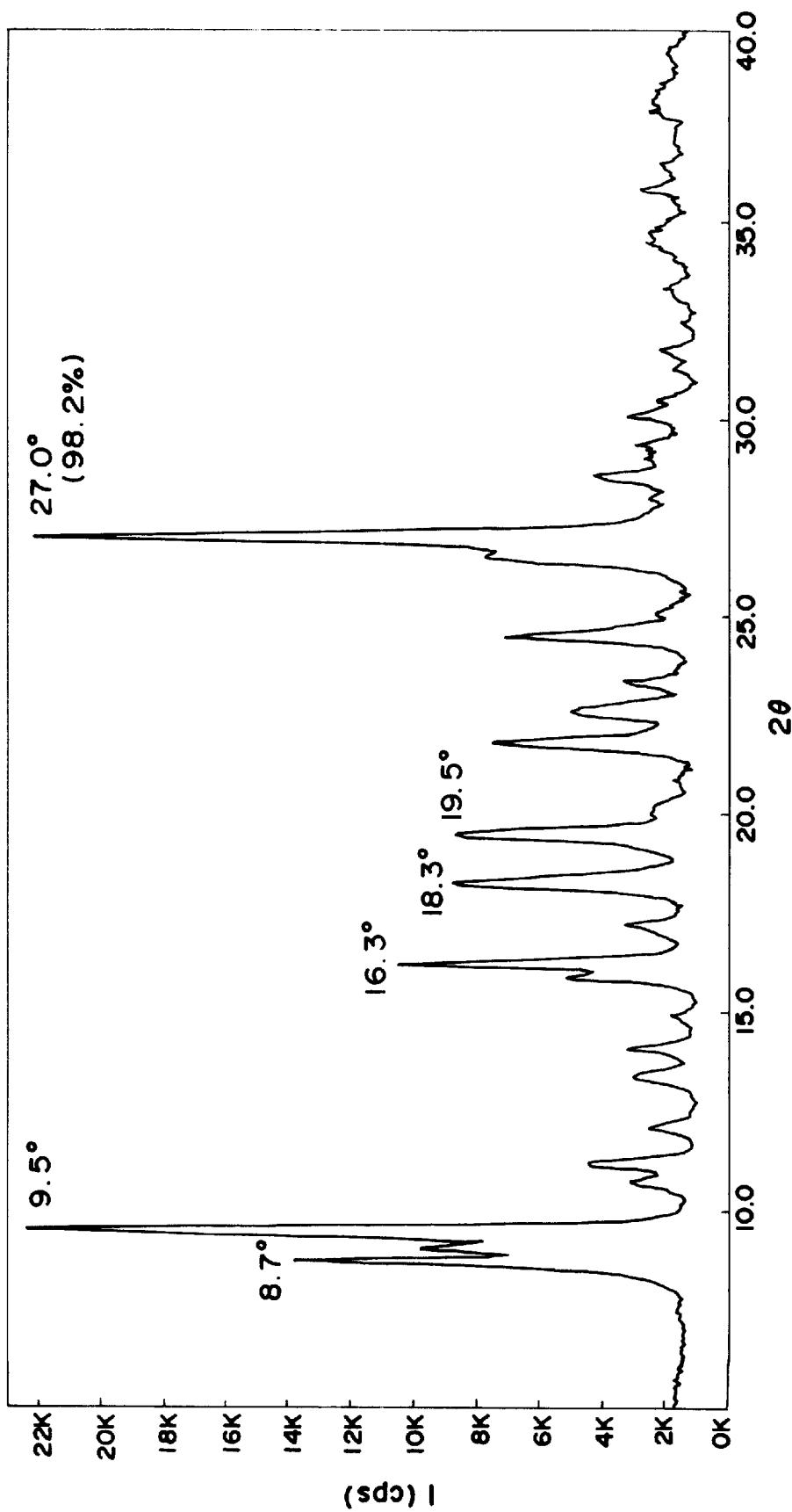

0.3 part of the crystal obtained in Example 2, 10 parts of methyl ethyl ketone and 10 parts of 1 mm-dia. glass beads were dispersed for 24 hours in a paint shaker, followed by filtration, washing with methanol and drying to recover a crystal, which was found to comprise iodogallium phthalocyanine (b) with an X-ray diffraction pattern shown in FIG. 12.

EXAMPLE 11

Figure 13:
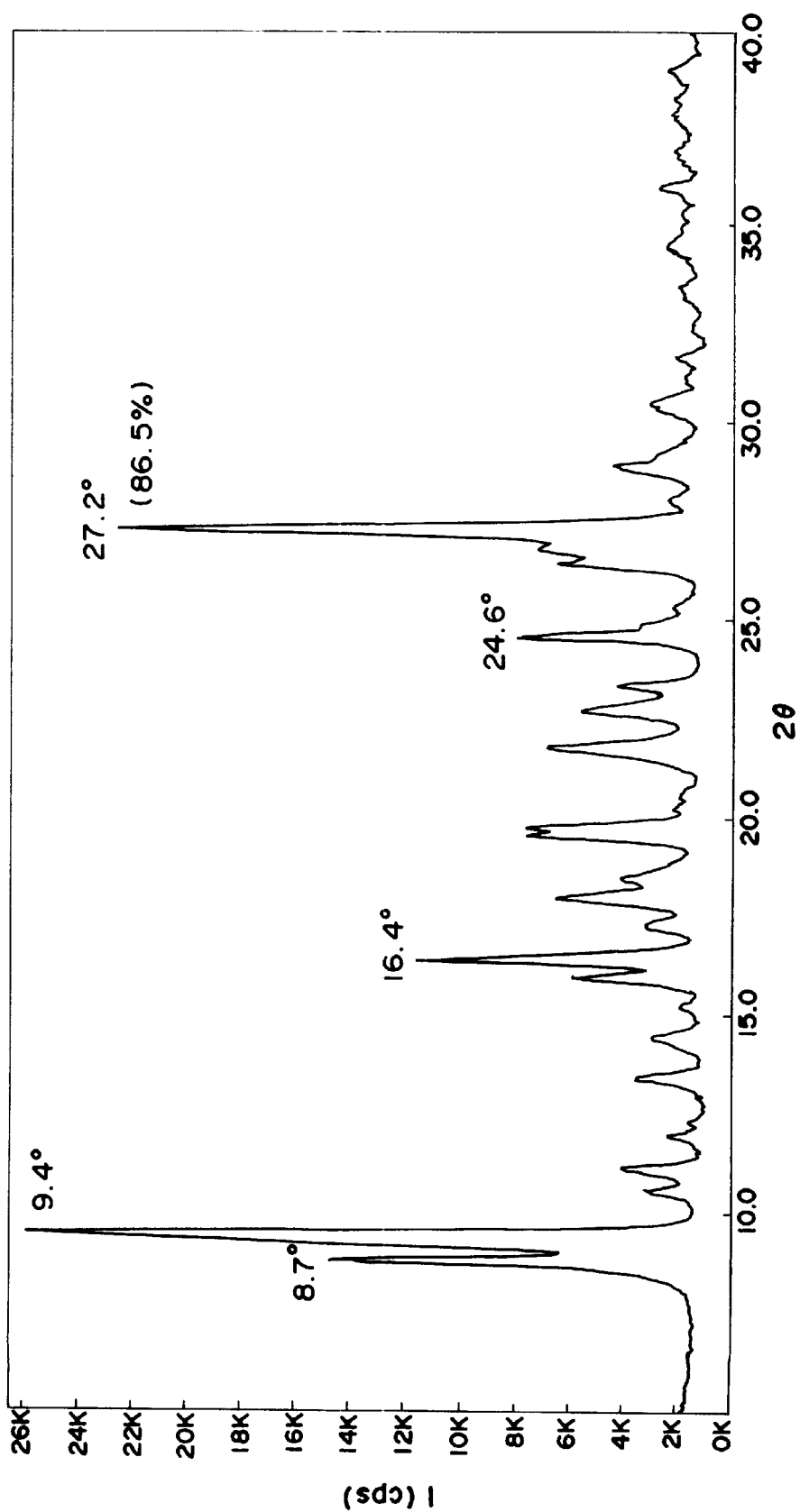

0.3 part of the crystal obtained in Example 2, 10 parts of methanol and 10 parts of 1 mm-dia. glass beads were dispersed for 24 hours in a paint shaker, followed by filtration, washing with methanol and drying to recover a crystal, which was found to comprise iodogallium phthalocyanine (b) with an X-ray diffraction pattern shown in FIG. 13.

EXAMPLE 12

Figure 14:
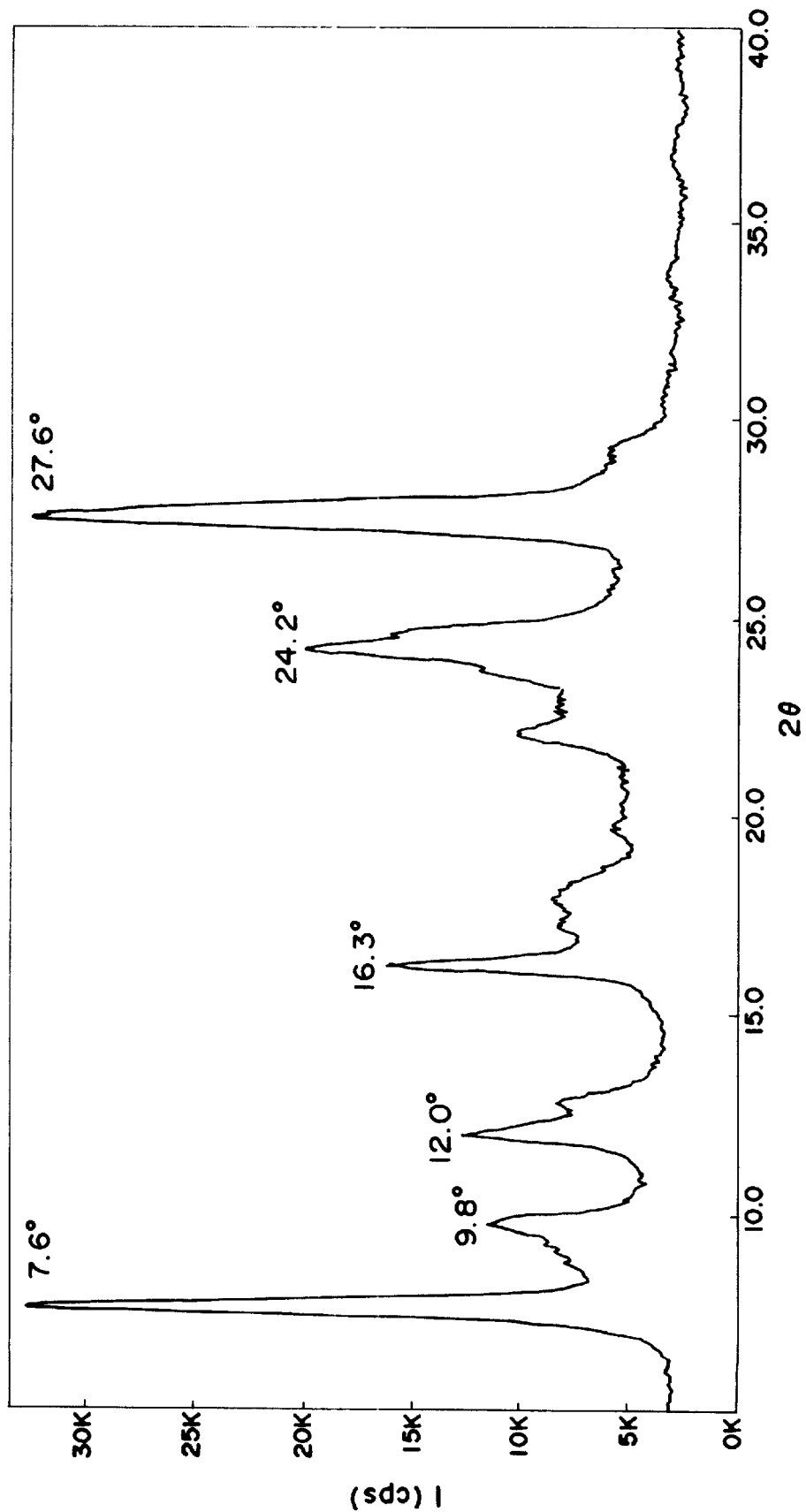

0.3 part of the crystal obtained in Example 2, 10 parts of N,N-dimethylformamide and 10 parts of 1 mm-dia. glass beads were dispersed for 24 hours in a paint shaker, followed by filtration, washing with methanol and drying to recover a crystal, which was found to comprise iodogallium phthalocyanine (c) with an X-ray diffraction pattern shown in FIG. 14.

EXAMPLE 13

Figure 15:
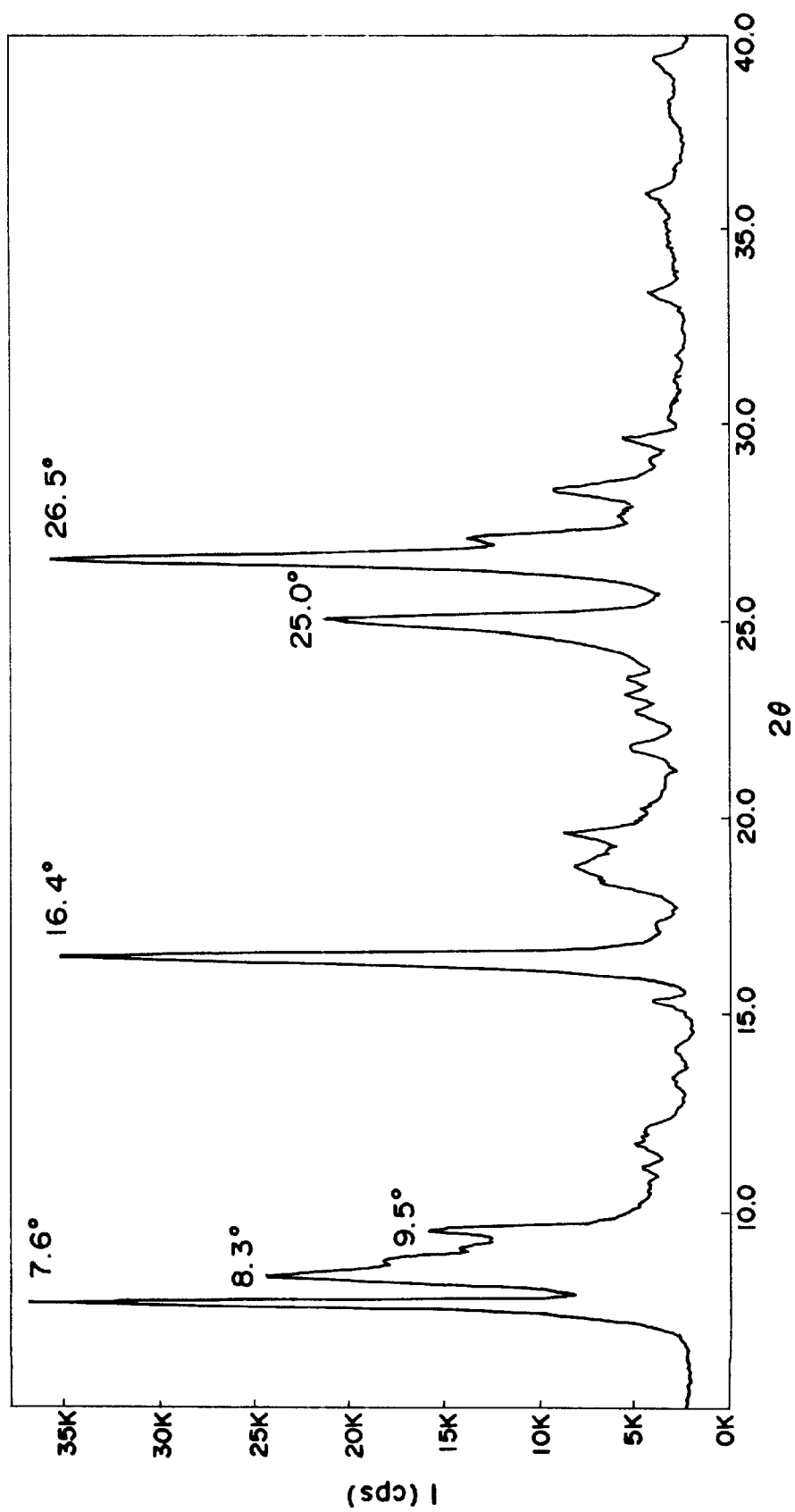

0.3 part of the crystal obtained in Example 2, 10 parts of N,N-diethylaniline and 10 parts of 1 mm-dia. glass beads were dispersed for 24 hours in a paint shaker, followed by filtration, washing with methanol and drying to recover a crystal, which was found to comprise iodogallium phthalocyanine (d) with an X-ray diffraction pattern shown in FIG. 15.

EXAMPLE 14

Figure 16:
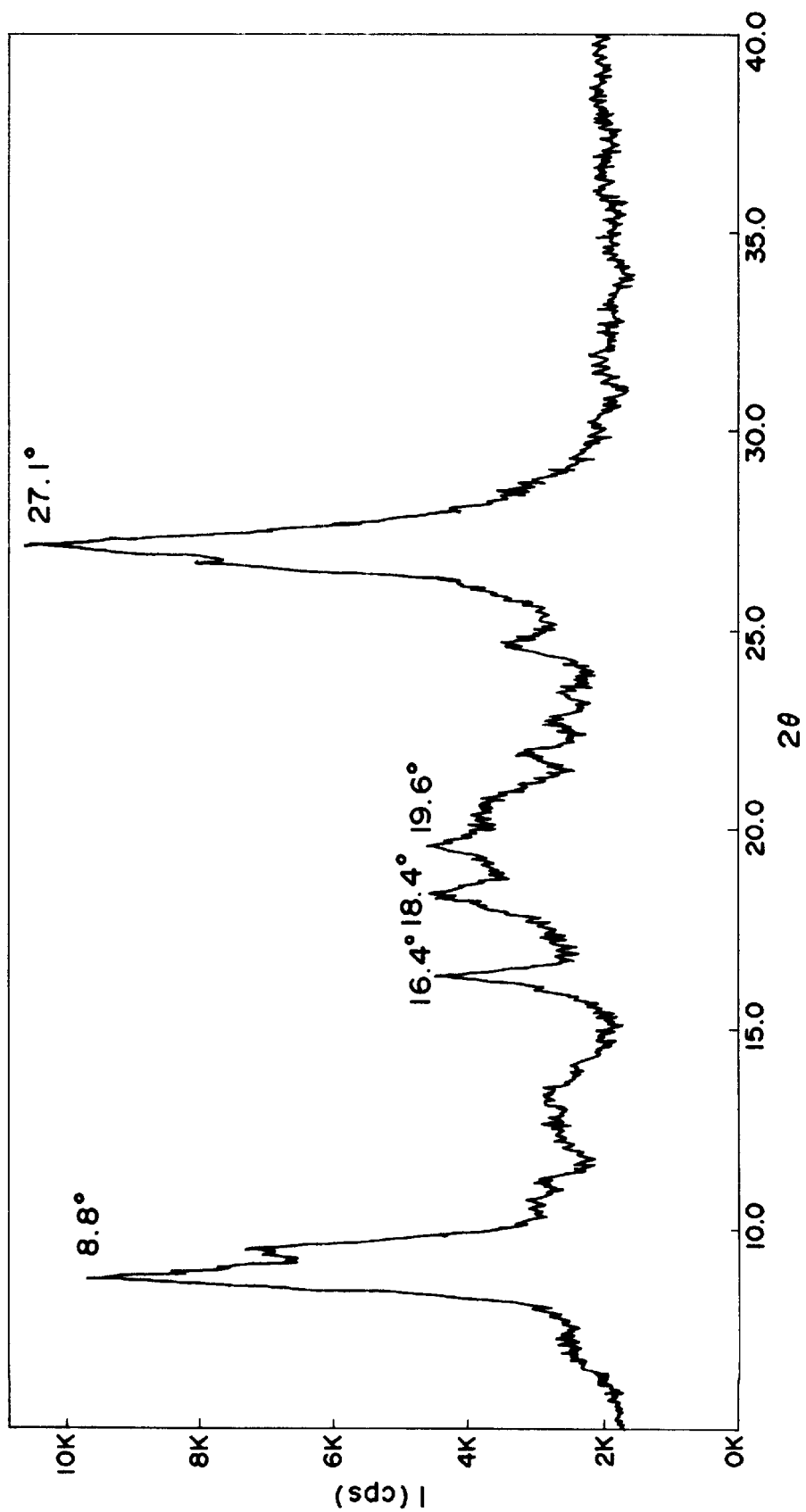

3 parts of the crystal obtained in Example 1 and 120 parts of 1 mm-dia. glass beads were dispersed for 24 hours in a paint shaker, followed by an ultrasonic treatment in water, filtration and drying to obtain a crystal, which was found to comprise iodogallium phthalocyanine (e) with an X-ray diffraction pattern of FIG. 16.

EXAMPLE 15

Figure 17:
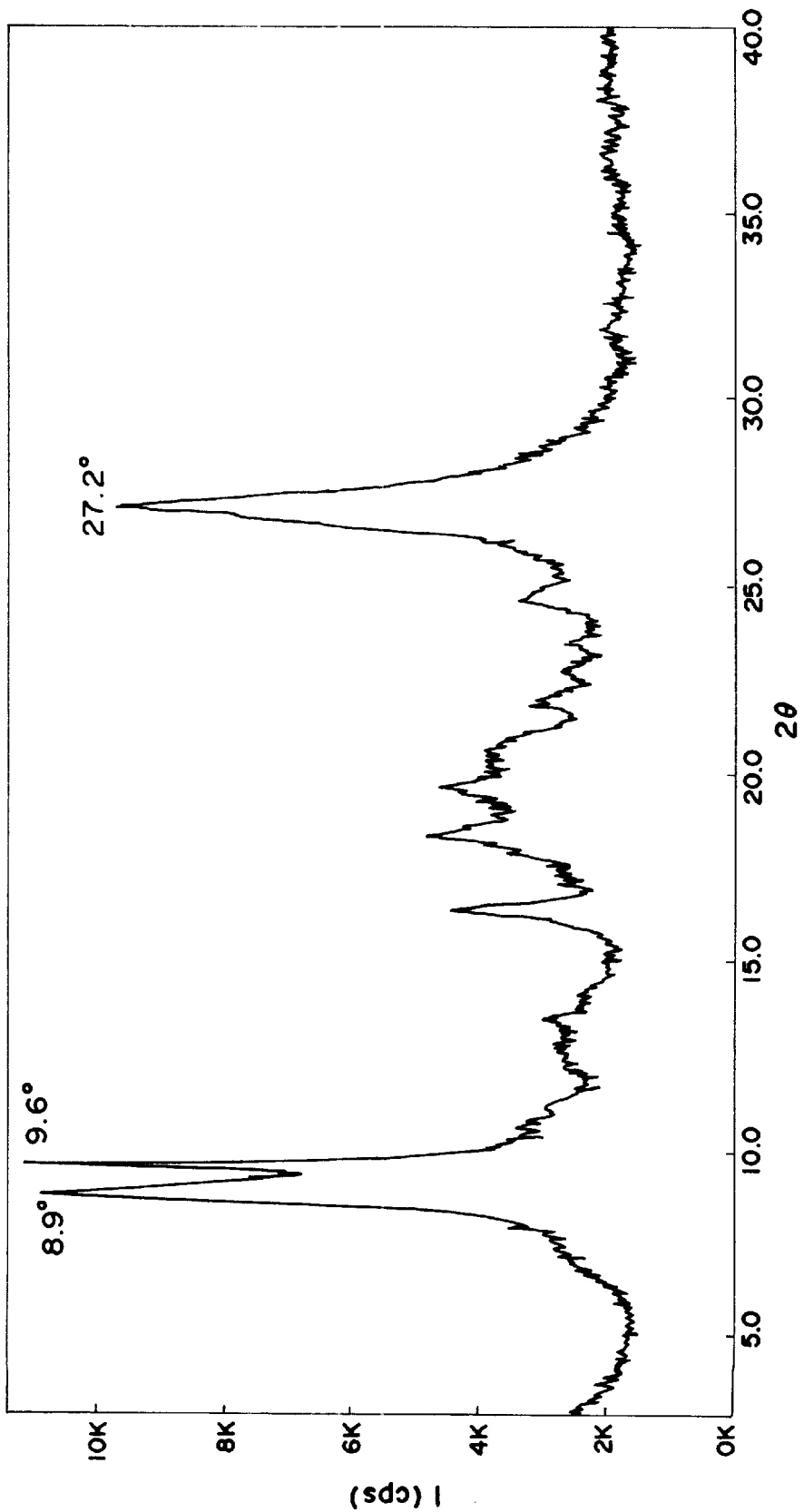

3 parts of the crystal obtained in Example 1 and 120 parts of 1 nm-dia. glass beads were dispersed for 72 hours in a paint shaker, followed by an ultrasonic treatment in water filtration and drying to obtain a crystal, which was found to comprise iodogallium phthalocyanine (e) with an X-ray diffraction pattern of FIG. 17.

EXAMPLE 16

Figure 18:
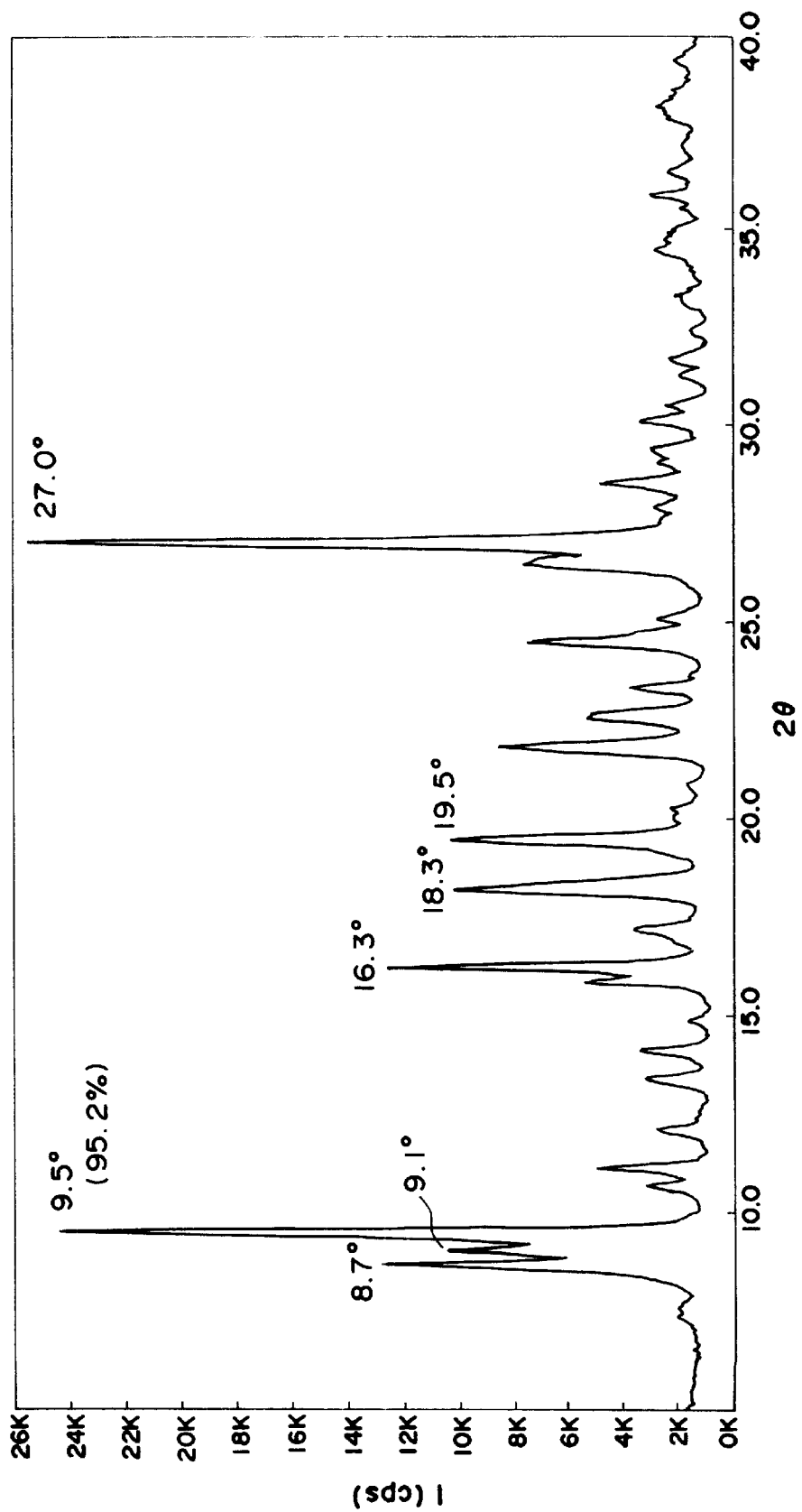

0.3 part of the crystal obtained in Example 14, 10 parts of tetrahydrofuran and 10 parts of 1 mm-dia. glass beads were dispersed for 24 hours in a paint shaker, followed by filtration, washing with methanol and drying to recover a crystal, which was found to comprise iodogallium phthalocyanine (b) with an X-ray diffraction pattern shown in FIG. 18.

The crystal also exhibited the following elementary analysis results ($C_{32}H_{16}N_8GaI$):

|  | C (%) | H (%) | N (%) |
|---|---|---|---|
| Calculated value | 54.20 | 2.27 | 15.80 |
| Measured value | 56.04 | 2.29 | 16.05 |

EXAMPLE 17

Figure 19:
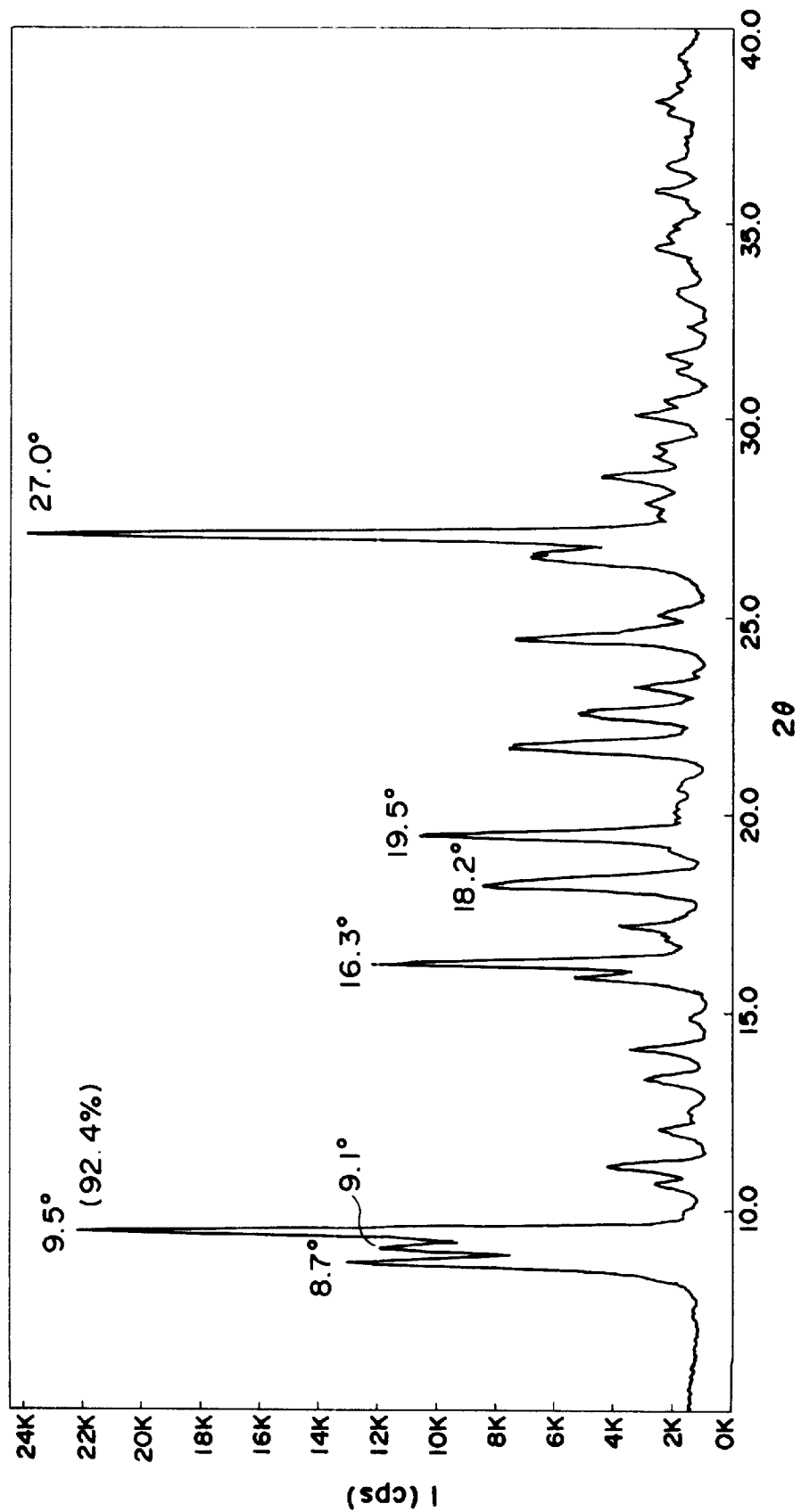

0.3 part of the crystal obtained in Example 14, 10 parts of chloroform and 10 parts of 1 mm-dia. glass beads were dispersed for 24 hours in a paint shaker, followed by filtration, washing with methanol and drying to recover a crystal, which was found to comprise iodogallium phthalocyanine (b) with an X-ray diffraction pattern shown in FIG. 19.

EXAMPLE 18

Figure 20:
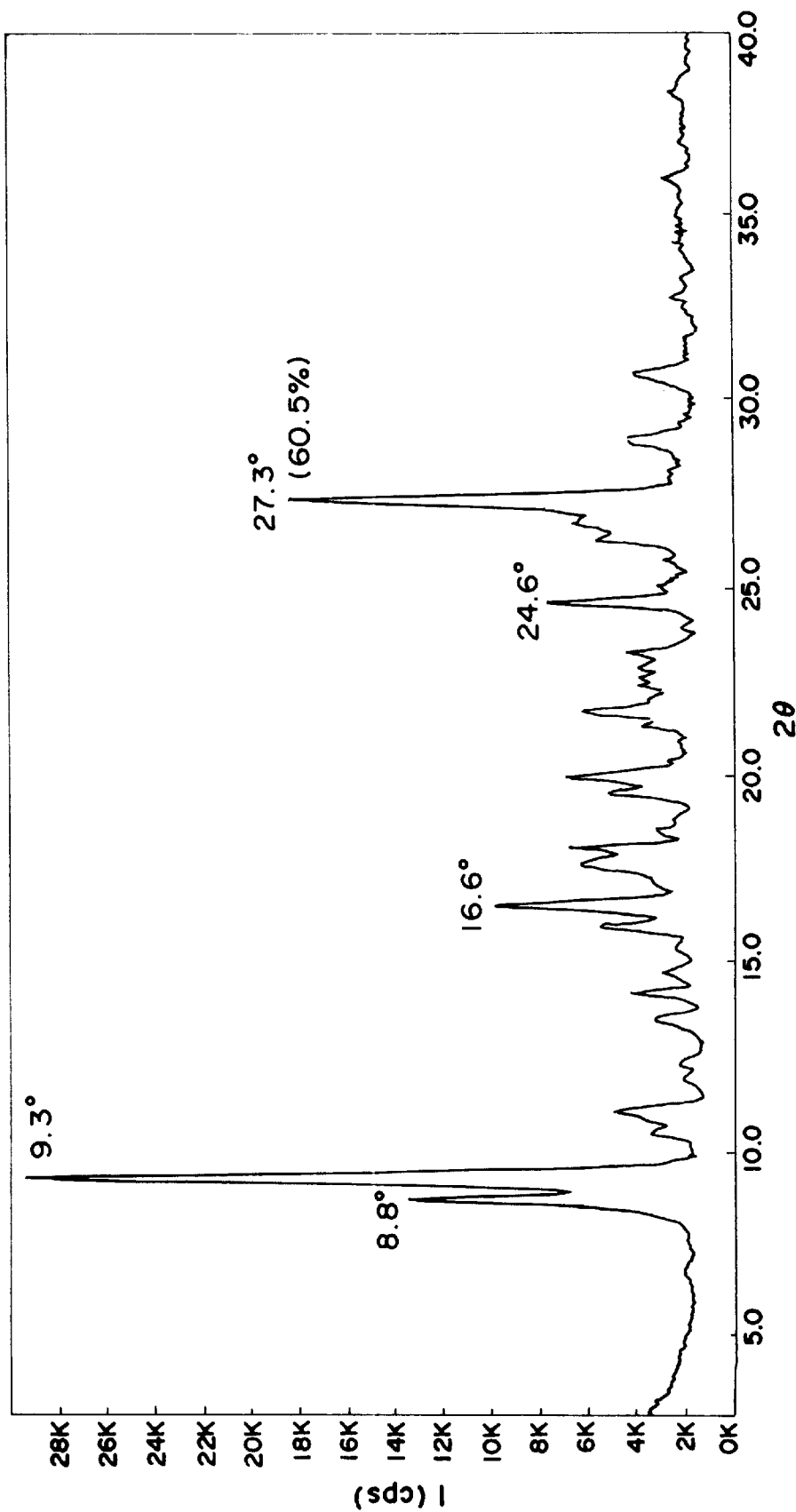

0.3 part of the crystal obtained in Example 14, 10 parts of methanol and 10 parts of 1 mm-dia. glass beads were dispersed for 24 hours in a paint shaker, followed by filtration, washing with methanol and drying to recover a crystal, which was found to comprise iodogallium phthalocyanine (b) with an X-ray diffraction pattern shown in FIG. 20.

EXAMPLE 19

Figure 21:
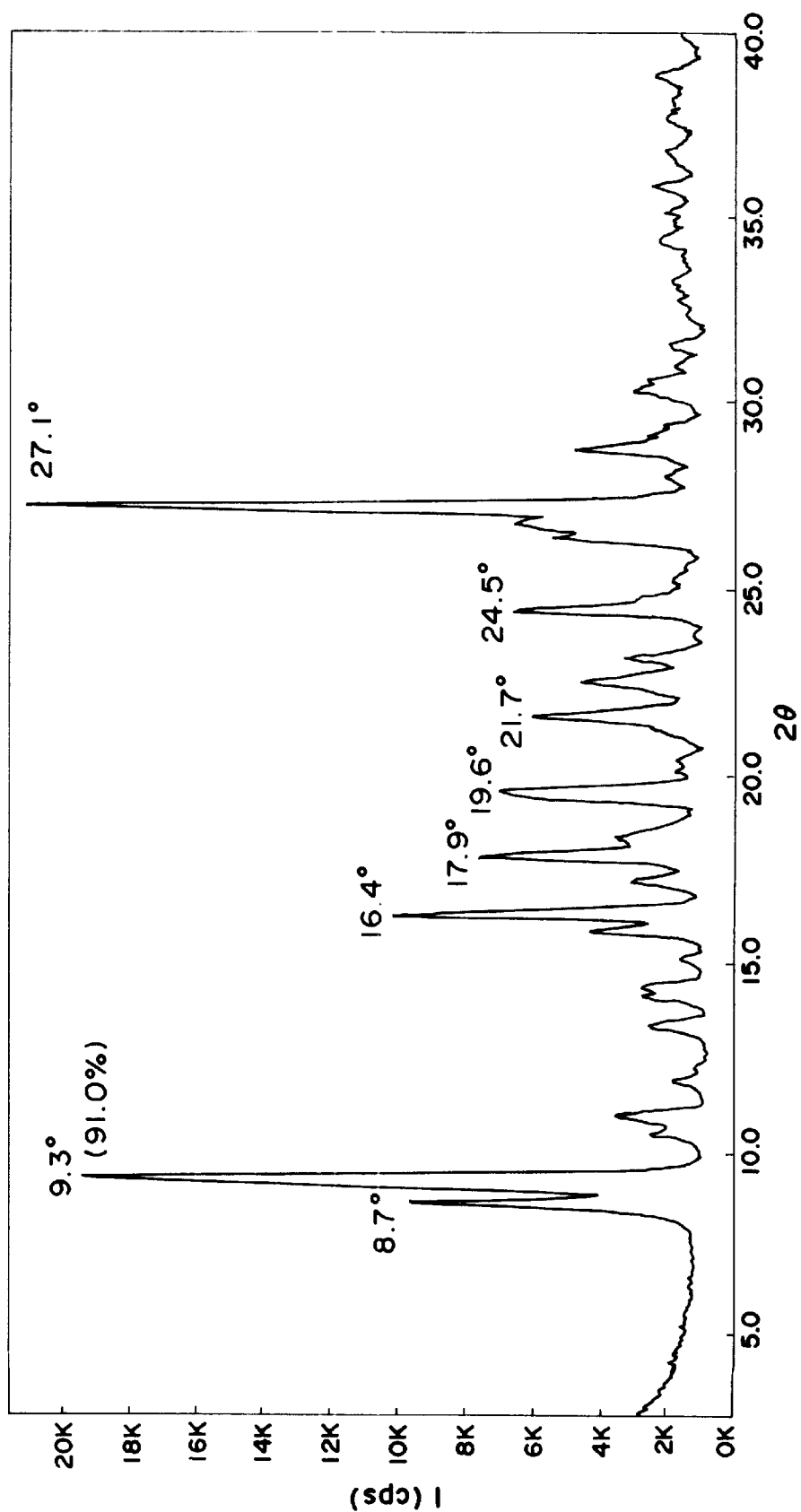

0.3 part of the crystal obtained in Example 15, 10 parts of methanol and 10 parts of 1 mm-dia. glass beads were dispersed for 24 hours in a paint shaker, followed by filtration, washing with methanol and drying to recover a crystal, which was found to comprise iodogallium phthalocyanine (b) with an X-ray diffraction pattern shown in FIG. 21.

EXAMPLE 20

Figure 22:
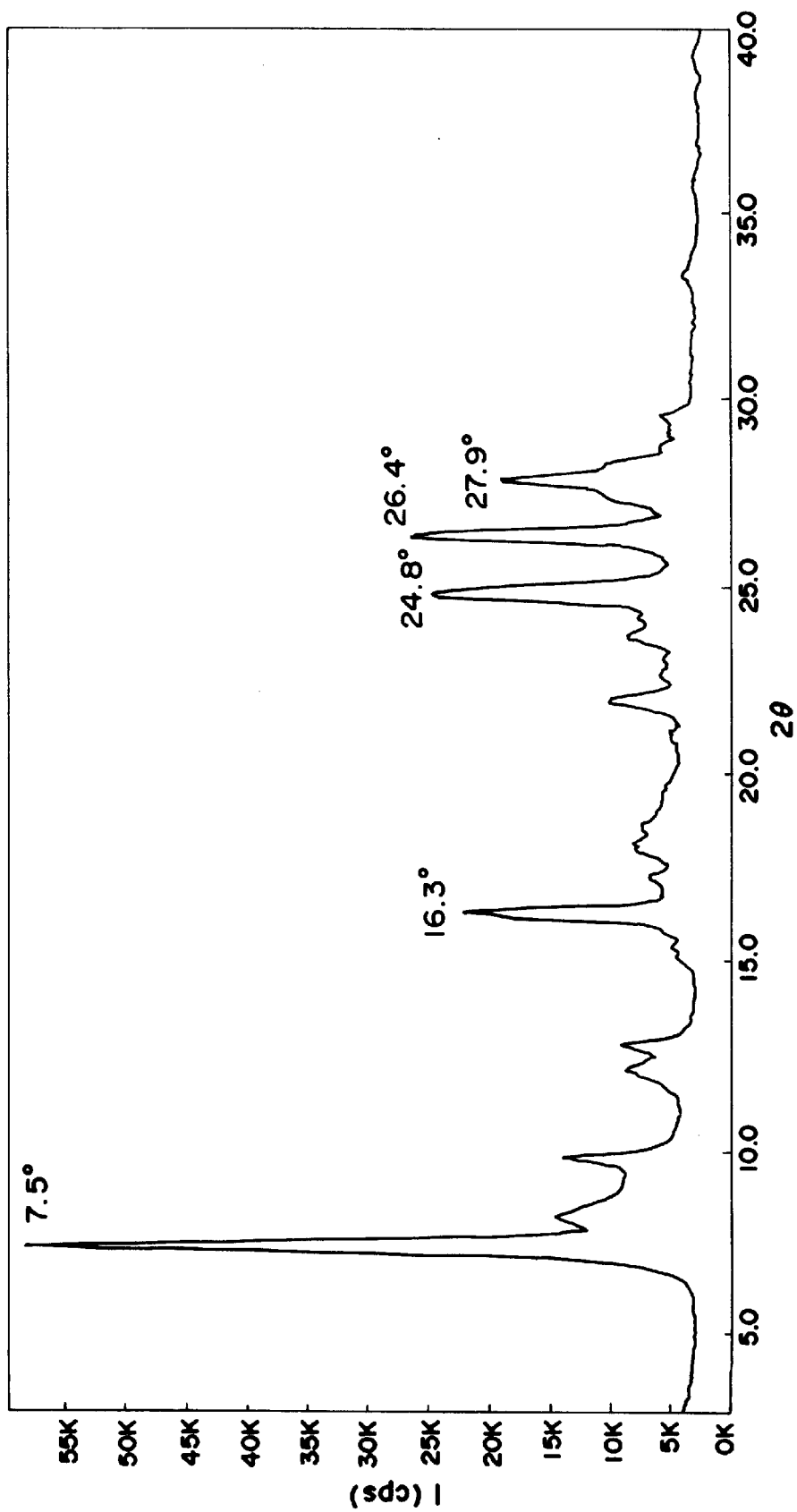

0.3 part of the crystal obtained in Example 14, 10 parts of N,N-dimethylaniline and 10 parts of 1 mm-dia. glass beads were dispersed for 24 hours in a paint shaker, followed by filtration, washing with methanol and drying to recover a crystal, which was found to comprise iodogallium phthalocyanine (d) with an X-ray diffraction pattern shown in FIG. 22.

EXAMPLE 21

Figure 23:
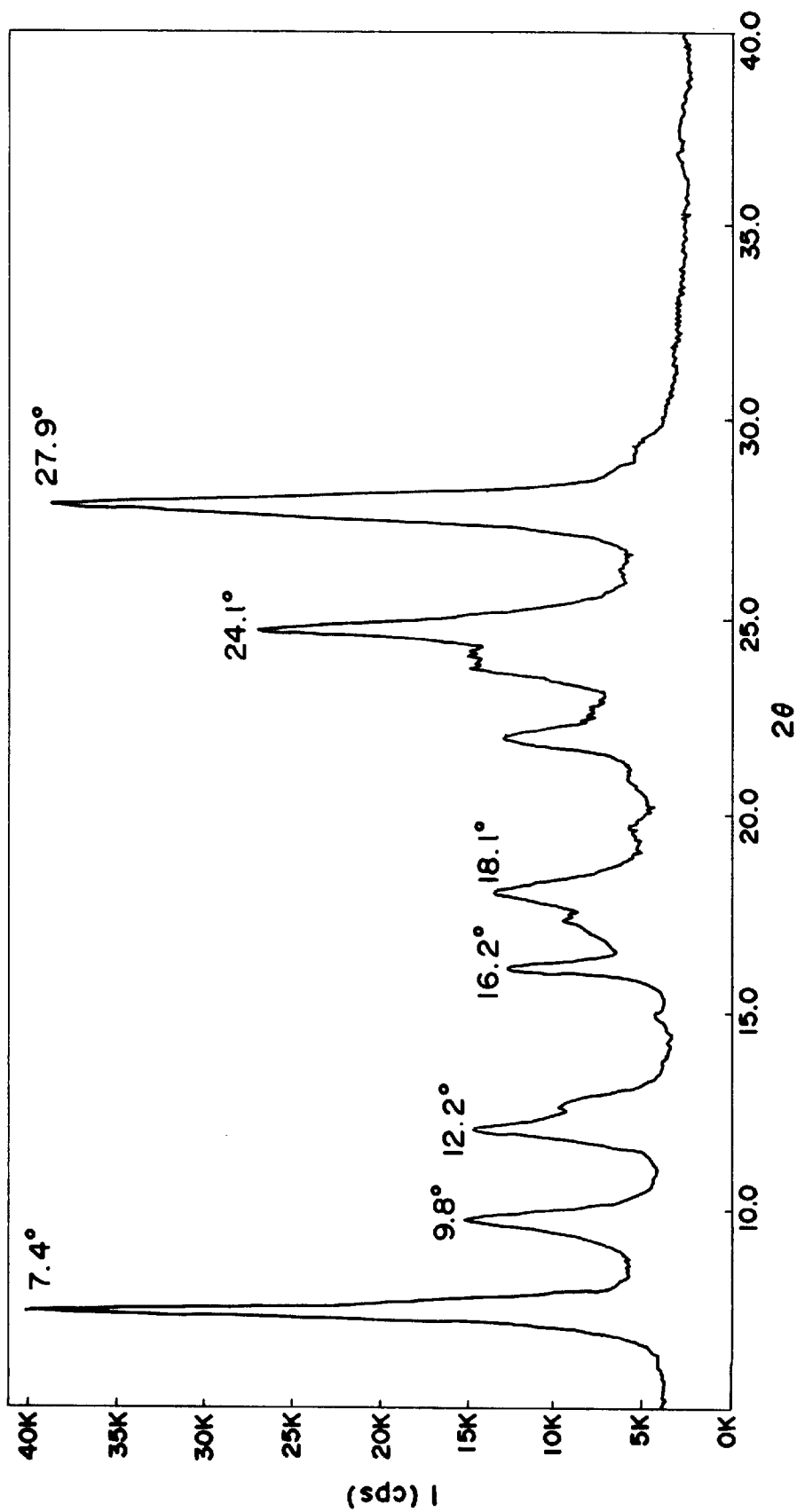

0.3 part of the crystal obtained in Example 14, 10 parts of N,N-dimethylformamide and 10 parts of 1 mm-dia. glass beads were dispersed for 24 hours in a paint shaker, followed by filtration, washing with methanol and drying to recover a crystal, which was found to comprise iodogallium phthalocyanine (c) with an X-ray diffraction pattern shown in FIG. 23.

The crystal also exhibited the following elementary analysis results ($C_{32}H_{16}N_8GaI$):

|  | C (%) | H (%) | N (%) |
|---|---|---|---|
| Calculated value | 54.20 | 2.27 | 15.80 |
| Measured value | 54.34 | 2.63 | 15.01 |

EXAMPLE 22

Figure 24:
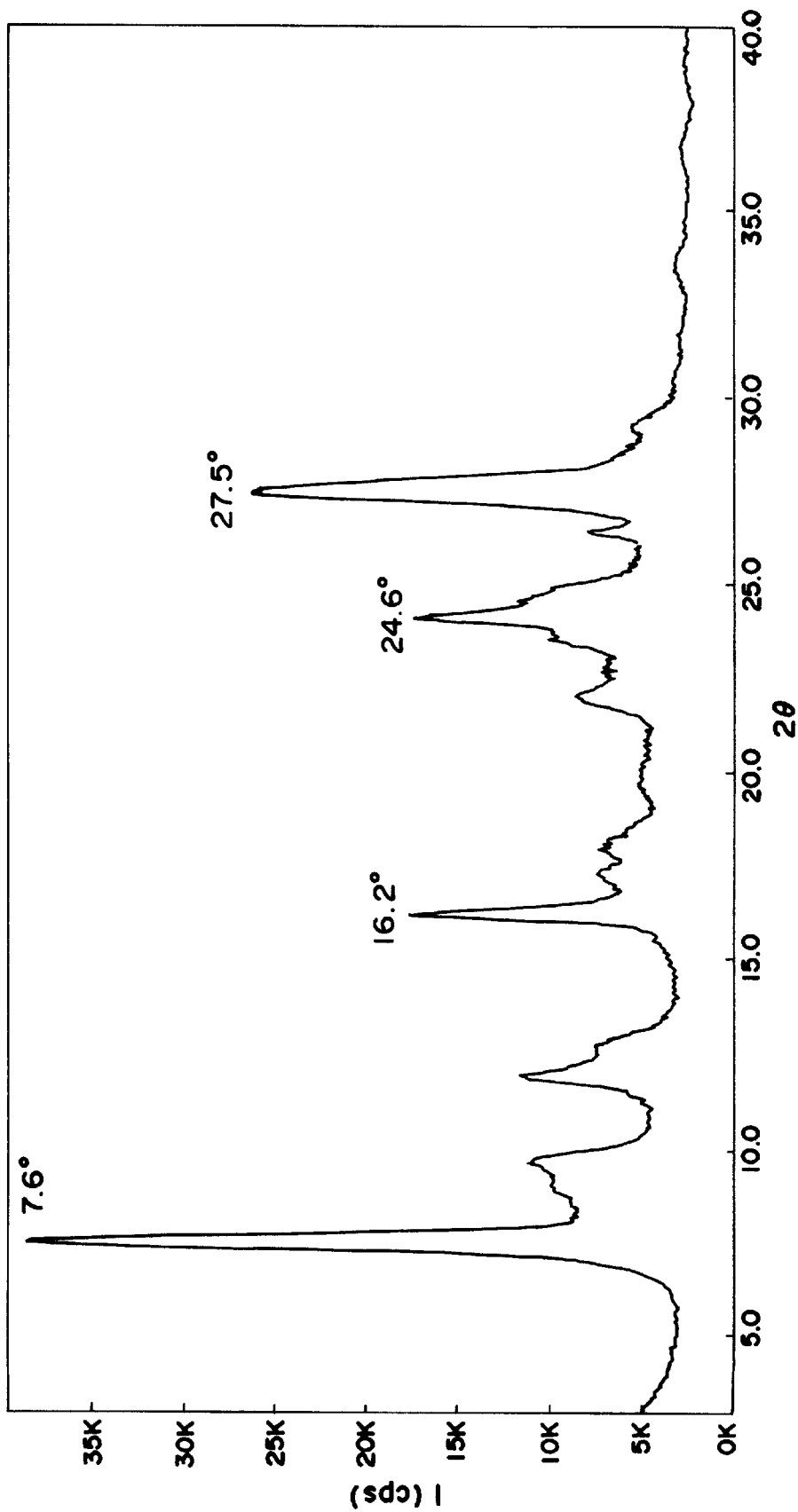

0.3 part of the crystal obtained in Example 15, 10 parts of N,N-dimethylformamide and 10 parts of 1 mm-dia. glass beads were dispersed for 24 hours in a paint shaker, followed by filtration, washing with methanol and drying to recover a crystal, which was found to comprise iodogallium phthalocyanine (c) with an X-ray diffraction pattern shown in FIG. 24.

EXAMPLE 23

Figure 25:
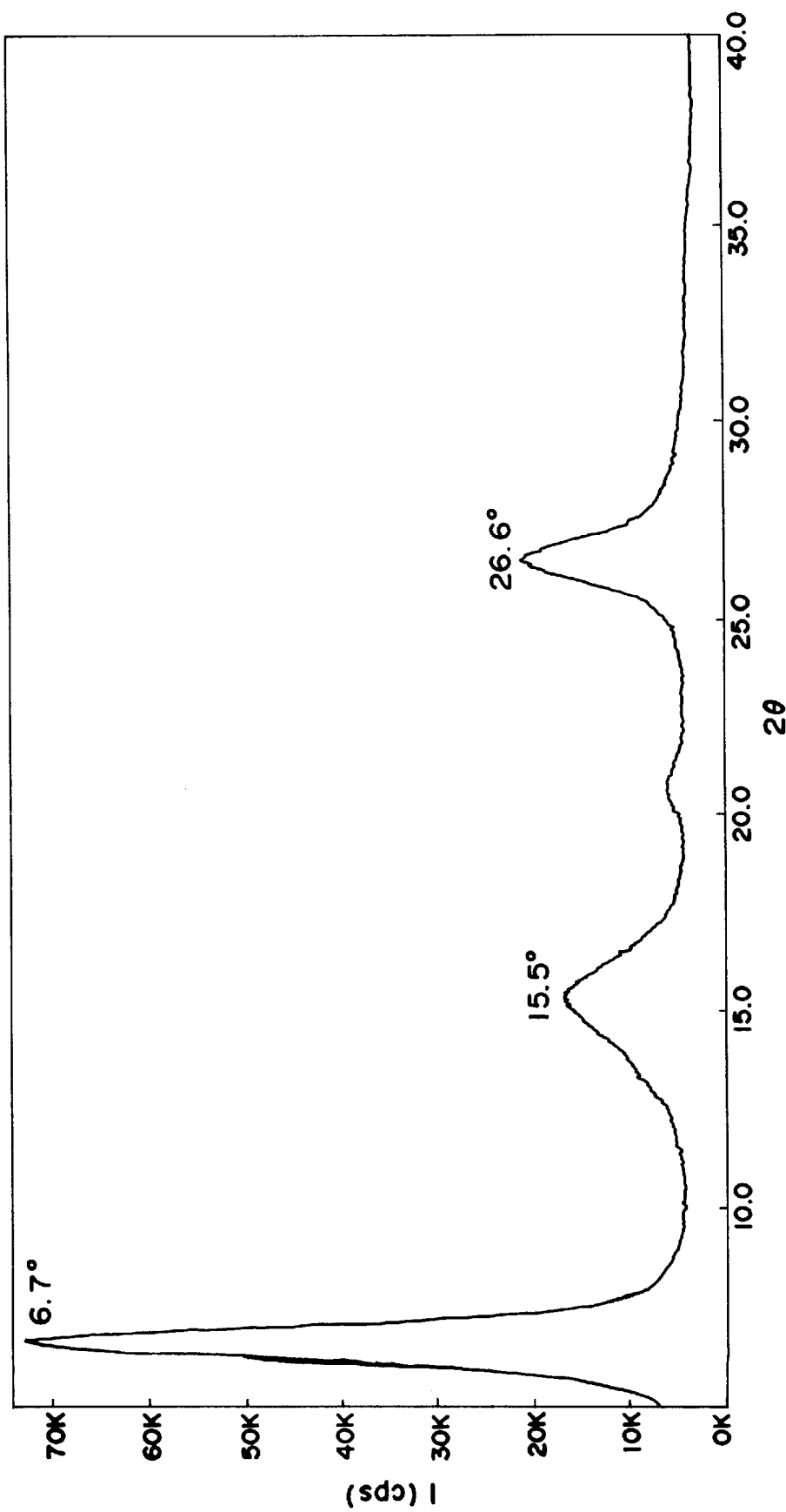
Figure 26:
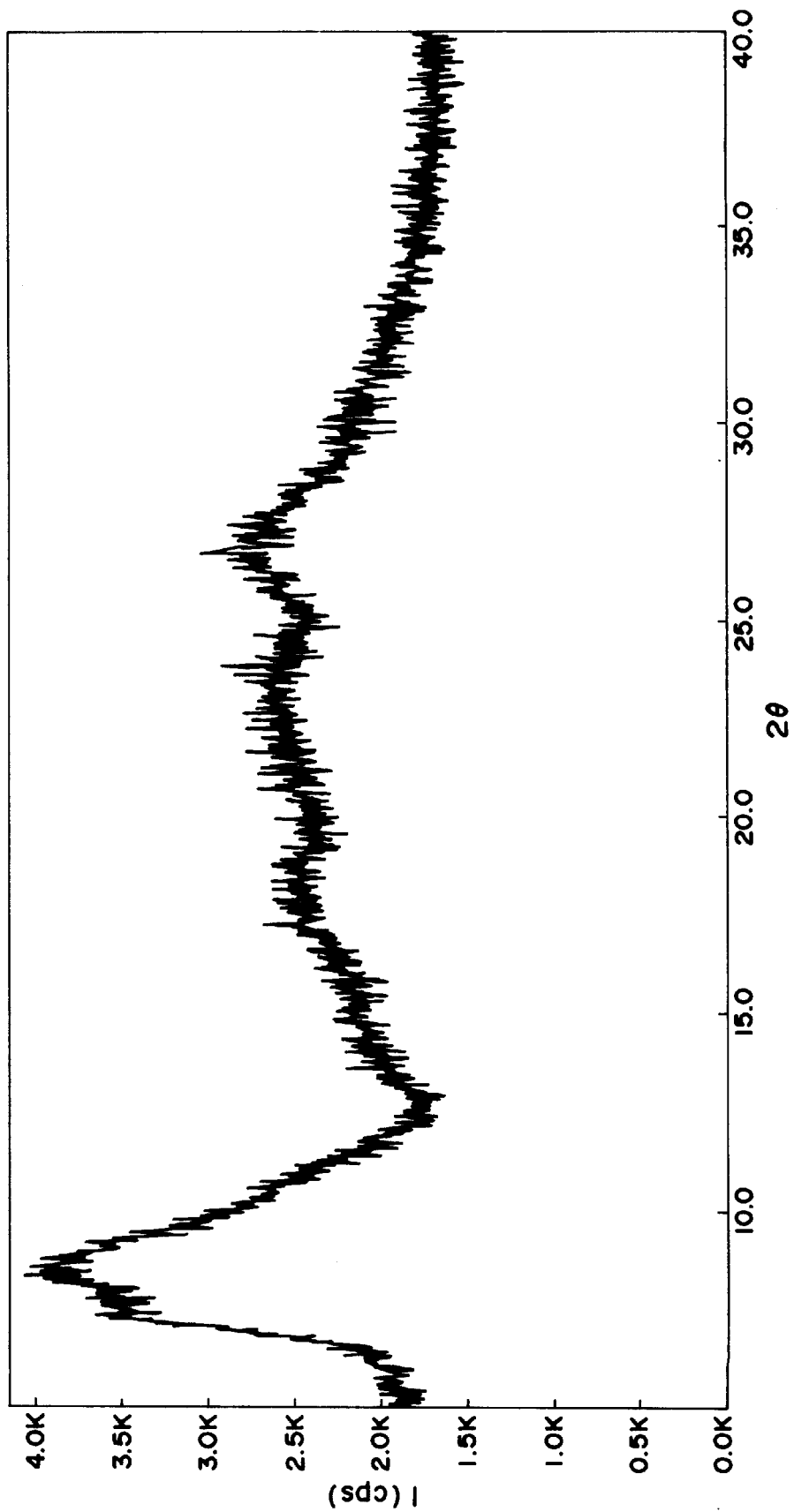

0.3 part of hydroxygallium phthalocyanine (with an X-ray diffraction pattern of FIG. 25), 10 parts of 1N-hydroiodic acid aqueous solution and 10 parts of 1 mm-dia. glass beads were dispersed for 24 hours in a paint shaker, followed by filtration, washing with methanol and drying to recover a solid, which was found to comprise amorphous iodogallium phthalocyanine with an X-ray diffraction pattern shown in FIG. 26.

EXAMPLE 24

Figure 27:
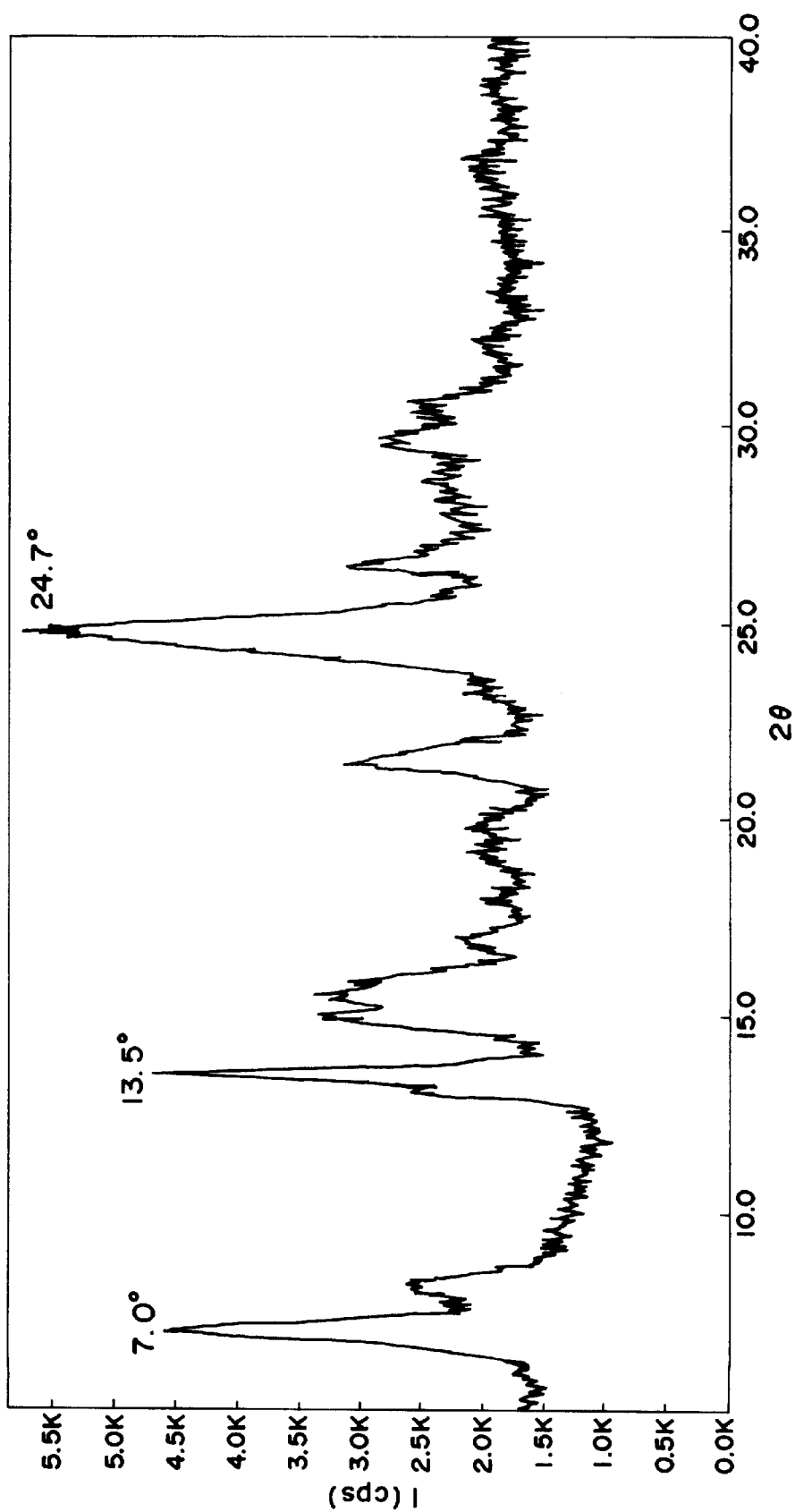

0.3 part of hydroxygallium phthalocyanine (with an X-ray diffraction pattern of FIG. 25), 10 parts of 2N-hydroiodic acid aqueous solution and 10 parts of 1 mm-dia. glass beads were dispersed for 24 hours in a paint shaker, followed by filtration, washing with methanol and drying to recover a solid, which was found to comprise amorphous iodogallium phthalocyanine with an X-ray diffraction pattern shown in FIG. 27.

EXAMPLE 25

Figure 28:
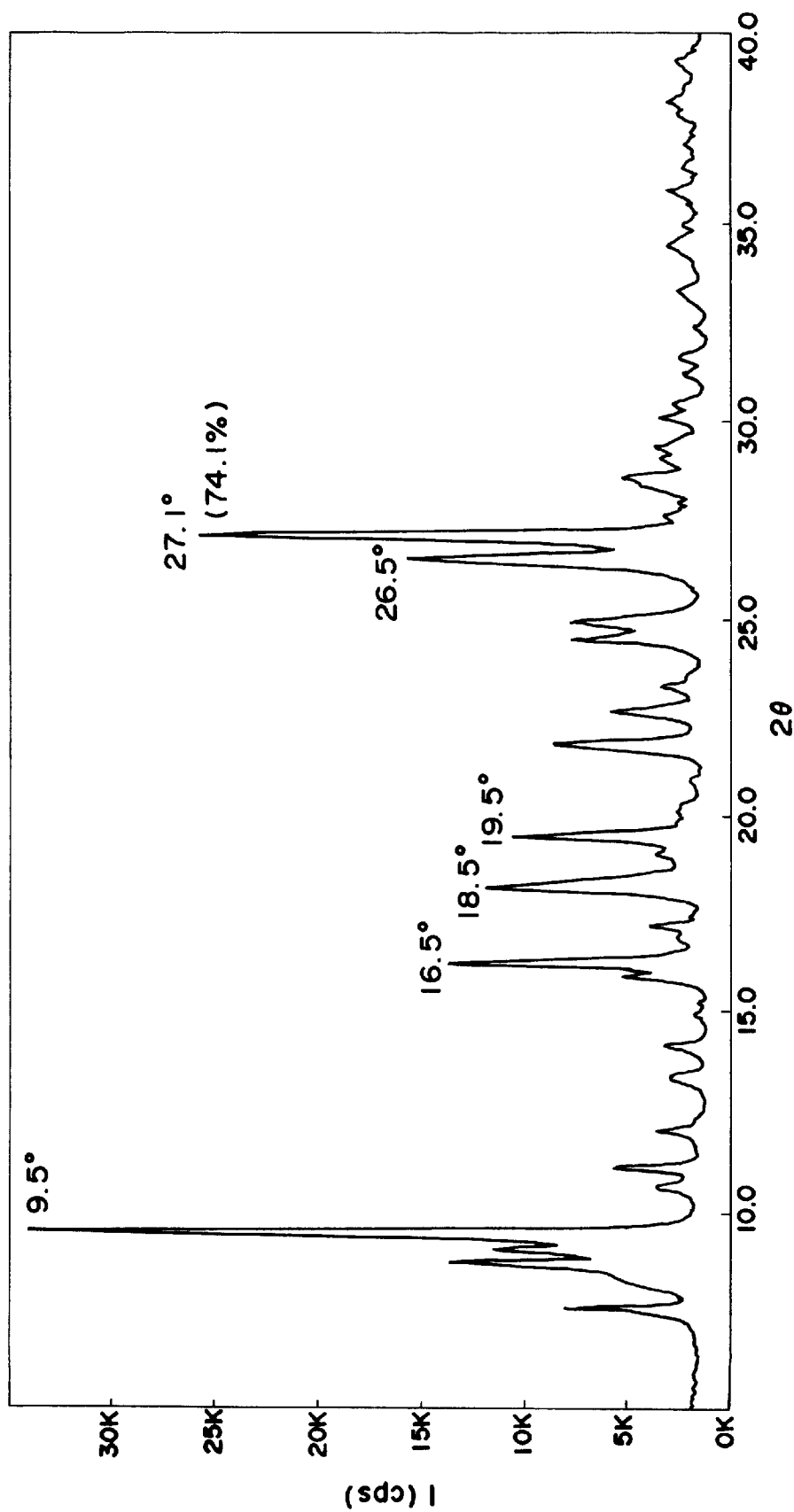

0.3 part of the crystal obtained in Example 23, 10 parts of tetrahydrofuran and 10 parts of 1 mm-dia. glass beads were dispersed for 24 hours in a paint shaker, followed by filtration, washing with methanol and drying to recover a crystal, which was found to comprise iodogallium phthalocyanine (b) with an X-ray diffraction pattern shown in FIG. 28.

The crystal also exhibited the following elementary analysis results ($C_{32}H_{16}N_8GaI$):

|  | C (%) | H (%) | N (%) |
|---|---|---|---|
| Calculated value | 54.20 | 2.27 | 15.80 |
| Measured value | 54.41 | 2.58 | 18.92 |

EXAMPLE 26

Figure 29:
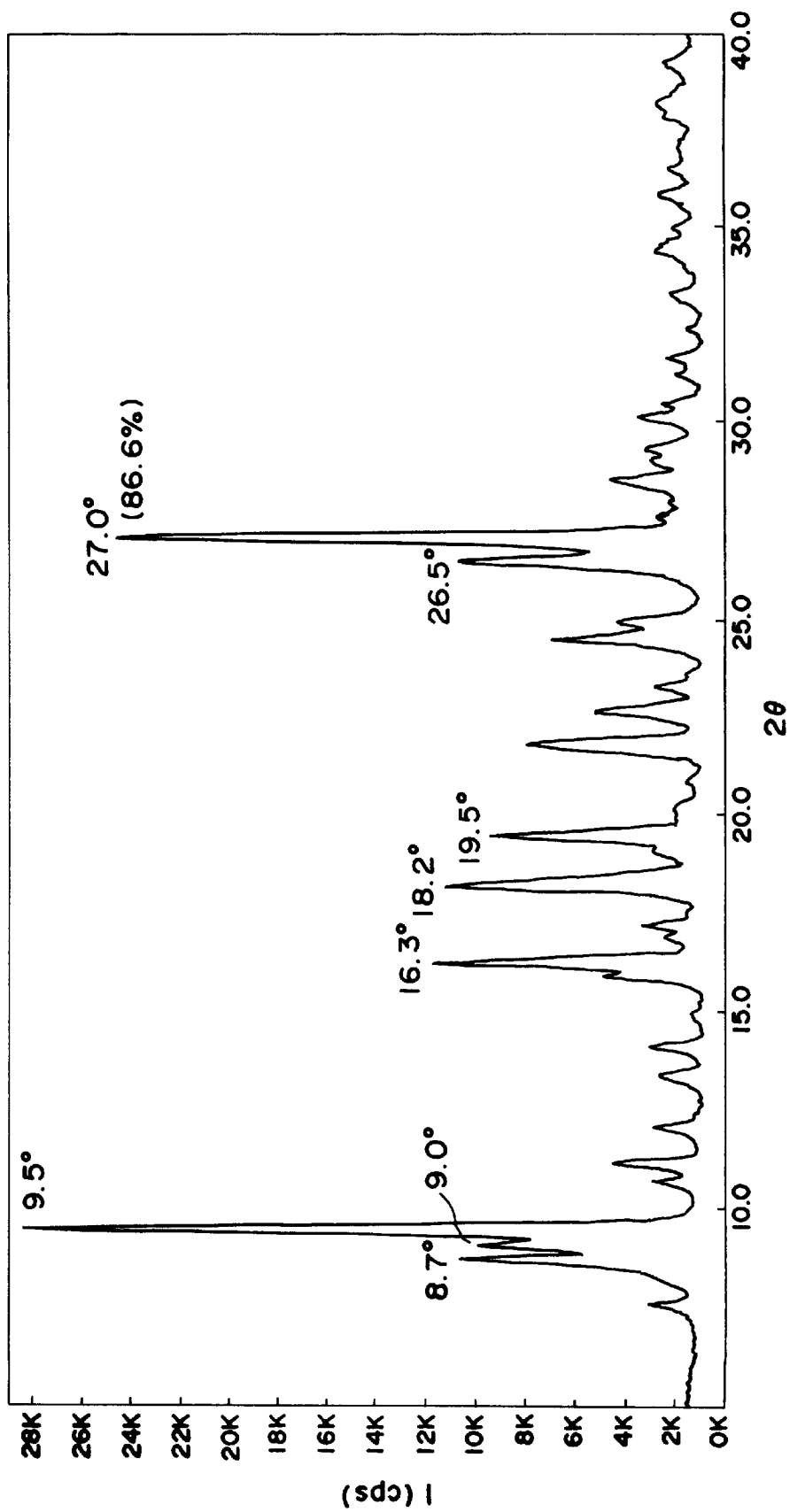

0.3 part of the crystal obtained in Example 24, 10 parts of tetrahydrofuran and 10 parts of 1 mm-dia. glass beads were dispersed for 24 hours in a paint shaker, followed by filtration, washing with methanol and drying to recover a crystal, which was found to comprise iodogallium phthalocyanine (b) with an X-ray diffraction pattern shown in FIG. 29.

EXAMPLE 27

Figure 30:
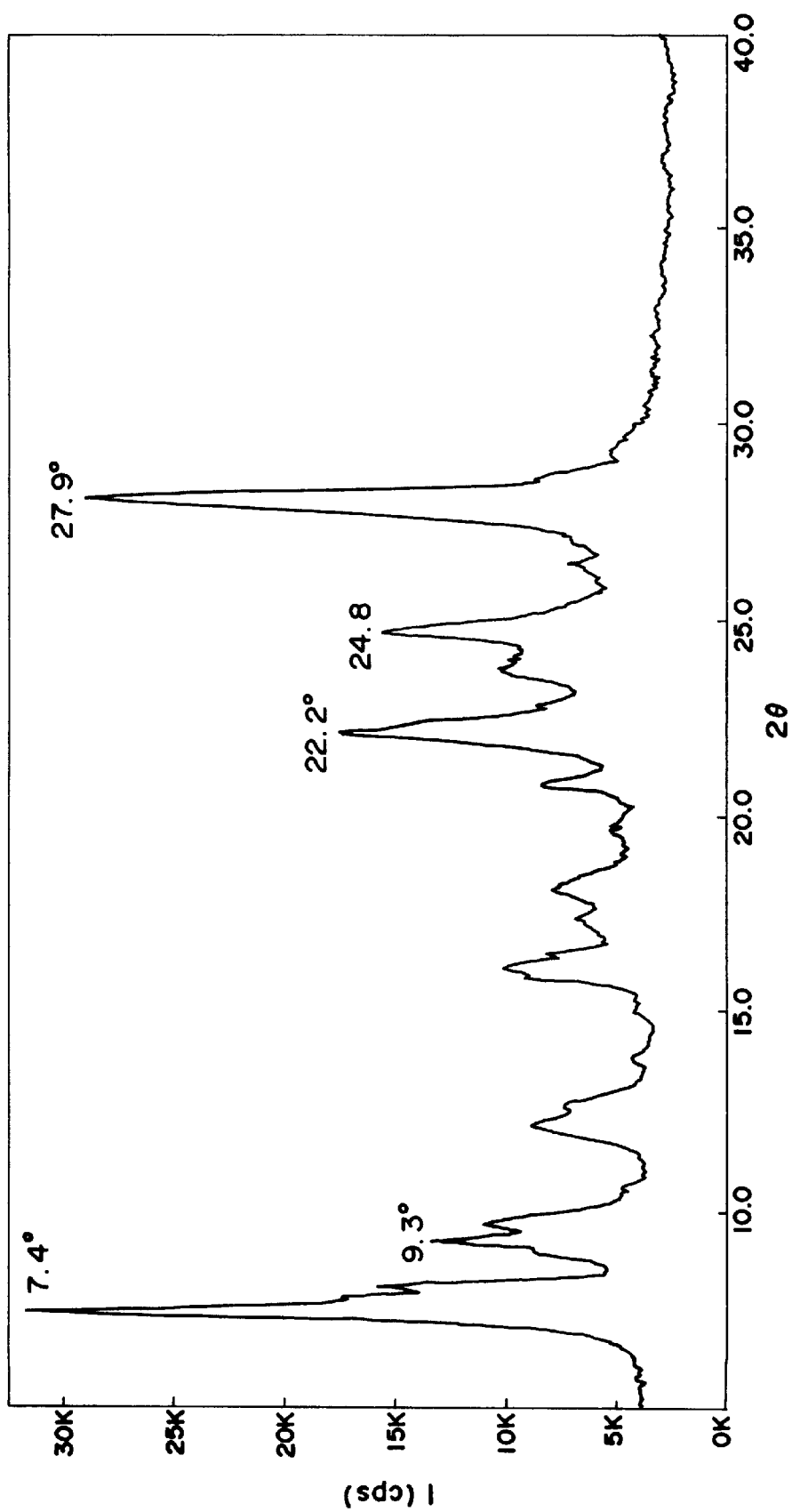

0.3 part of the crystal obtained in Example 23, 10 parts of N,N-dimethylformamide and 10 parts of 1 mi-dia. glass beads were dispersed for 24 hours in a paint shaker, followed by filtration, washing with methanol and drying to recover a crystal, which was found to comprise iodogallium phthalocyanine (c) with an X-ray diffraction pattern shown in FIG. 30.

EXAMPLE 28

Figure 31:
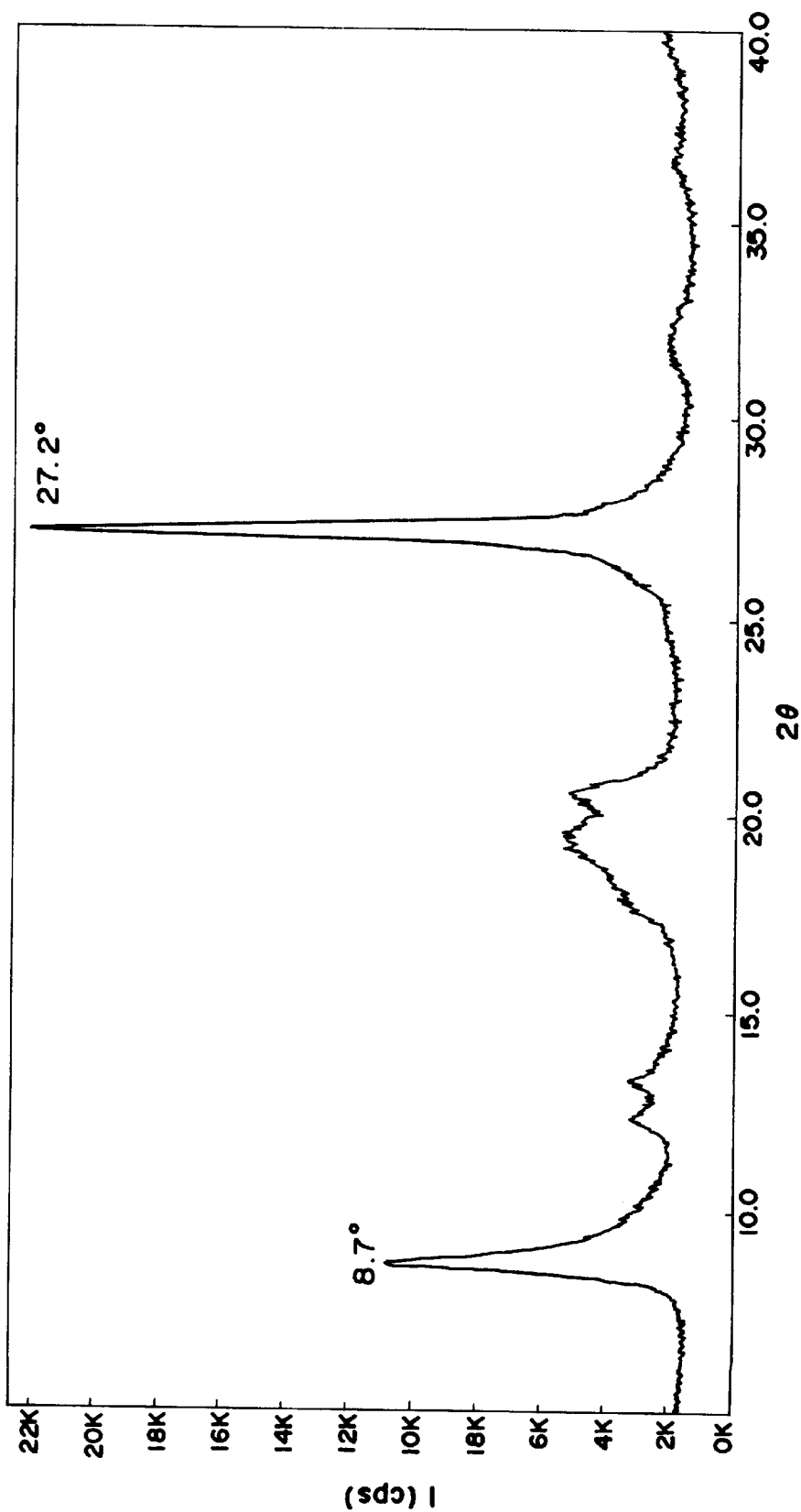

3 parts of the crystal obtained in Example 23 was stirred in 100 parts of water, followed by filtration, washing with methanol and drying to recover a crystal, which was found to comprise iodogallium phthalocyanine (e) with an X-ray diffraction pattern shown in FIG. 31.

Hereinbelow, some examples for preparation of electrophotographic photosensitive members by using iodogallium phthalocyanines prepared above will be described.

EXAMPLE 29

An aluminum substrate was coated with a solution of 5 g of methoxymethylated nylon resin (Mw (weight–average molecular weight)=$3.2 \times 10^4$) and 10 g of alcohol-soluble copolymer nylon (Mw=$2.9 \times 10^4$) in 95 g of methanol by using a wire bar and dried to form a 1 µm-thick undercoating layer.

Then, 3 parts of the iodogallium phthalocyanine (a) prepared in Example 1 was added to a solution of 2 parts of polyvinylbutyral in 60 parts of cyclohexanone, and the mixture was dispersed together with 100 parts of 1 mm-dia. glass beads for 3 hours in a sand mill. The resultant dispersion was further diluted with 100 parts of ethyl acetate, and applied by a wire bar over the undercoating layer, followed by drying to form a 0.2 µm-thick charge generation layer.

Then, a solution of 5 parts of a triarylamine compound of the following formula:

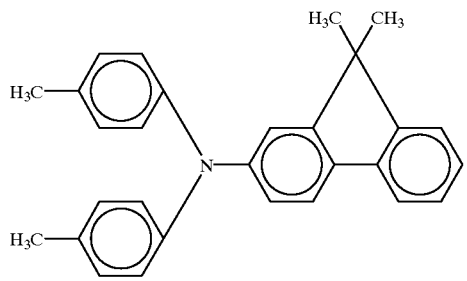

and 5 parts of polycarbonate resin ("Z-200" (trade name), mfd. by Mitsubishi Kagaku K.K.) in 35 parts of chlorobenzene was applied by a wire bar onto the charge generation layer and dried to form a 18 µm-thick charge transport layer, thereby providing an electrophotographic photosensitive member.

EXAMPLES 30–39

Electrophotographic photosensitive members were prepared in the same manner as in Example 29 except for using iodogallium phthalocyanines prepared in the respective Examples shown in Table 1 below as charge generation materials instead of iodogallium phthalocyanine (a) prepared in Example 1.

COMPARATIVE Example 1

An electrophotographic photosensitive member was prepared in the same manner as in Example 29 except for using ε-form copper phthalocyanine as a charge generation material instead of iodogallium phthalocyanine (a) prepared in Example 1.

COMPARATIVE EXAMPLE 2

An electrophotographic photosensitive member was prepared in the same manner as in Example 29 except for using hydroxygallium phthalocyanine (with an X-ray diffraction pattern of FIG. 25) as a charge generation material instead of iodogallium phthalocyanine (a) prepared in Example 1.

Each of the above-prepared photosensitive members was applied onto an aluminum cylinder to form a photosensitive drum, which was incorporated in a laser beam printer ("LBX-SX" (trade name), mfd. by Canon K.K.) and subjected to a sensitivity measurement wherein the photosensitive member was first charged to a dark-part potential of −700 volts and illuminated with laser light at a wavelength of 802 nm, thereby measuring a light quantity required to lower the potential of −700 volts down to a light-part potential of −150 volts as a sensitivity.

The results are inclusively shown in Table 1 below.

TABLE 1

| Example | No. of photosensitive member | Iodogallium phthalocyanine (Ex. No.) | Sensitivity ($\mu J/cm^2$) |
| --- | --- | --- | --- |
| Ex. 29 | 1 | (a) (Ex. 1) | 2.10 |
| Ex. 30 | 2 | (b) (Ex. 7) | 0.90 |
| Ex. 31 | 3 | (c) (Ex. 12) | 0.90 |
| Ex. 32 | 4 | (d) (Ex. 13) | 2.20 |
| Ex. 33 | 5 | (b) (Ex. 16) | 0.85 |
| Ex. 34 | 6 | (b) (Ex. 19) | 0.70 |
| Ex. 35 | 7 | (c) (Ex. 21) | 0.31 |
| Ex. 36 | 8 | (c) (Ex. 22) | 0.52 |
| Ex. 37 | 9 | (b) (Ex. 26) | 1.95 |
| Ex. 38 | 10 | (c) (Ex. 27) | 0.42 |
| Ex. 39 | 11 | (e) (Ex. 28) | 0.64 |
| Comp. Ex. 1 | 1 | ε-Cu | 2.25 |
| Comp. Ex. 2 | 13 | Hydroxygallium phthalocyanine | ** |

**Not measurable because of poor chargeability.

Table 1 shows that each photosensitive member according to the present invention exhibited an excellent sensitivity.

EXAMPLE 40

The electrophotographic photosensitive member prepared in Example 32 was subjected to 5000 cycles of charging and exposure while setting initial dark-part potential Vd and light-part potential Vl to ca. −700 volts and ca. −150 volts respectively, thereby measuring a change in dark-part potential ΔVd and a change in light-part potential ΔV1. The results are shown in Table 2 below together with those of Examples and Comparative Example described below. In Table 2, +(plus) and −(minus) signs preceding the values of ΔVd and ΔV1 represents an increase and a decrease, respectively, in terms of absolute value of potential.

EXAMPLES 41–44

Photosensitive members (Nos. 6–7 and 10–11) prepared in Examples 34, 35, 38 and 39, respectively were subjected to the charging-exposure cycle test in the same manner as in Example 40. The results are also shown in Table 2.

COMPARATIVE EXAMPLE 3

A photosensitive member (No. 12) prepared in Comparative Example 1 was subjected to the charging-exposure cycle test in the same manner as in Example 40. The results are also shown in Table 2.

TABLE 2

| Example | No. of photosensitive member | ΔVd (V) | ΔVl (V) |
|---|---|---|---|
| Ex. 40 | 4 | −5 | −15 |
| Ex. 41 | 6 | −10 | −10 |
| Ex. 42 | 7 | 0 | 0 |
| Ex. 43 | 10 | 0 | −5 |
| Ex. 44 | 11 | −5 | −10 |
| Comp. Ex. 3 | 12 | −110 | +105 |

The results in Table 2 above show that each photosensitive member according to the present invention exhibited little potential fluctuation in repetition of electrophotographic cycles.

EXAMPLE 45

An aluminum vapor-deposited polyethylene terephthalate film was provided with a 0.5 μm-thick undercoating layer of polyvinyl alcohol on its aluminum-deposited surface and further a 0.2 μm-thick charge generation layer of the same composition as in Example 35.

Then, a solution of 5 parts of styryl compound of the following formula:

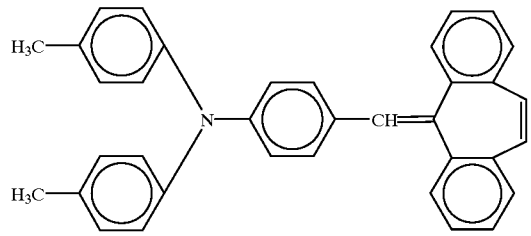

and 5 parts of polycarbonate resin ("Z-200" (trade name), mfd. by Mitsubishi Kagaku K.K.) in 40 parts of tetrahydrofuran was applied onto the charge generation layer and dried to form a 16 μm-thick charge transport layer, thereby providing an electrophotographic photosensitive member.

The thus-prepared photosensitive member was evaluated with respect to sensitivity and potential stability in the same manner as in Examples 29 and 40, whereby the following results were obtained.

Sensitivity=0.32 μJ/cm$^2$
ΔVd=0 volt
ΔV=−5 volts

EXAMPLE 46

An aluminum vapor-deposited polyethylene terephthalate film was provided with a 0.5 μm-thick undercoating layer of polyvinyl alcohol on its aluminum-deposited surface and further a 0.2 μm-thick charge generation layer of the same composition as in Example 38.

Then, a solution of 5 parts of benzidine compound of the following formula:

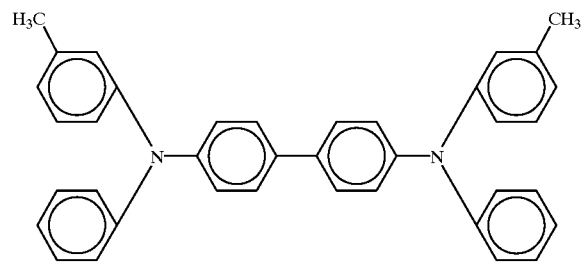

and 5 parts of polycarbonate resin ("Z-200" (trade name), mfd. by Mitsubishi Kagaku K.K.) in 40 parts of tetrahydrofuran was applied onto the charge generation layer and dried to form a 16 μm-thick charge transport layer, thereby providing an electrophotographic photosensitive member.

The thus-prepared photosensitive member was evaluated with respect to sensitivity and potential stability in the same manner as in Examples 29 and 40, whereby the following results were obtained.

Sensitivity=0.43 μJ/cm$^2$
ΔVd=0 volt
ΔVl=+10 volts

EXAMPLE 47

Figure 32:
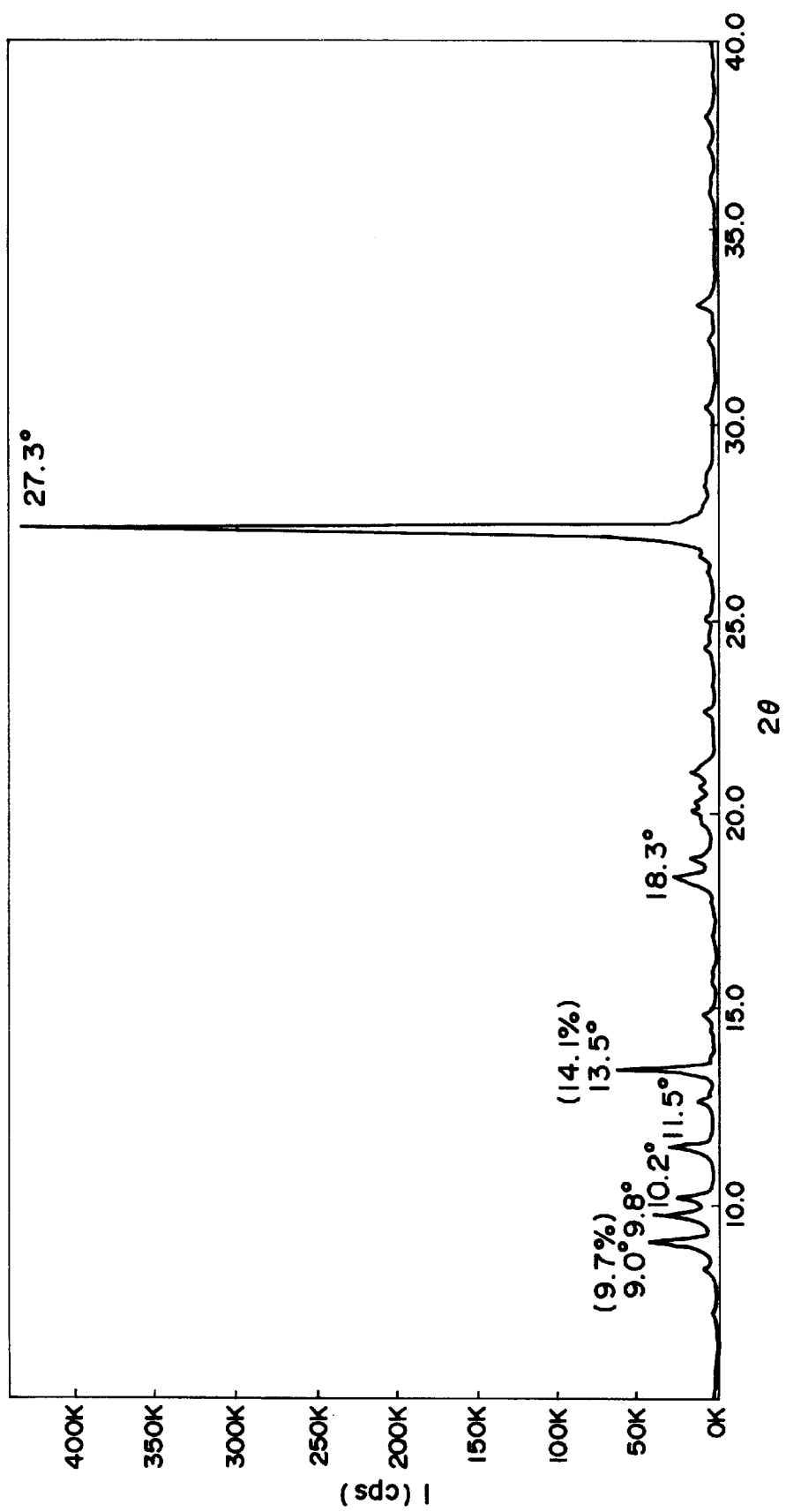
FIGS. 32–59 each show an X-ray diffraction pattern of a bromogallium phthalocyanine crystal according to the invention.

41 parts of phthalonitrile, 25 parts of gallium tribromide and 200 parts of α-chloronaphthalene were stirred for 4 hours under heating at 200° C. in a nitrogen atmosphere, followed by cooling to 130° C. and filtration. The recovered solid was washed with 200 parts of N,N-dimethylformamide at 130° C. under stirring for 2 hours, and was washed with methanol on a filter, followed by drying to recover 23 parts of a crystal, which was found to comprise bromogallium phthalocyanine (f) with an X-ray diffraction pattern shown in FIG. 32. The crystal also exhibited the following elementary analysis results ($C_{32}H_{16}N_8GaBr$):

| | C (%) | H (%) | N (%) | Br (%) |
|---|---|---|---|---|
| Calculated value | 58.05 | 2.44 | 16.92 | 12.07 |
| Measured value | 57.92 | 2.35 | 16.86 | 11.9 |

EXAMPLE 48

Figure 33:
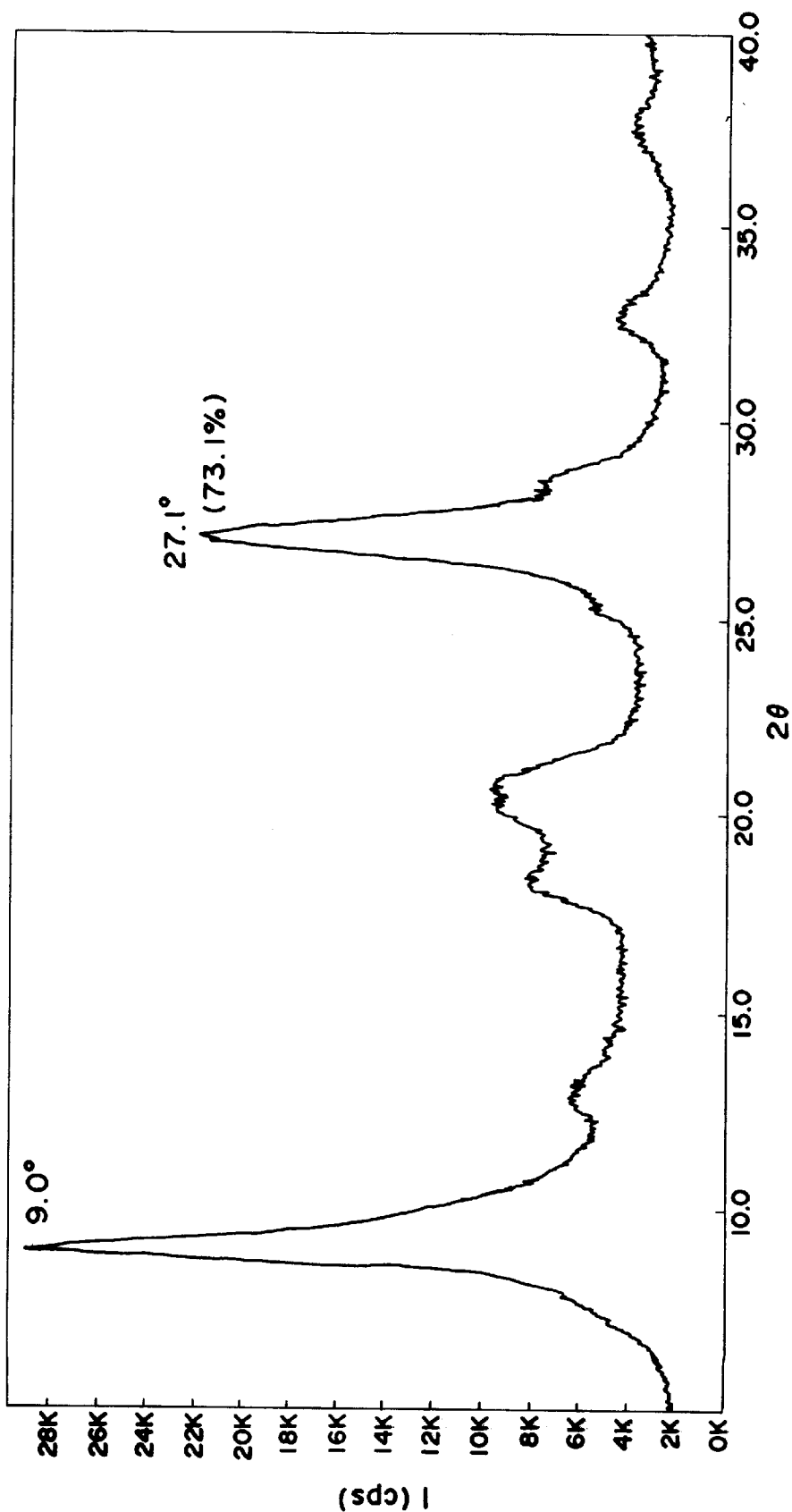

5 parts of the crystal obtained in Example 47 was treated for 9 hours in an automatic mortar ("ANM-150" (trade name), available from Nitto Kagaku K.K. and comprising a porcelain mortar and a porcelain pestle rotating at fixed speeds of 6 rpm and 100 rpm, respectively, in mutually reverse directions) to provide a crystal, which was found to comprise bromogallium phthalocyanine (g) with an X-ray diffraction pattern shown in FIG. 33.

EXAMPLE 49

Figure 34:
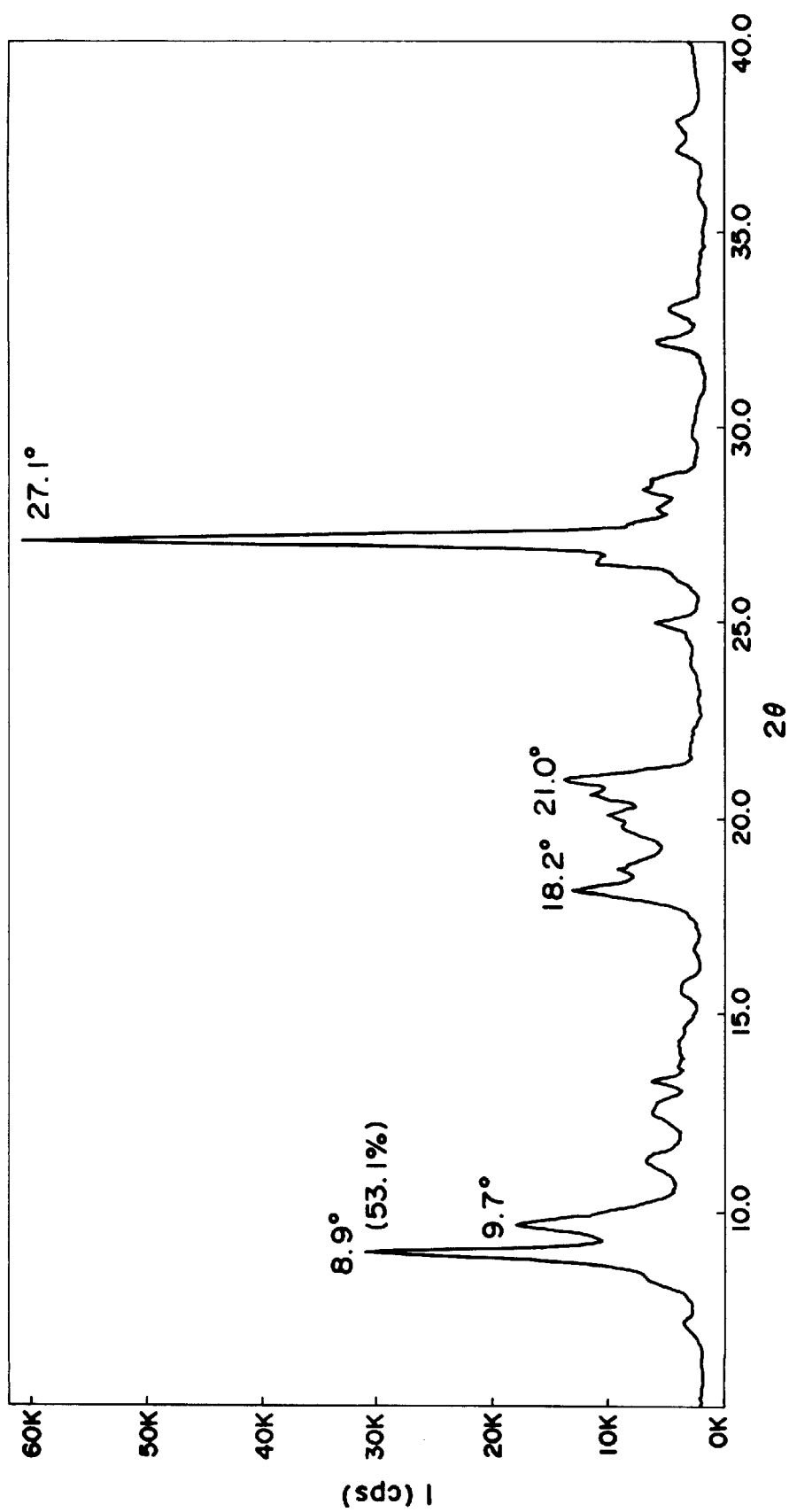
Figure 35:
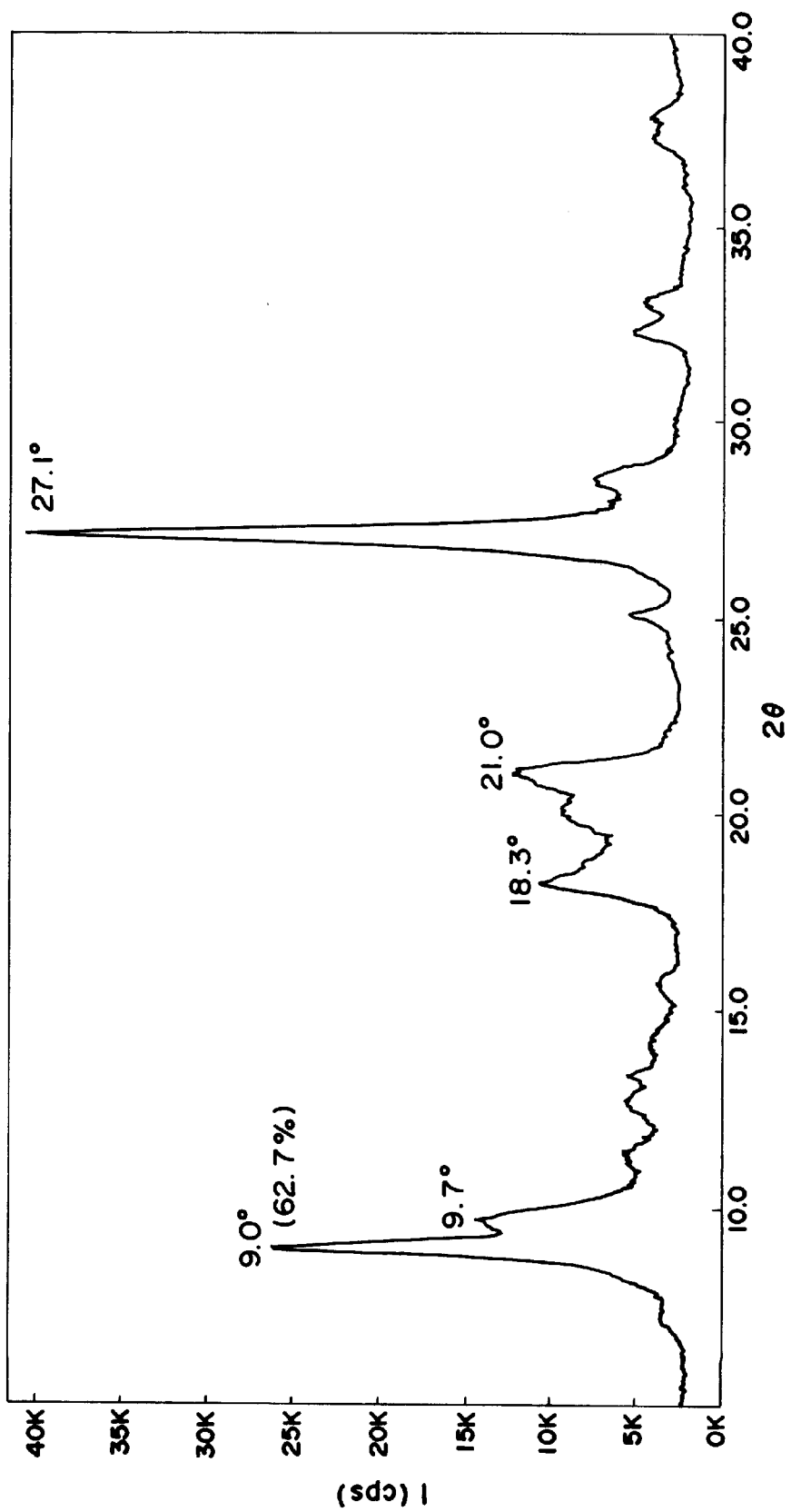

0.3 part of the crystal obtained in Example 48, 10 parts of chloroform and 10 parts of 1 mm-dia. glass beads were dispersed for 24 hours in a paint shaker, followed by filtration, washing with methanol and drying to recover a crystal, which was found to comprise bromogallium phthalocyanine (g) with an X-ray diffraction pattern shown in FIG. 34.

EXAMPLE 50

0.3 part of the crystal obtained in Example 48, 10 parts of cyclohexanone and 10 parts of 1 mm-dia. glass beads were

EXAMPLE 51

Figure 36:
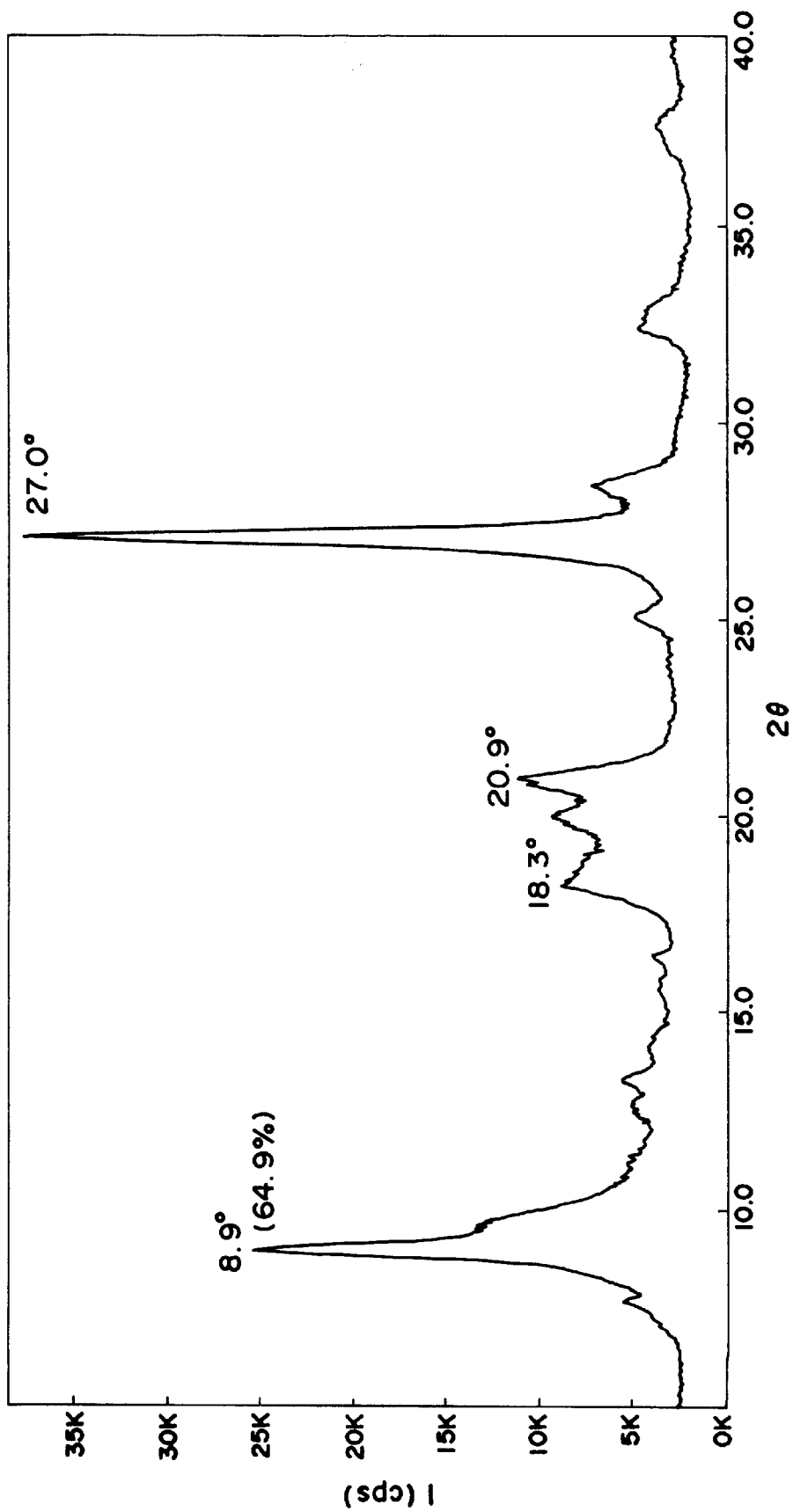

0.3 part of the crystal obtained in Example 48, 10 parts of acetonitrile and 10 parts of 1 mm-dia. glass beads were dispersed for 24 hours in a paint shaker, followed by filtration, washing with methanol and drying to recover a crystal, which was found to comprise bromogallium phthalocyanine (g) with an X-ray diffraction pattern shown in FIG. 36.

EXAMPLE 52

Figure 37:
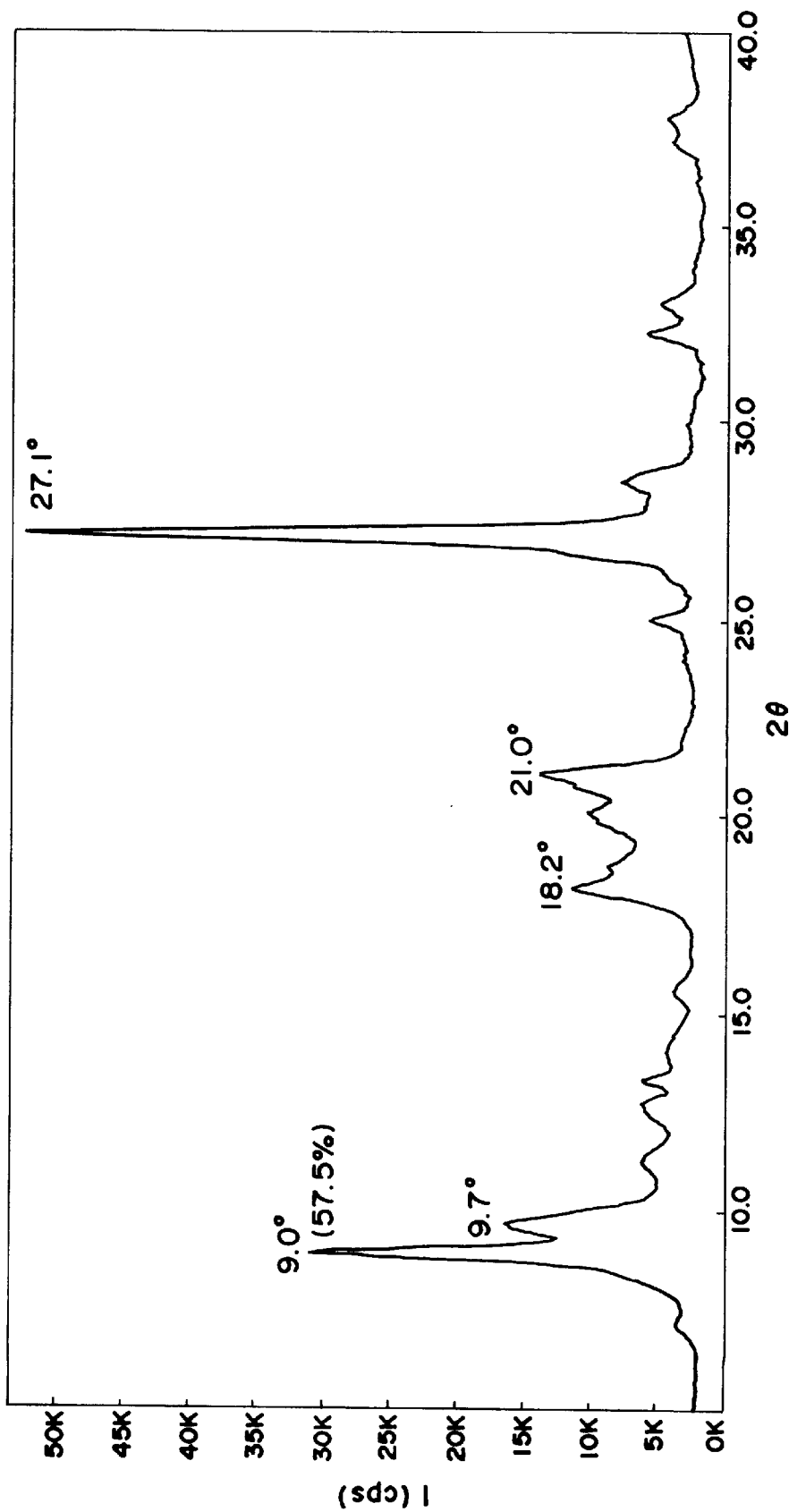

0.3 part of the crystal obtained in Example 48, 10 parts of butyl acetate and 10 parts of 1 mm-dia. glass beads were dispersed for 24 hours in a paint shaker, followed by filtration, washing with methanol and drying to recover a crystal, which was found to comprise bromogallium phthalocyanine (g) with an X-ray diffraction pattern shown in FIG. 37.

EXAMPLE 53

Figure 38:
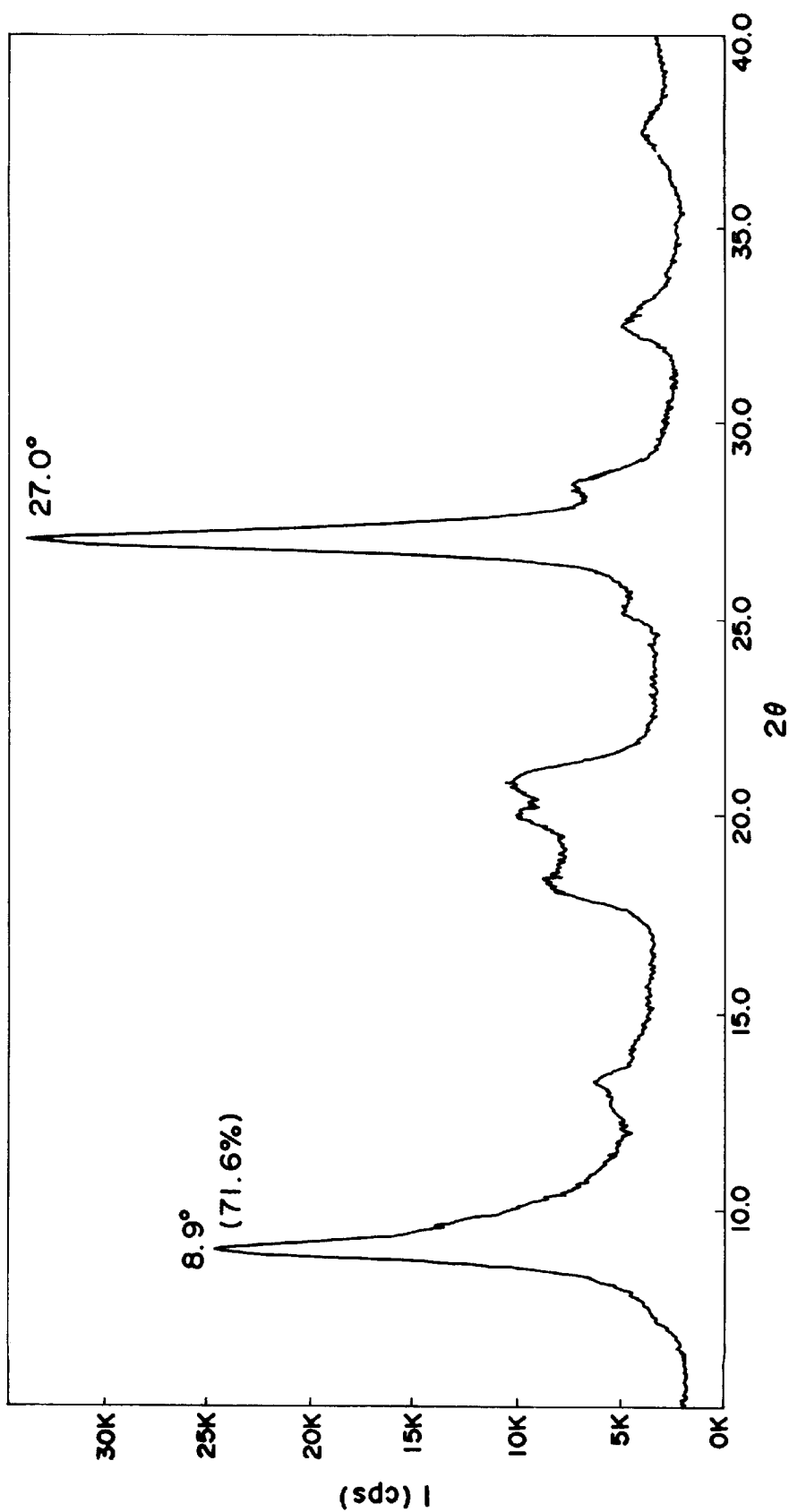

0.3 part of the crystal obtained in Example 48, 10 parts of ethylene glycol and 10 parts of 1 mm-dia. glass beads were dispersed for 24 hours in a paint shaker, followed by filtration, washing with methanol and drying to recover a crystal, which was found to comprise bromogallium phthalocyanine (g) with an X-ray diffraction pattern shown in FIG. 38.

EXAMPLE 54

Figure 39:
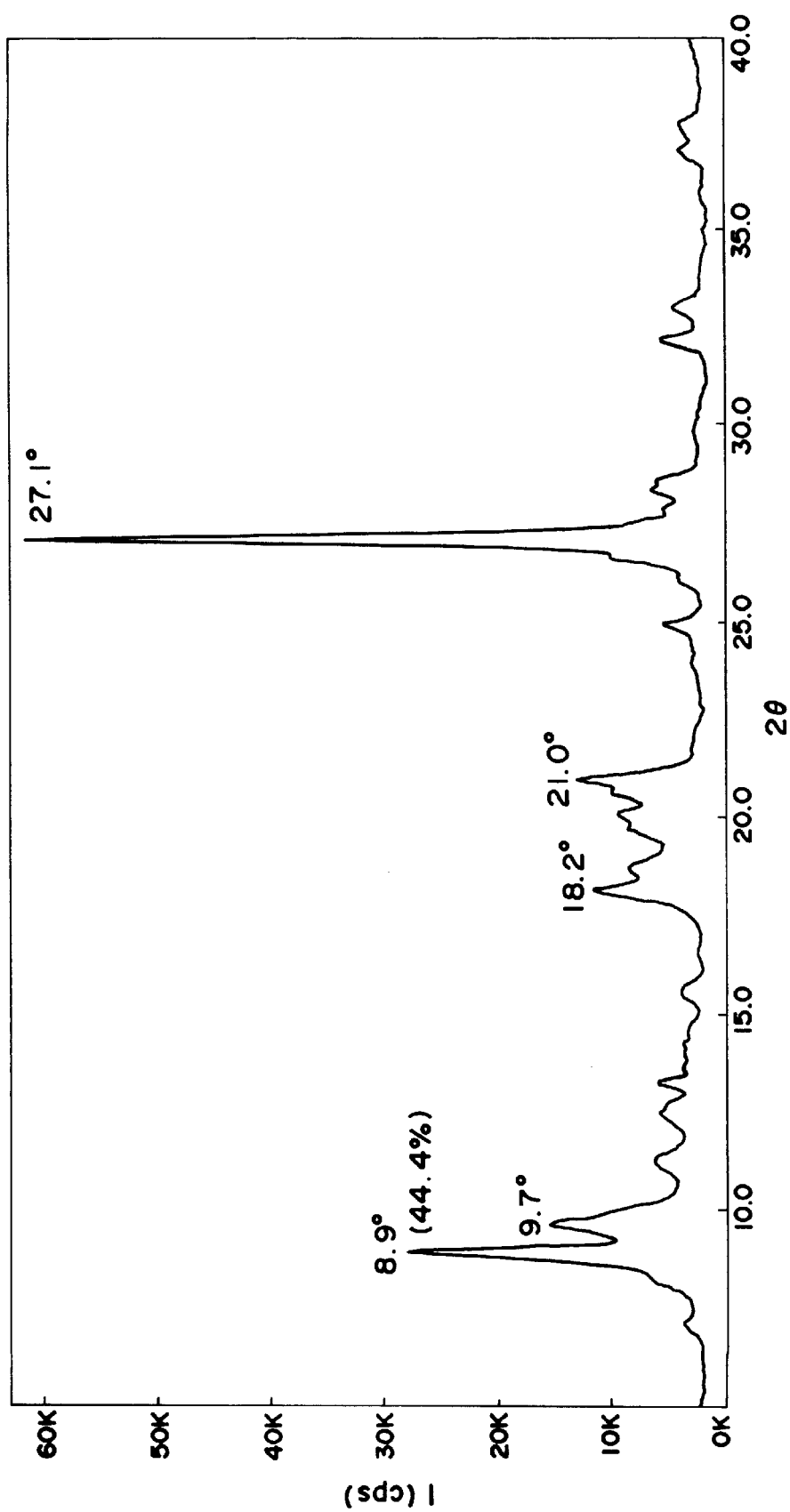

0.3 part of the crystal obtained in Example 48, 10 parts of mono-chlorobenzene and 10 parts of 1 mm-dia. glass beads were dispersed for 24 hours in a paint shaker, followed by filtration, washing with methanol and drying to recover a crystal, which was found to comprise bromogallium phthalocyanine (g) with an X-ray diffraction pattern shown in FIG. 39.

EXAMPLE 55

Figure 40:
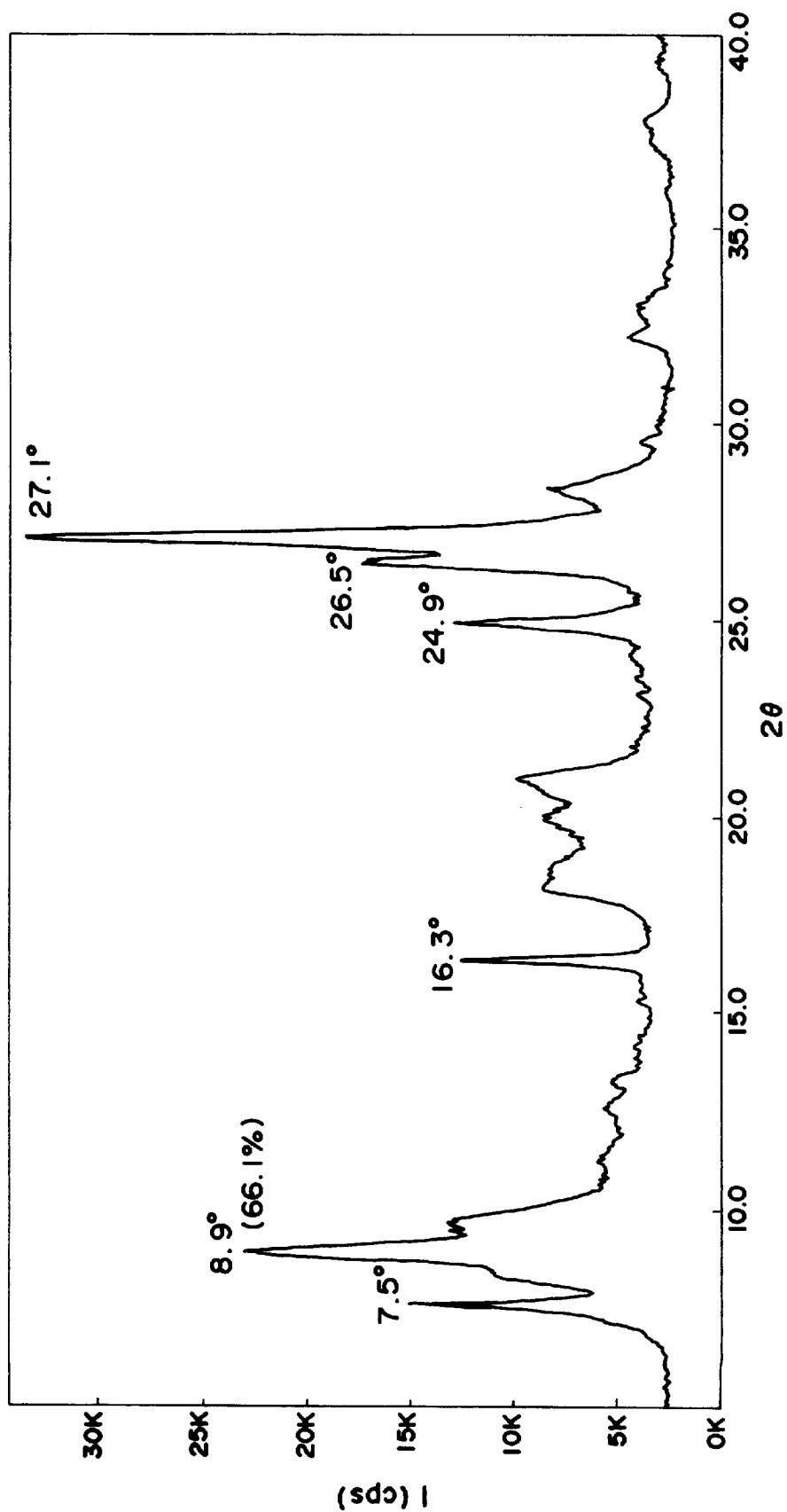

0.3 part of the crystal obtained in Example 48, 10 parts of tetrahydrofuran and 10 parts of 1 mm-dia. glass beads were dispersed for 24.hours in a paint shaker, followed by filtration, washing with methanol and drying to recover a crystal, which was found to comprise bromogallium phthalocyanine (g) with an X-ray diffraction pattern shown in FIG. 40.

EXAMPLE 56

Figure 41:
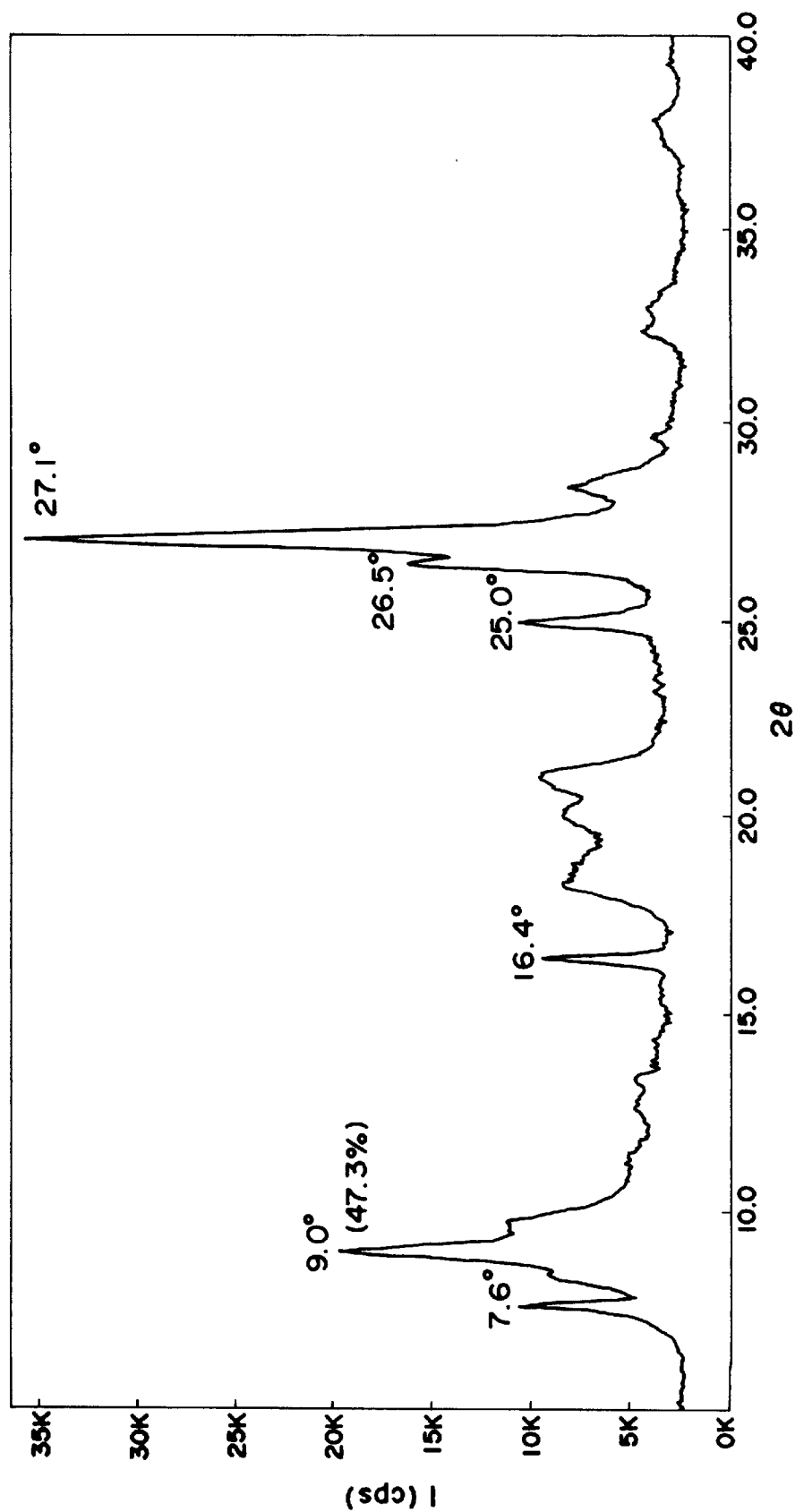

0.3 part of the crystal obtained in Example 48, 10 parts of methyl ethyl ketone and 10 parts of 1 mm-dia. glass beads were dispersed for 24 hours in a paint shaker, followed by filtration, washing with methanol and drying to recover a crystal, which was found to comprise bromogallium phthalocyanine (g) with an X-ray diffraction pattern shown in FIG. 41.

EXAMPLE 57

Figure 42:
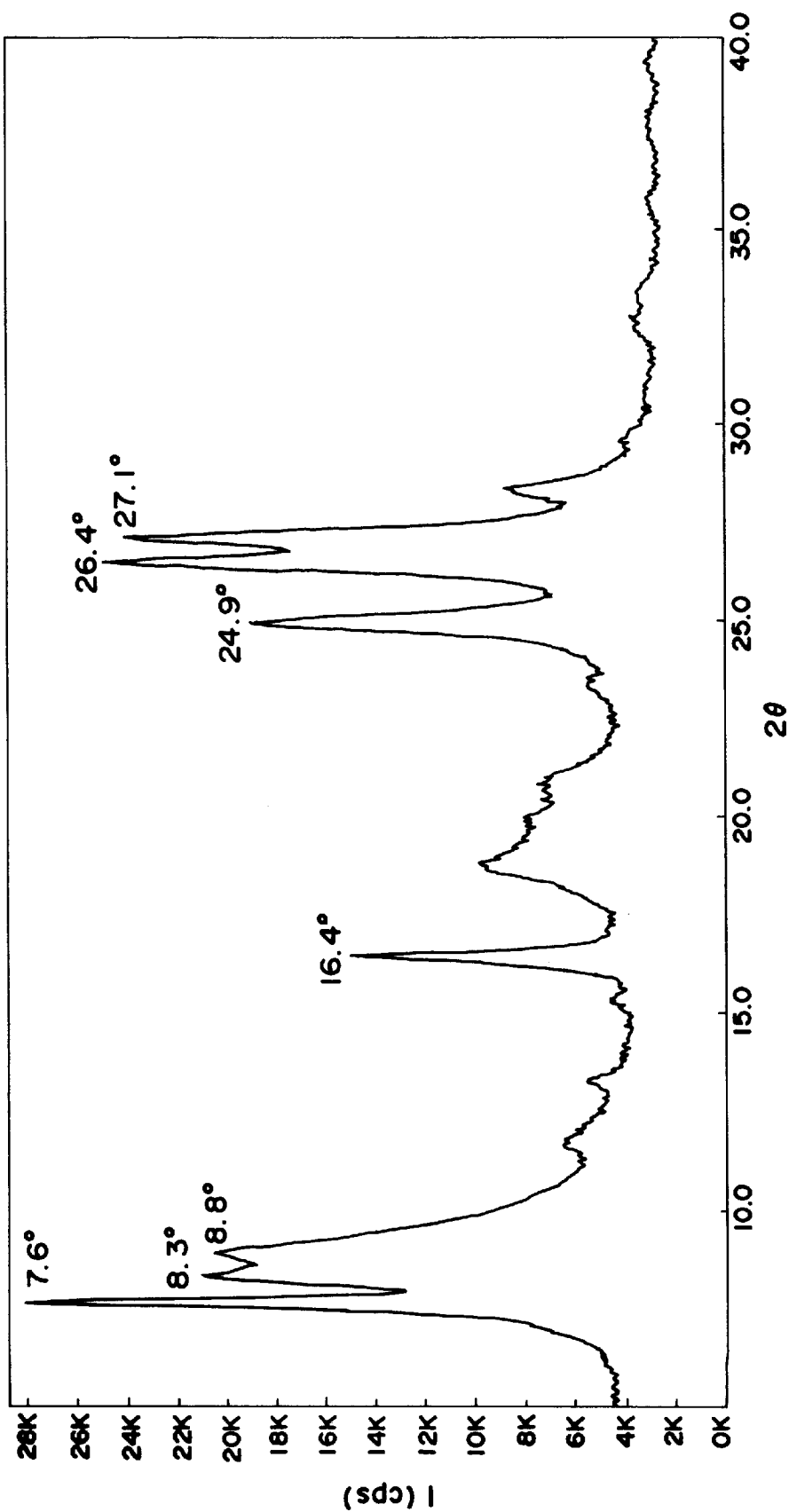

0.3 part of the crystal obtained in Example 48, 10 parts of methanol and 10 parts of 1 mm-dia. glass beads were dispersed for 24 hours in a paint shaker, followed by filtration, washing with methanol and drying to recover a crystal, which was found to comprise bromogallium phthalocyanine (g) with an X-ray diffraction pattern shown in FIG. 42.

EXAMPLE 58

Figure 43:
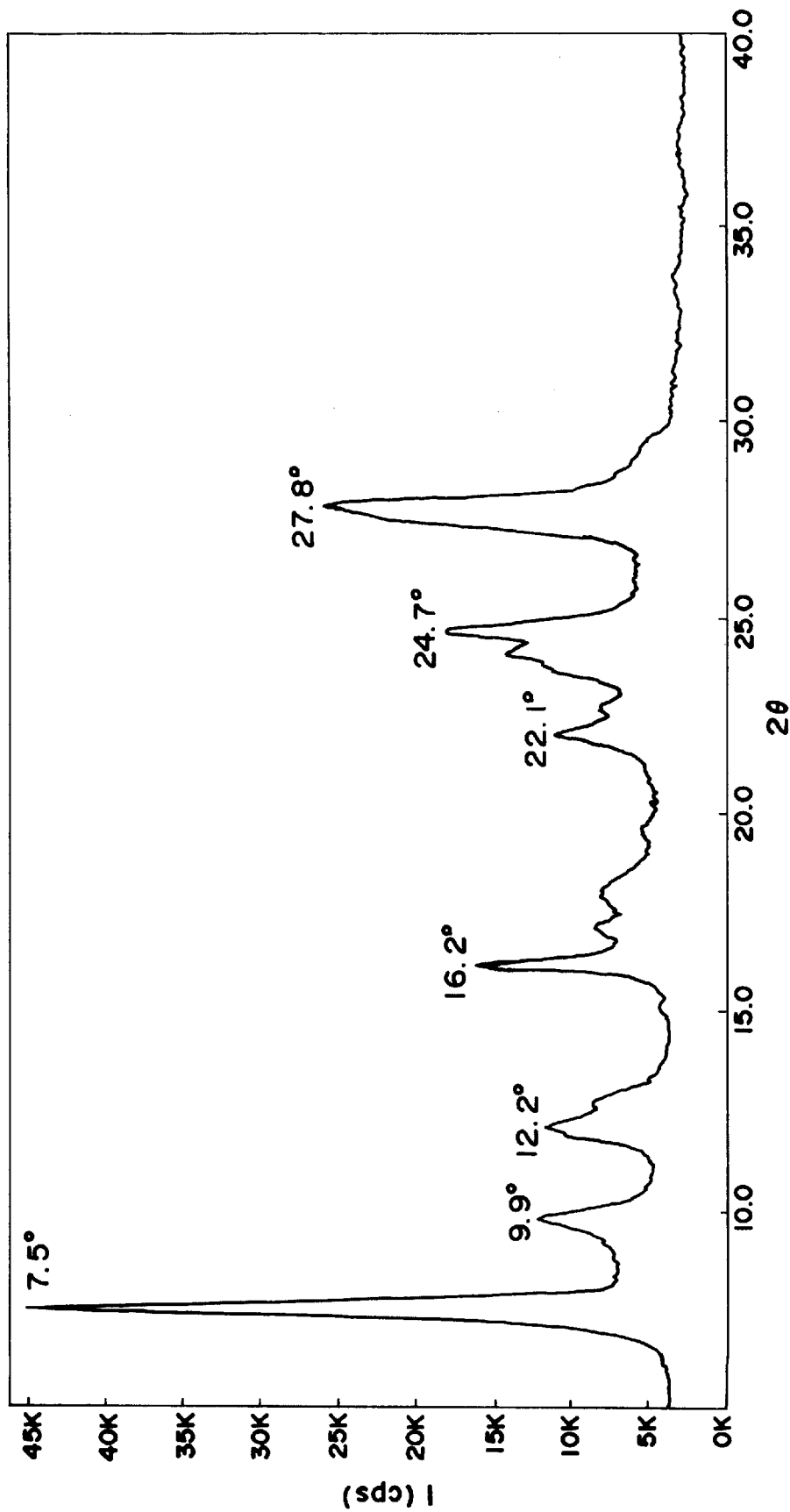

0.3 part of the crystal obtained in Example 48, 10 parts of N,N-dimethylformamide and 10 parts of 1 mm-dia. glass beads were dispersed for 24 hours in a paint shaker, followed by filtration, washing with methanol and drying to recover a crystal, which was found to comprise bromogallium phthalocyanine (h) with an X-ray diffraction pattern shown in FIG. 43.

EXAMPLE 59

Figure 44:
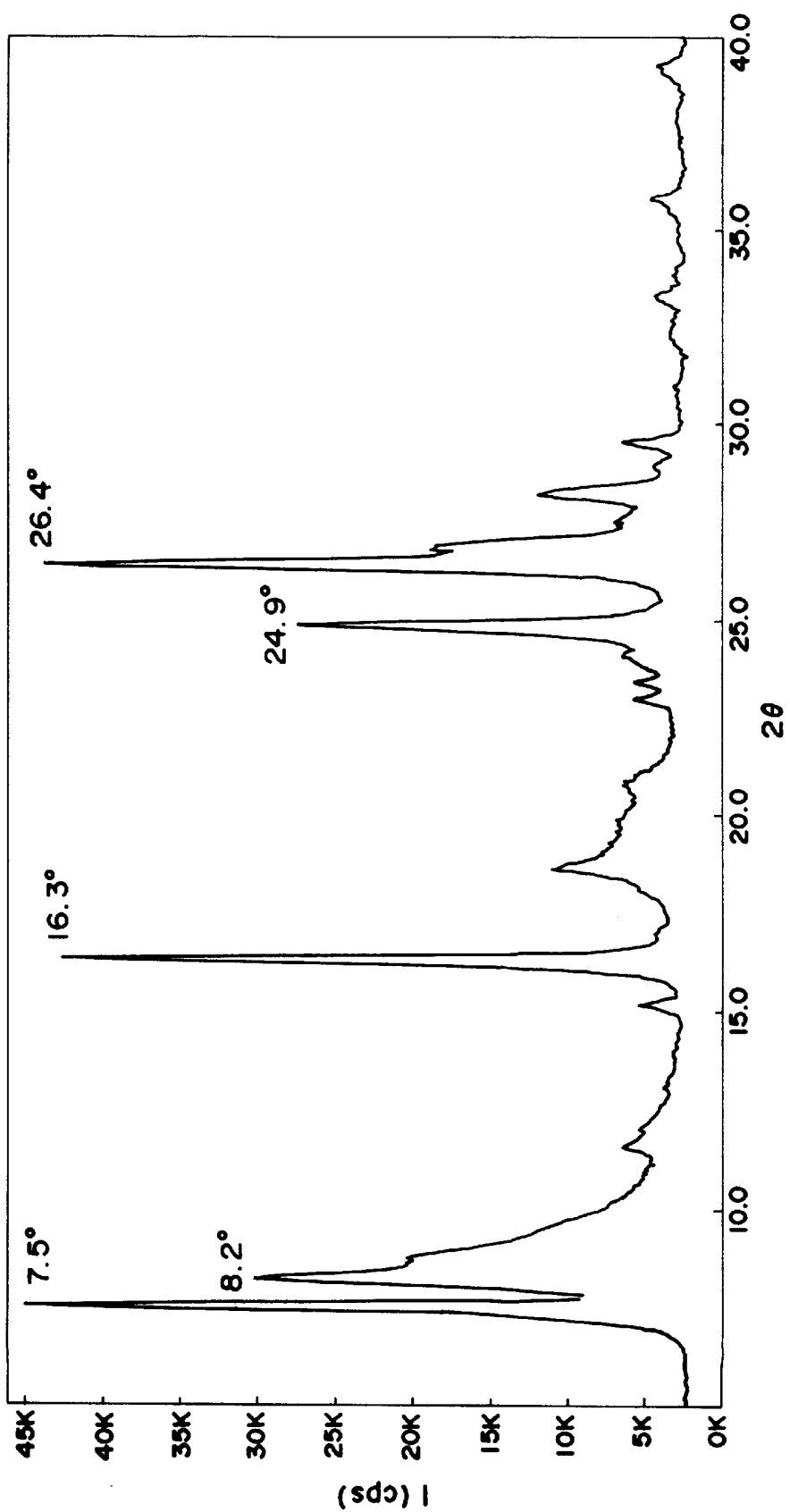

0.3 part of the crystal obtained in Example 48, 10 parts of N,N-diethylaniline and 10 parts of 1 mm-dia. glass beads were dispersed for 24 hours in a paint shaker, followed by filtration, washing with methanol and drying to recover a crystal, which was found to comprise bromogallium phthalocyanine (i) with an X-ray diffraction pattern shown in FIG. 44.

EXAMPLE 60

Figure 45:
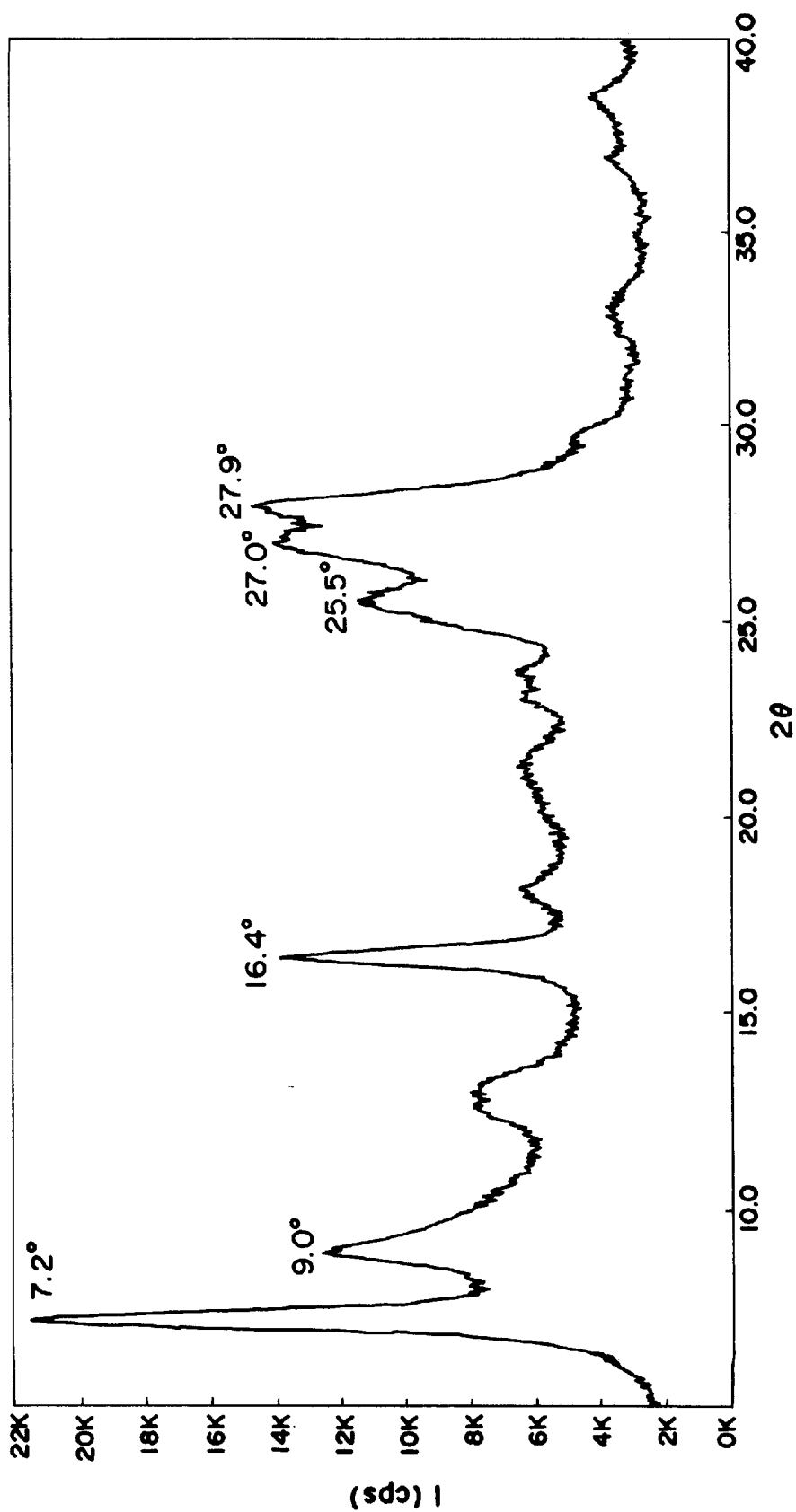

3 parts of the crystal obtained in Example 47 and 120 parts of 1 m-dia. glass beads were dispersed for 24 hours in a paint shaker, followed by an ultrasonic treatment in water, filtration and drying to obtain a crystal, which was found to comprise bromogallium phthalocyanine (h) with an X-ray diffraction pattern of FIG. 45.

EXAMPLE 61

Figure 46:
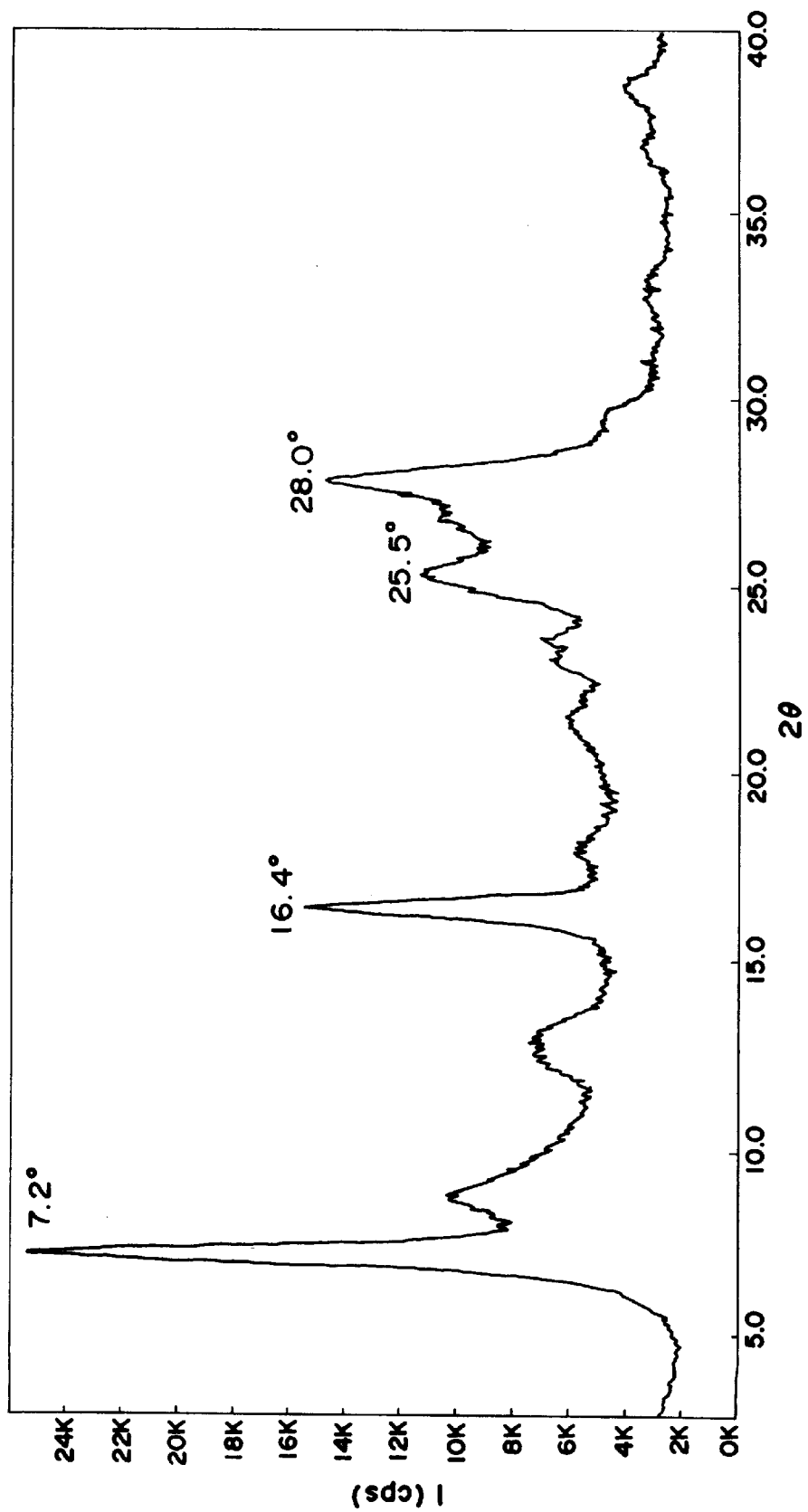

3 parts of the crystal obtained in Example 47 and 120 parts of 1 mm-dia. glass beads were dispersed for 24 hours in a paint shaker, followed by an ultrasonic treatment in water, filtration and drying to obtain a crystal, which was found to comprise bromogallium phthalocyanine (h) with an X-ray diffraction pattern of FIG. 46.

EXAMPLE 62

Figure 47:
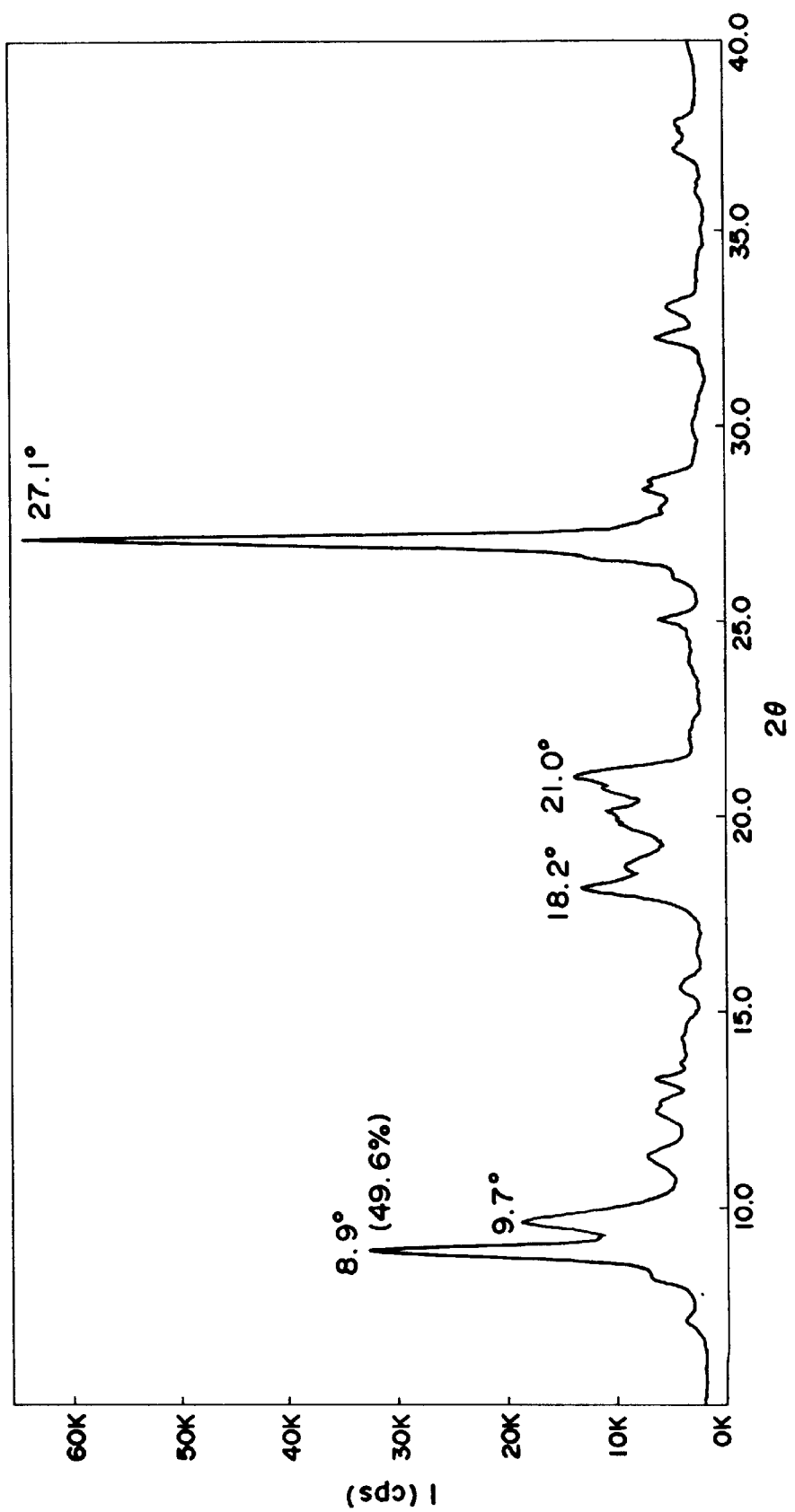

0.3 part of the crystal obtained in Example 60, 10 parts of tetrahydrofuran and 10 parts of 1 mm-dia. glass beads were dispersed for 24 hours in a paint shaker, followed by filtration, washing with methanol and drying to recover a crystal, which was found to comprise bromogallium phthalocyanine (g) with an X-ray diffraction pattern shown in FIG. 47.

EXAMPLE 63

Figure 48:
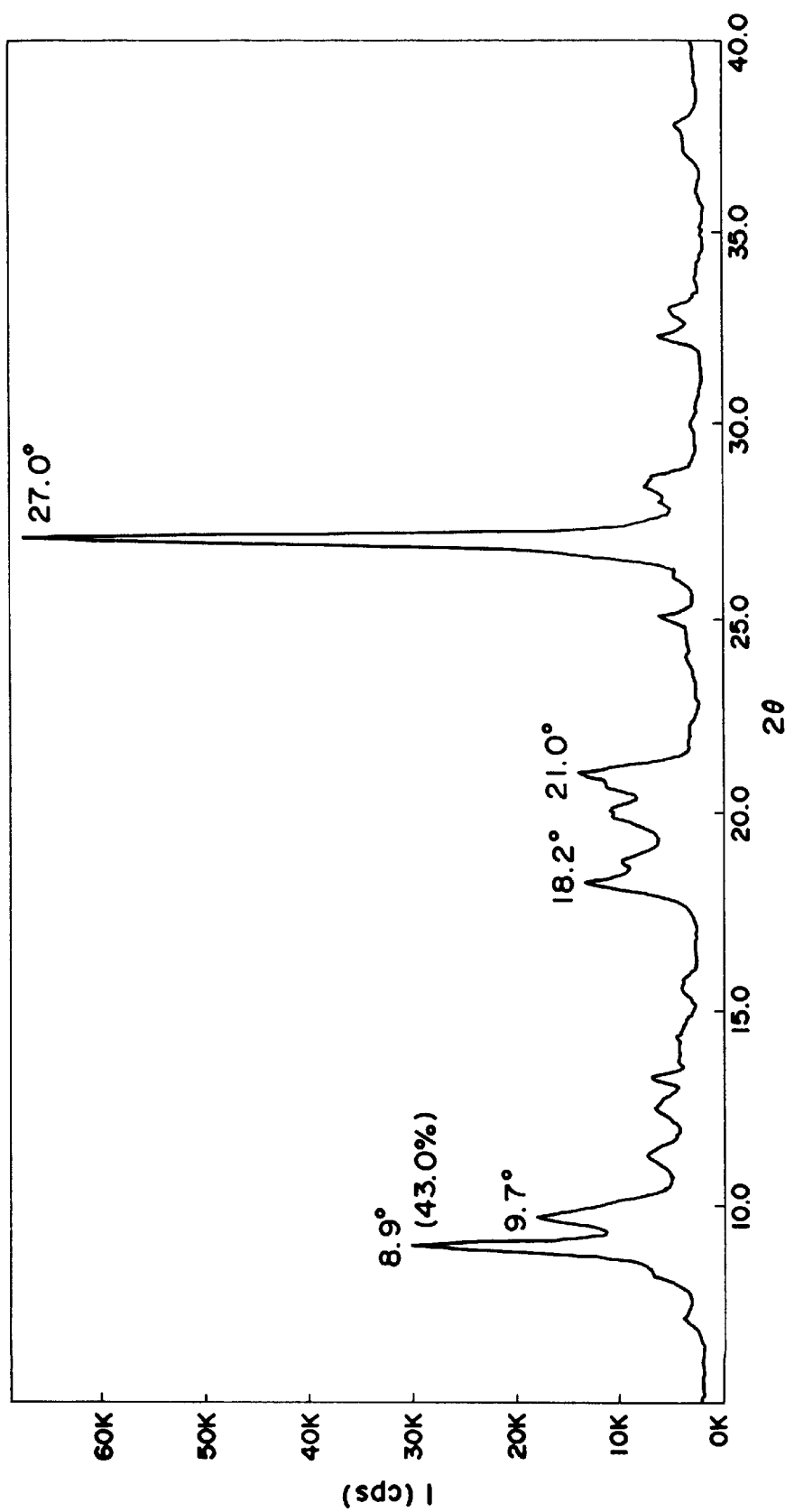

0.3 part of the crystal obtained in Example 60, 10 parts of chloroform and 10 parts of 1 mm-dia. glass beads were dispersed for 24 hours in a paint shaker, followed by filtration, washing with methanol and drying to recover a crystal, which was found to comprise bromogallium phthalocyanine (g) with an X-ray diffraction pattern shown in FIG. 48.

The crystal also exhibited the following elementary analysis results ($C_{32}H_{16}N_8GaBr$):

|  | C (%) | H (%) | N (%) |
|---|---|---|---|
| Calculated value | 58.05 | 2.44 | 16.92 |
| Measured value | 58.16 | 2.39 | 16.86 |

EXAMPLE 64

Figure 49:
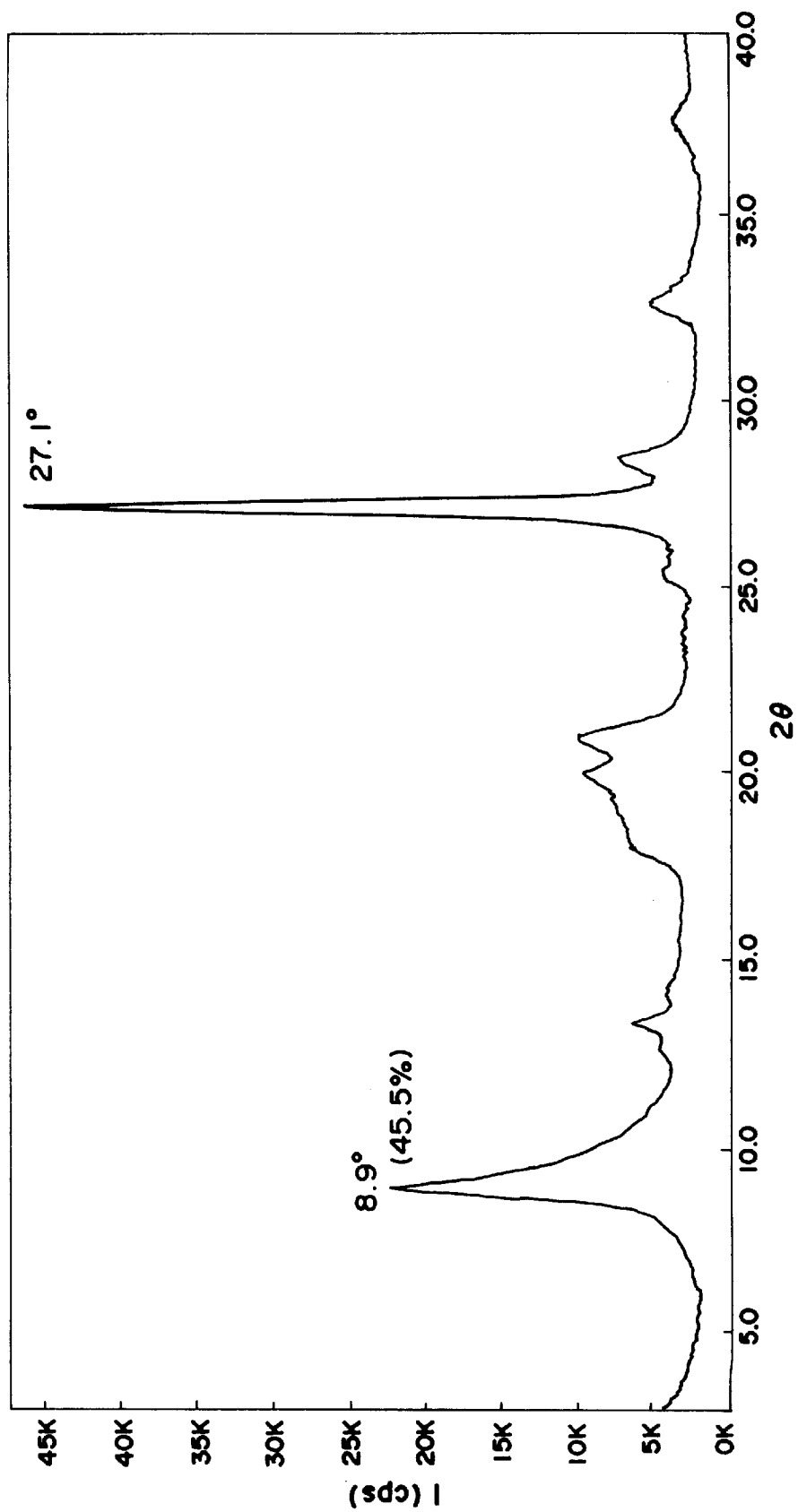

0.3 part of the crystal obtained in Example 60, 10 parts of methanol and 10 parts of 1 mm-dia. glass beads were dispersed for 24 hours in a paint shaker, followed by filtration, washing with methanol and drying to recover a crystal, which was found to comprise bromogallium phthalocyanine (g) with an X-ray diffraction pattern shown in FIG. 49.

EXAMPLE 65

Figure 50:
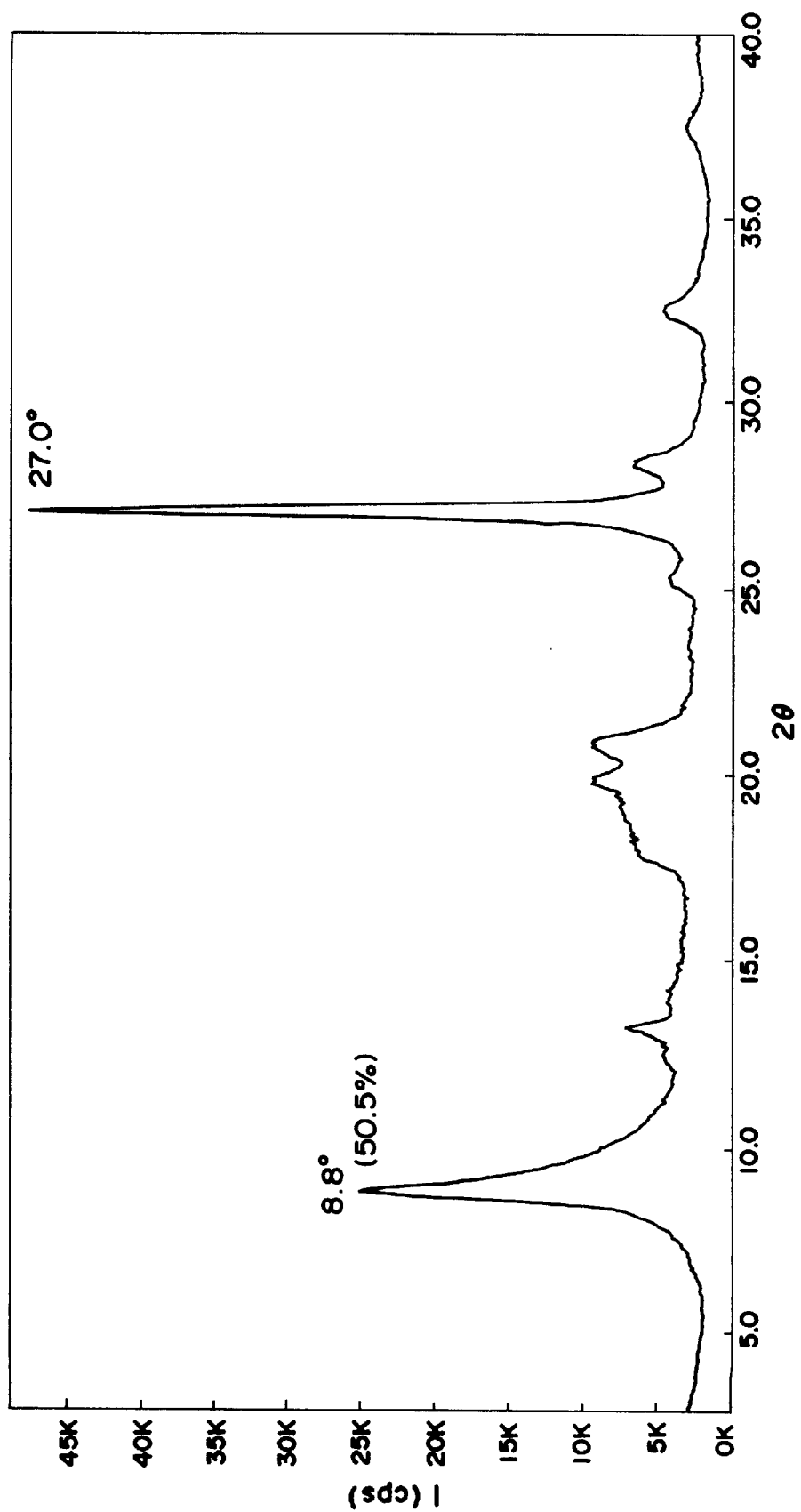

0.3 part of the crystal obtained in Example 61, 10 parts of methanol and 10 parts of 1 mm-dia. glass beads were dispersed for 24 hours in a paint shaker, followed by filtration, washing with methanol and drying to recover a crystal, which was found to comprise bromogallium phthalocyanine (g) with an X-ray diffraction pattern shown in FIG. 50.

EXAMPLE 66

Figure 51:
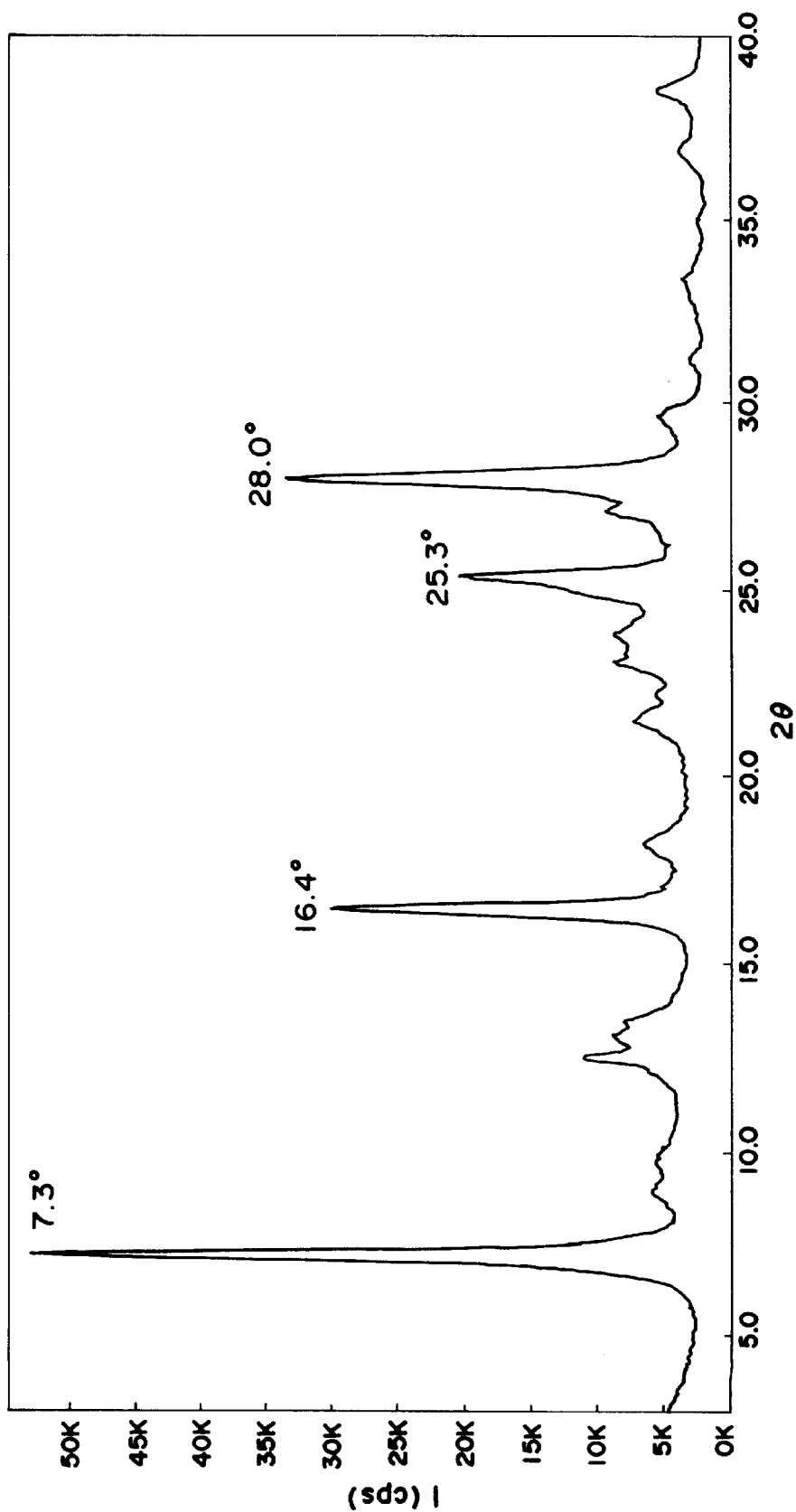

0.3 part of the crystal obtained in Example 60, 10 parts of N,N-dimethylformamide and 10 parts of 1 m-dia. glass beads were dispersed for 3 hours in a paint shaker, followed by filtration, washing with methanol and drying to recover a crystal, which was found to comprise bromogallium phthalocyanine (h) with an X-ray diffraction pattern shown in FIG. 51.

EXAMPLE 67

Figure 52:
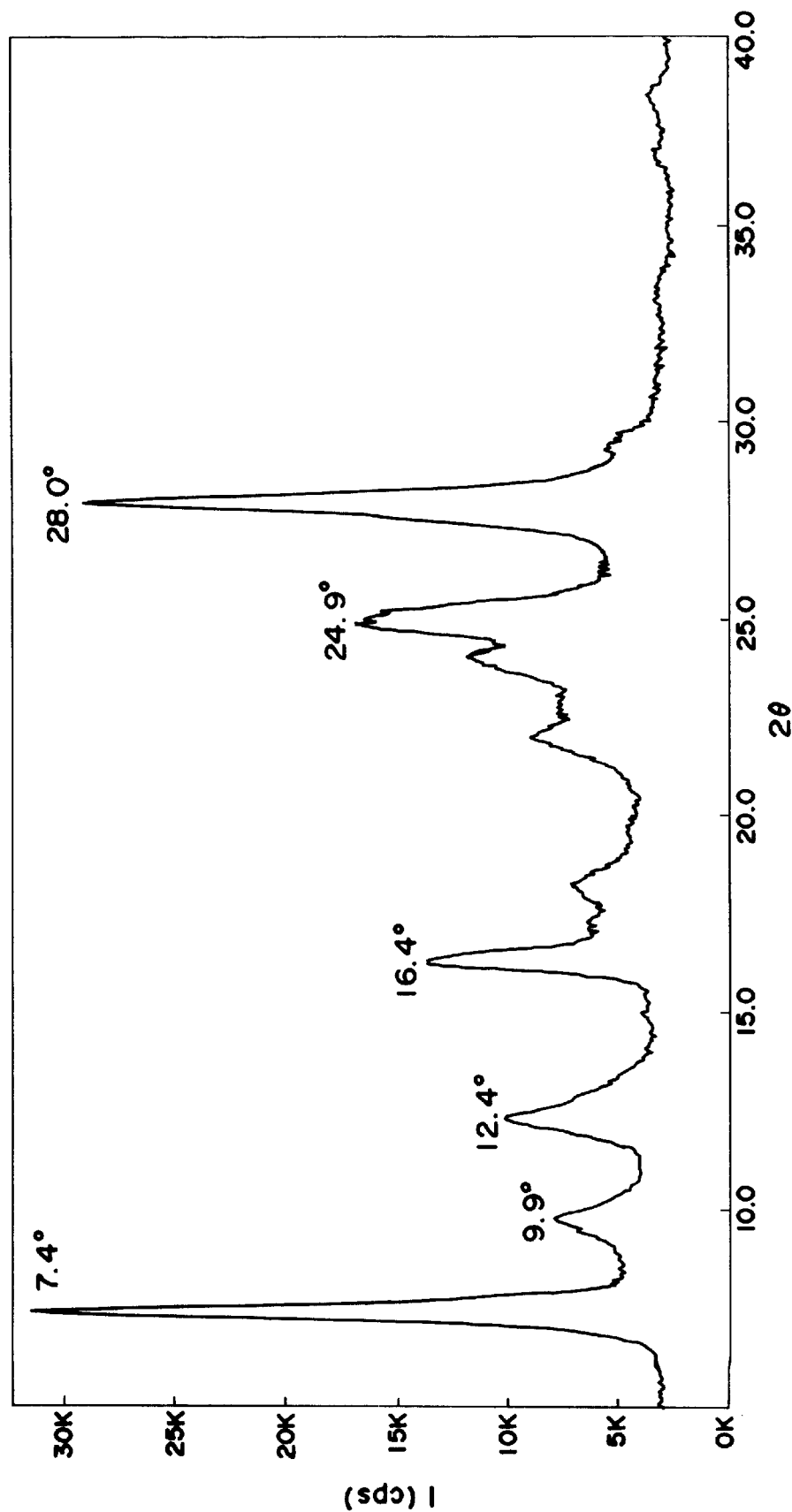

0.3 part of the crystal obtained in Example 60, 10 parts of N,N-dimethylformamide and 10 parts of 1 mm-dia. glass beads were dispersed for 24 hours in a paint shaker, followed by filtration, washing with methanol and drying to recover a crystal, which was found to comprise bromogallium phthalocyanine (h) with an X-ray diffraction pattern shown in FIG. 52.

The crystal also exhibited the following elementary analysis results ($C_{32}H_{16}N_8GaBr$):

|  | C (%) | H (%) | N (%) |
|---|---|---|---|
| Calculated value | 58.05 | 2.44 | 16.92 |
| Measured value | 57.18 | 2.61 | 16.08 |

EXAMPLE 68

Figure 53:
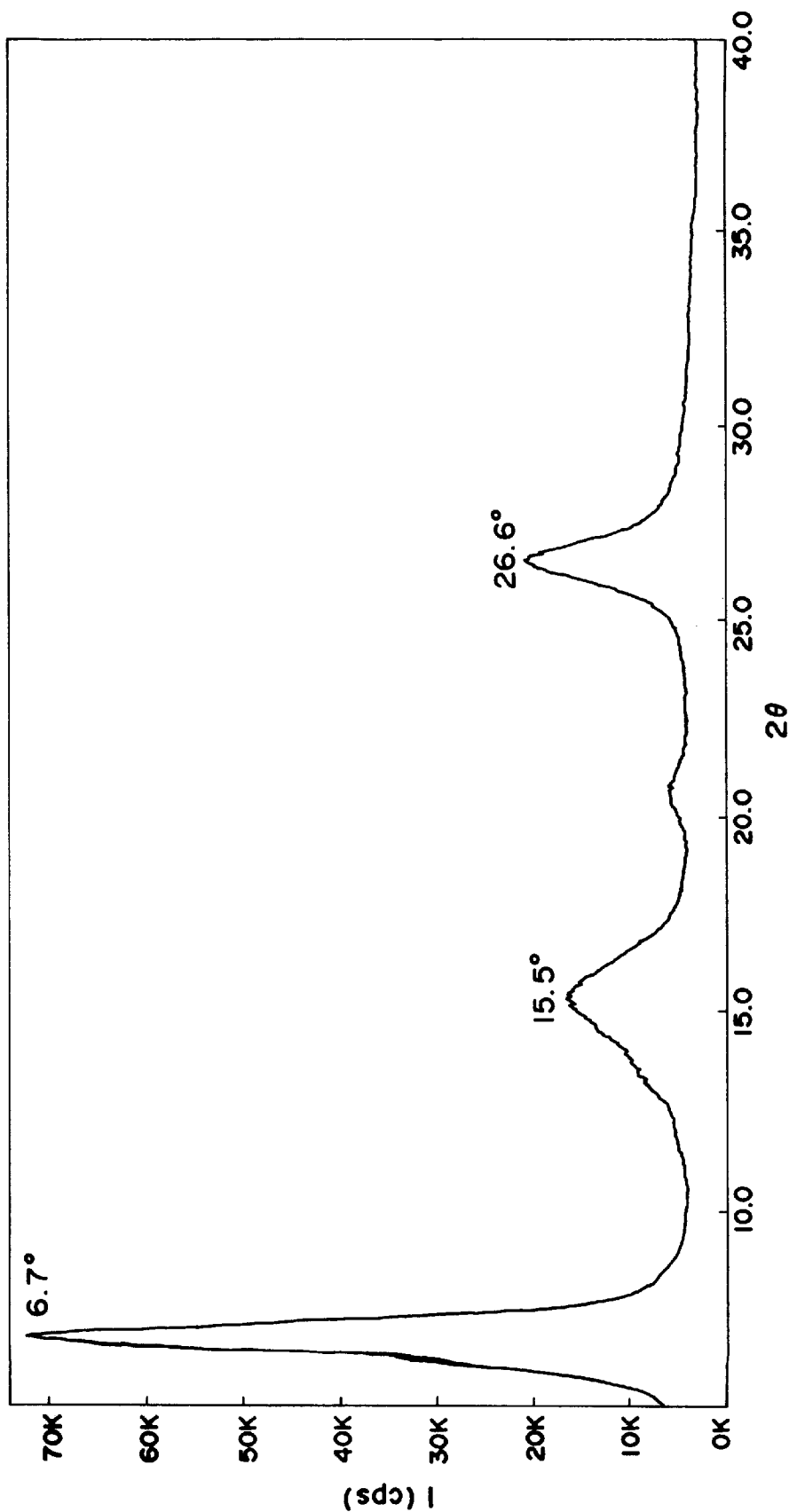
Figure 54:
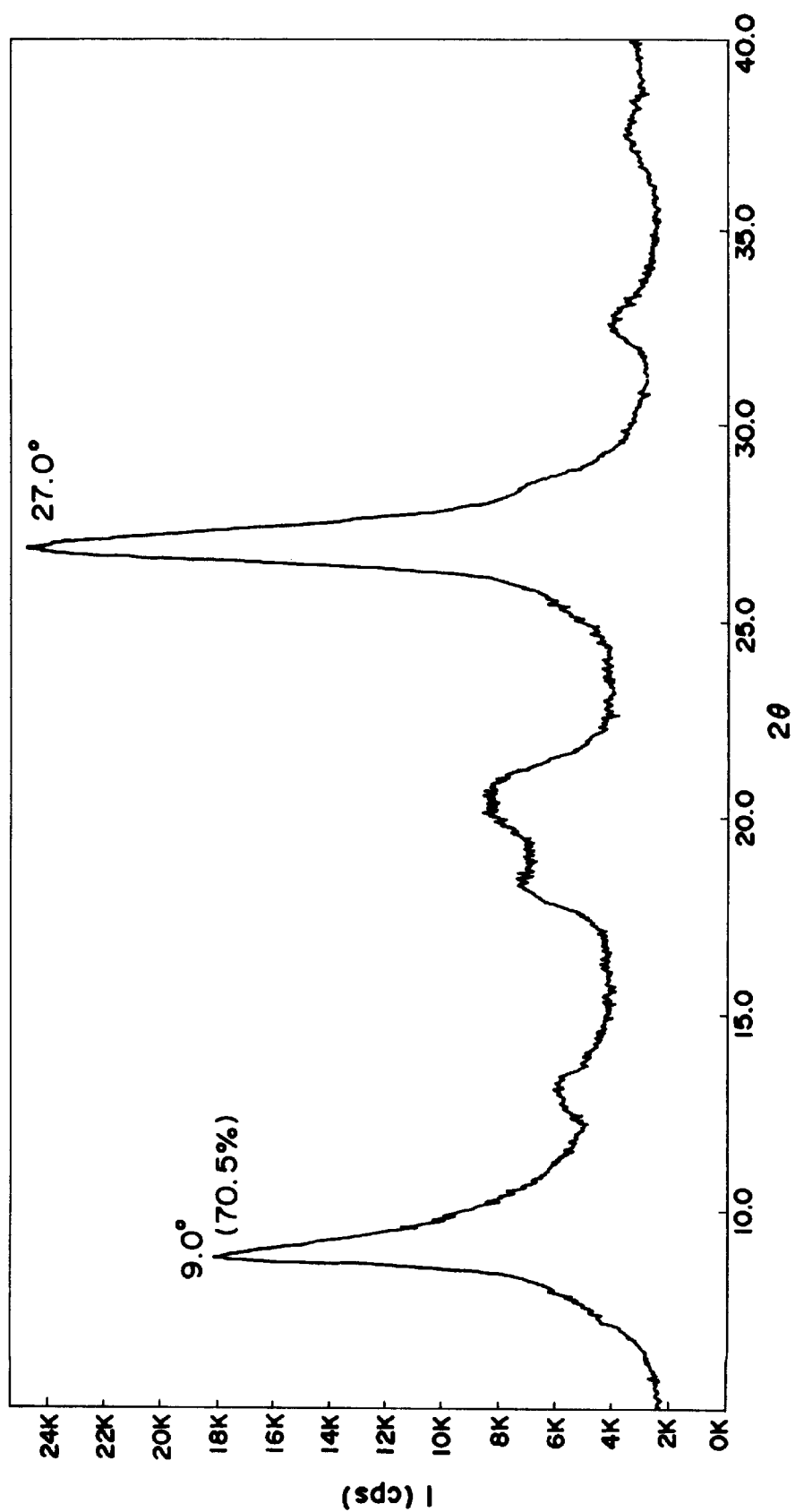

0.3 part of hydroxygallium phthalocyanine (with an X-ray diffraction pattern of FIG. 53), 10 parts of 1 N-hydrobromic acid aqueous solution and 10 parts of 1 mm-dia. glass beads were dispersed for 24 hours in a paint shaker, followed by filtration, washing with methanol an drying to recover a crystal, which was found to comprise bromogallium phthalocyanine (g) with an X-ray diffraction pattern shown in FIG. 54.

The crystal also exhibited the following elementary analysis results ($C_{32}H_{16}N_8GaBr$):

|  | C (%) | H (%) | N (%) |
|---|---|---|---|
| Calculated value | 58.05 | 2.44 | 16.92 |
| Measured value | 56.98 | 2.36 | 16.30 |

EXAMPLE 69

Figure 55:
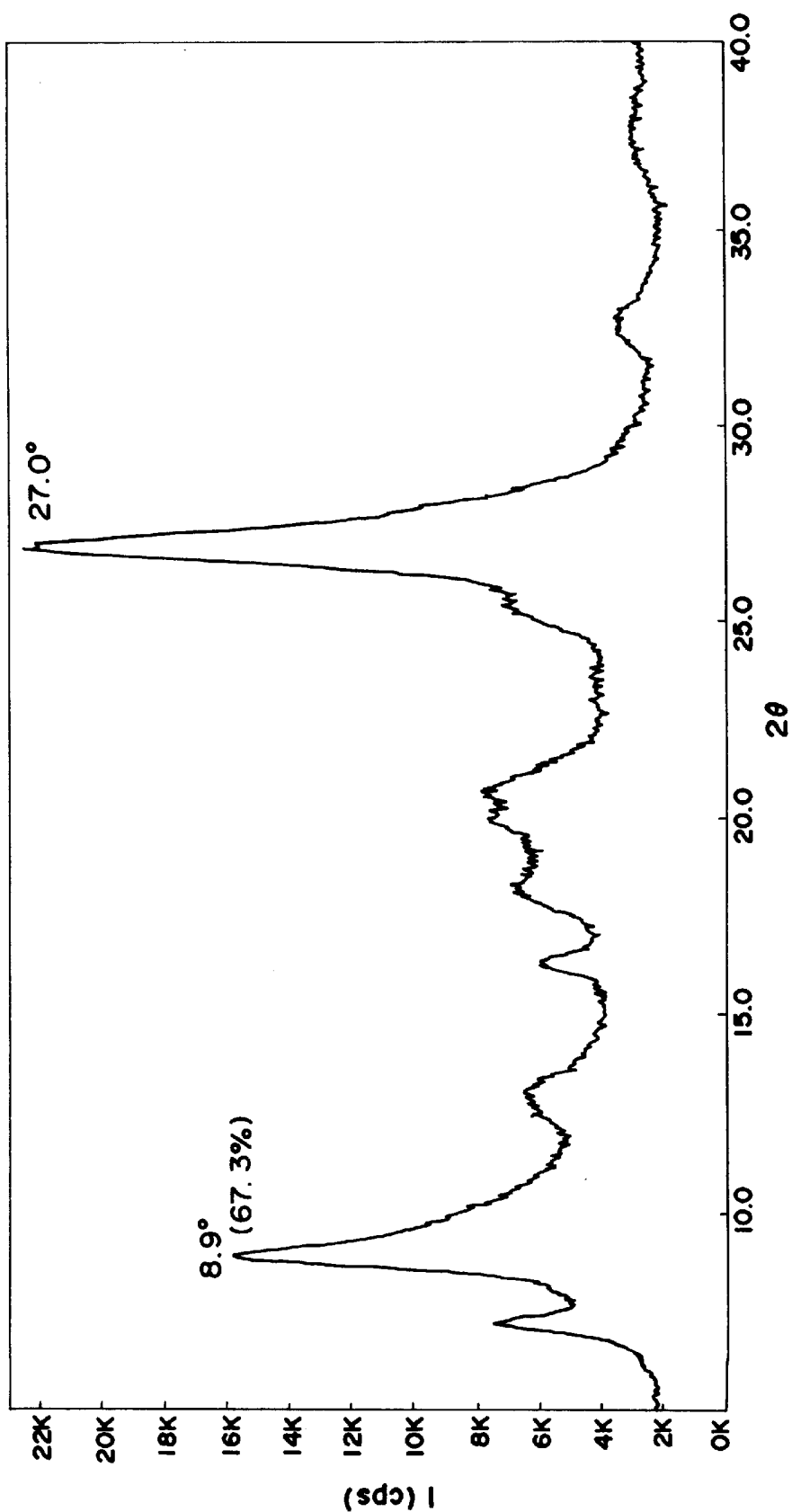

0.3 part of hydroxygallium phthalocyanine (with an X-ray diffraction pattern of FIG. 53), 10 parts of 2 N-hydrobromic acid aqueous solution and 10 parts of 1 mi-dia. glass beads were dispersed for 24 hours in a paint shaker, followed by filtration, washing with methanol an drying to recover a crystal, which was found to comprise bromogallium phthalocyanine (g) with an X-ray diffraction pattern shown in FIG. 55.

EXAMPLE 70

Figure 56:
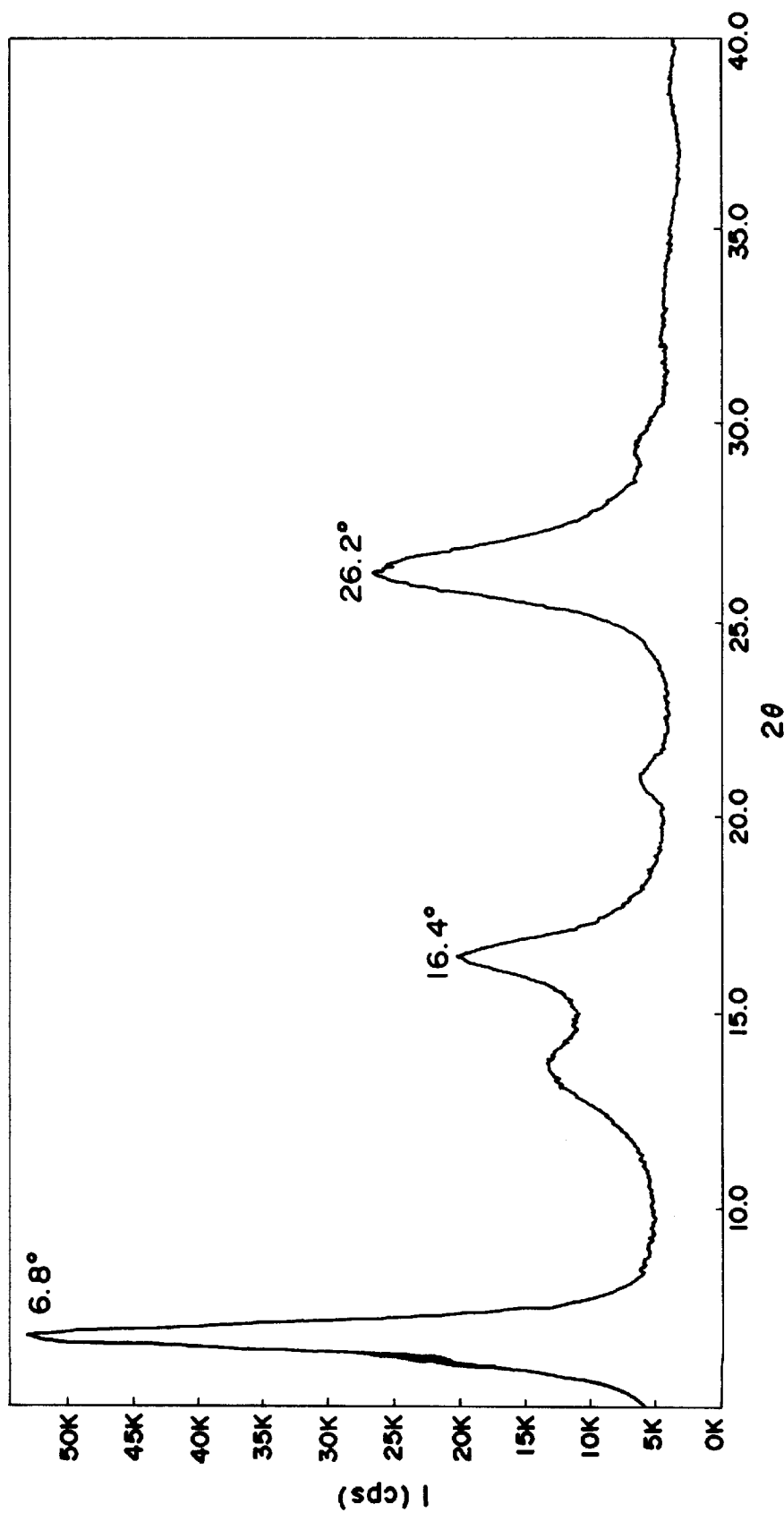

0.3 part of hydroxygallium phthalocyanine (with an X-ray diffraction pattern of FIG. 56), 10 parts of 1 N-hydrobromic acid aqueous solution and 10 parts of 1 mm-dia. glass beads were dispersed for 24 hours in a paint shaker, followed by filtration, washing with methanol an drying to recover a crystal, which was found to comprise bromogallium phthalocyanine (g) with an X-ray diffraction pattern similar to the one shown in FIG. 54.

EXAMPLE 71

Figure 57:
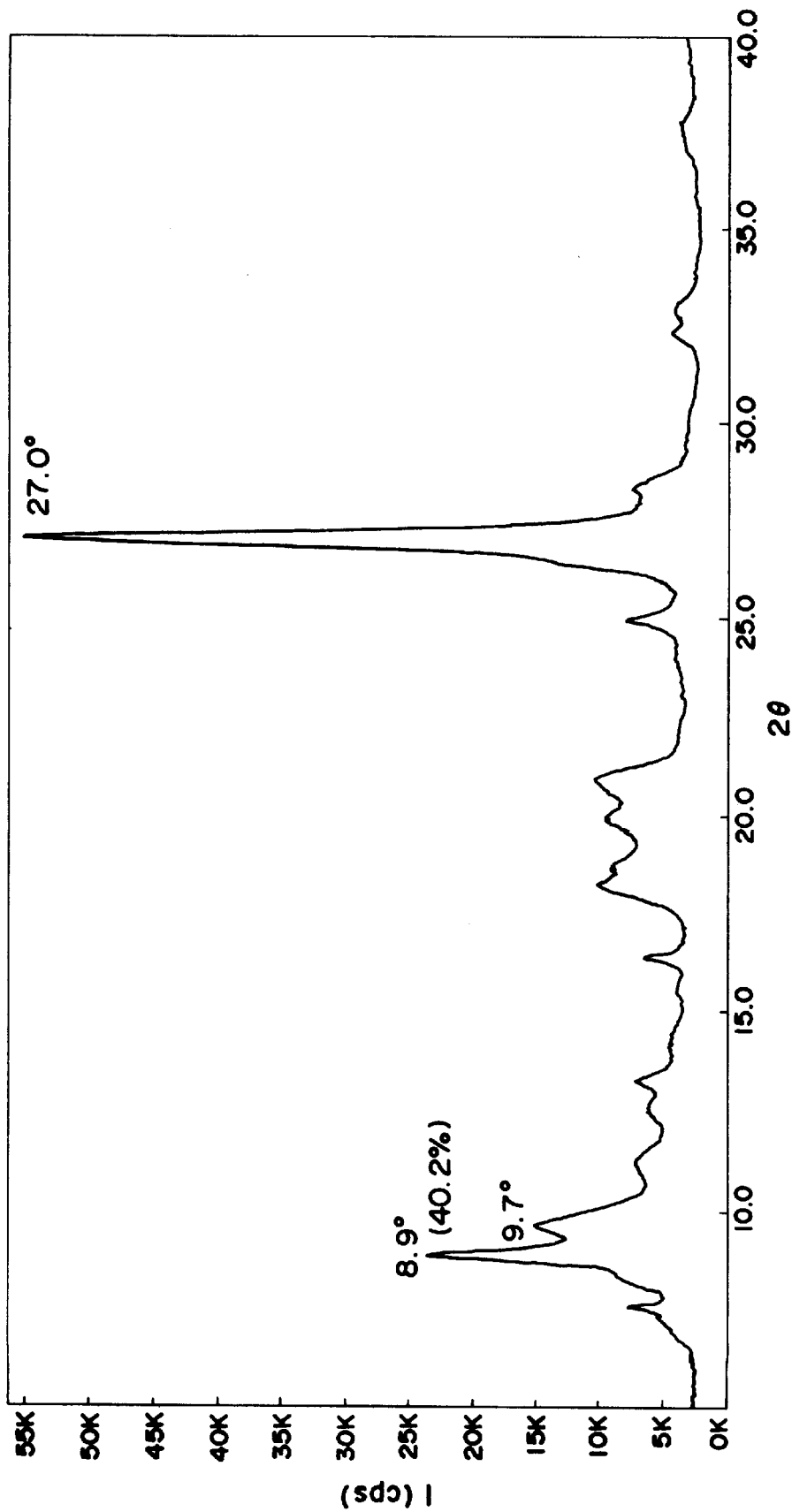

0.3 part of the crystal obtained in Example 68, 10 parts of tetrahydrofuran and 10 parts of 1 mm-dia. glass beads were dispersed for 24 hours in a paint shaker, followed by filtration, washing with methanol and drying to recover a crystal, which was found to comprise bromogallium phthalocyanine (g) with an X-ray diffraction pattern shown in FIG. 57.

The crystal also exhibited the following elementary analysis results ($C_{32}H_{16}N_8GaBr$):

|  | C (%) | H (%) | N (%) |
|---|---|---|---|
| Calculated value | 58.05 | 2.44 | 16.92 |
| Measured value | 57.56 | 2.29 | 16.34 |

EXAMPLE 72

Figure 58:
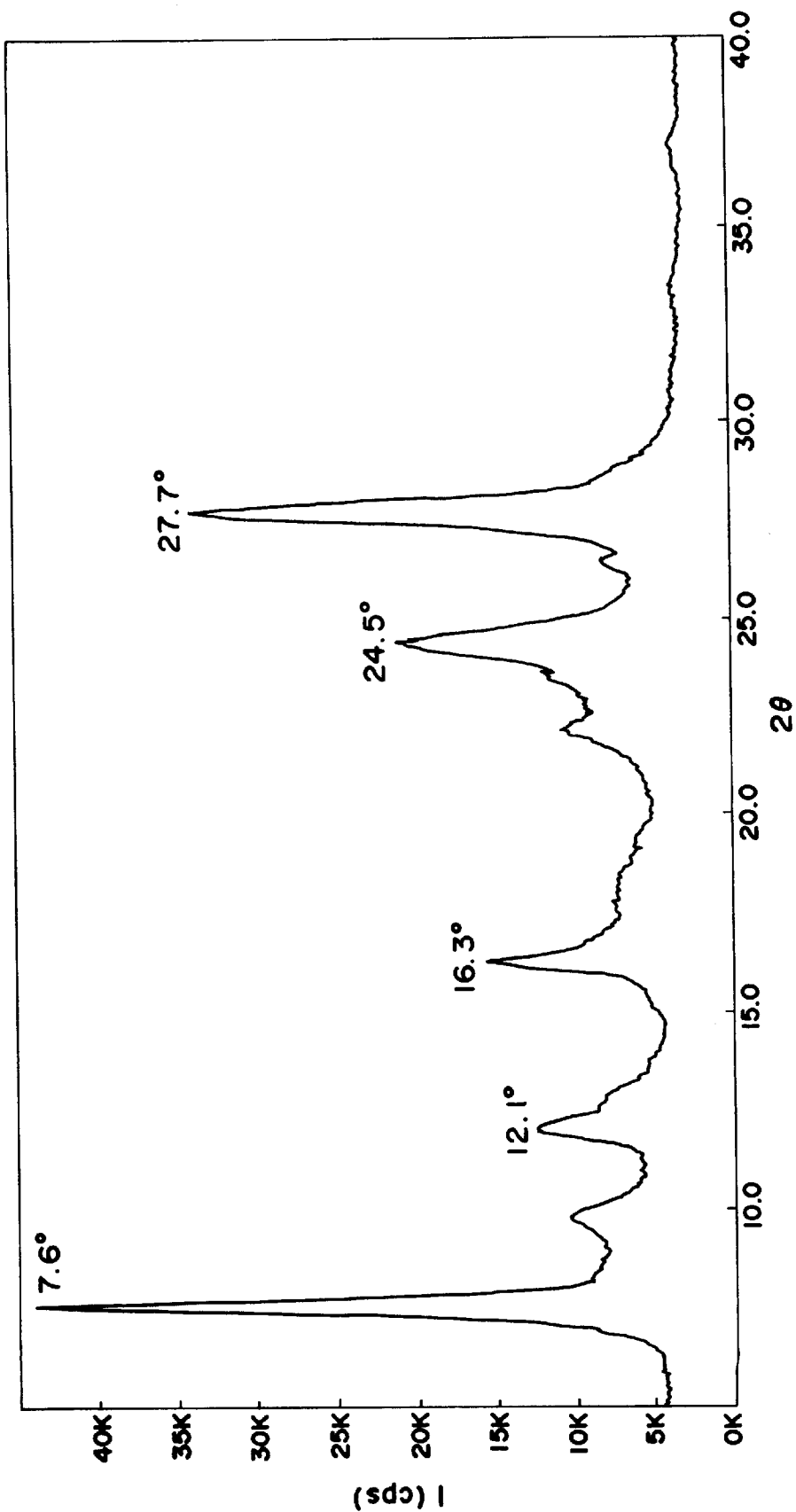

0.3 part of the crystal obtained in Example 68, 10 parts of N,N-dimethylformamide and 10 parts of 1mm-dia. glass beads were dispersed for 24 hours in a paint shaker, followed by filtration, washing with methanol and drying to recover a crystal, which was found to comprise bromogallium phthalocyanine (h) with an X-ray diffraction pattern shown in FIG. 58.

The crystal also exhibited the following elementary analysis results ($C_{32}H_{16}N_8GaBr$):

|  | C (%) | H (%) | N (%) |
|---|---|---|---|
| Calculated value | 58.05 | 2.44 | 16.92 |
| Measured value | 57.65 | 2.73 | 16.08 |

EXAMPLE 73

Figure 59:
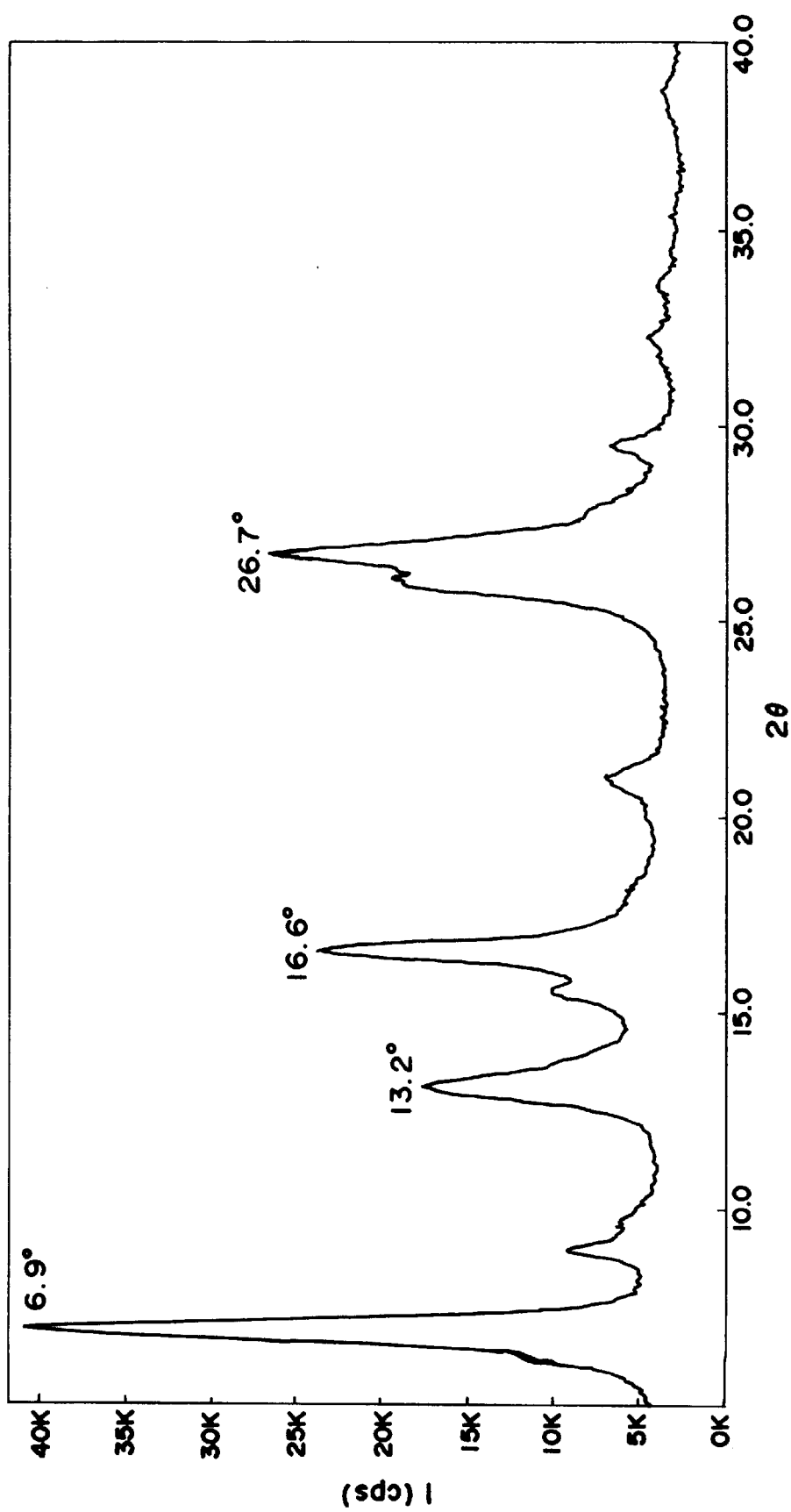

3 parts of the crystal obtained in Example 68 was stirred in 100 parts of sodium bicarbonate aqueous solution (pH 10), followed by sufficient washing with distilled water, filtration, washing with methanol and drying to recover a crystal, which was found to comprise bromogallium phthalocyanine (j) with an X-ray diffraction pattern shown in FIG. 59.

Hereinbelow, some examples for preparation of electrophotographic photosensitive members by using bromogallium phthalocyanines prepared above will be described.

EXAMPLE 74

An aluminum substrate was coated with a solution of 5 g of methoxymethylated nylon resin (Mw (weight–average molecular weight)=$3.2 \times 10^4$) and 10 g of alcohol-soluble copolymer nylon (Mw=$2.9 \times 10^4$) in 95 g of methanol by using a wire bar and dried to form a 1 μm-thick undercoating layer.

Then, 3 parts of the bromogallium phthalocyanine (f) prepared in Example 1 was added to a solution of 2 parts of polyvinylbutyral in 60 parts of cyclohexanone, and the mixture was dispersed together with 100 parts of 1 mm-dia. glass beads for 3 hours in a sand mill. The resultant dispersion was further diluted with 100 parts of ethyl acetate, and applied by a wire bar over the undercoating layer, followed by drying to form a 0.2 μm-thick charge generation layer.

Then, a solution of 5 parts of a triarylamine compound of the following formula:

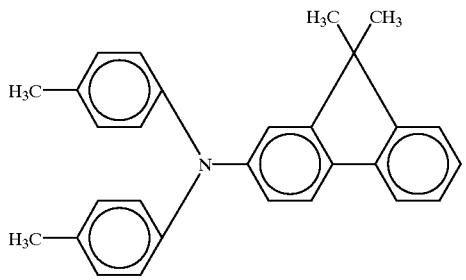

and 5 parts of polycarbonate resin ("Z-200" (trade name), mfd. by Mitsubishi Kagaku K.K.) in 35 parts of chlorobenzene was applied by a wire bar onto the charge generation layer and dried to form a 18 μm-thick charge transport layer, thereby providing an electrophotographic photosensitive member.

EXAMPLES 75–84

Electrophotographic photosensitive members were prepared in the same manner as in Example 74 except for using bromogallium phthalocyanines prepared in the respective Examples shown in Table 3 below as charge generation materials instead of bromogallium phthalocyanine (f) prepared in Example 47.

COMPARATIVE EXAMPLE 4

An electrophotographic photosensitive member was prepared in the same manner as in Example 74 except for using ε-form copper phthalocyanine as a charge generation material instead of bromogallium phthalocyanine (f) prepared in Example 47.

COMPARATIVE EXAMPLE 5

An electrophotographic photosensitive member was prepared in the same manner as in Example 74 except for using hydroxygallium phthalocyanine (with an X-ray diffraction pattern of FIG. 53) as a charge generation material instead of bromogallium phthalocyanine (f) prepared in Example 47.

Each of the above-prepared photosensitive members was applied onto an aluminum cylinder to form a photosensitive drum, which was incorporated in a laser beam printer ("LBX-SX" (trade name), mfd. by Canon K.K.) and subjected to a sensitivity measurement wherein the photosensitive member was first charged to a dark-part potential of −700 volts and illuminated with laser light at a wavelength of 802 nm, thereby measuring a light quantity required to lower the potential of −700 volts down to a light-part potential of −150 volts as a sensitivity.

The results are inclusively shown in Table 3 below.

TABLE 3

| Example | No. of photosensitive member | Bromogallium phthalocyanine (Ex. No.) | Sensitivity ($\mu J/cm^2$) |
|---|---|---|---|
| Ex. 74 | 13 | (f) (Ex. 47) | 0.90 |
| Ex. 75 | 14 | (g) (Ex. 48) | 1.02 |
| Ex. 76 | 15 | (g) (Ex. 50) | 0.75 |
| Ex. 77 | 16 | (h) (Ex. 58) | 2.24 |
| Ex. 78 | 17 | (i) (Ex. 59) | 0.54 |
| Ex. 79 | 18 | (h) (Ex. 60) | 1.04 |
| Ex. 80 | 19 | (g) (Ex. 63) | 0.96 |
| Ex. 81 | 20 | (h) (Ex. 67) | 0.46 |
| Ex. 82 | 21 | (g) (Ex. 68) | 0.42 |
| Ex. 83 | 22 | (g) (Ex. 71) | 1.00 |
| Ex. 84 | 23 | (j) (Ex. 73) | 2.12 |
| Comp. Ex. 4 | 24 | ε-Cu | 2.25 |
| Comp. Ex. 5 | 25 | Hydroxygallium phthalocyanine | ** |

**Not measurable because of poor chargeability.

Table 3 shows that each photosensitive member according to the present invention exhibited an excellent sensitivity.

EXAMPLE 85

The electrophotographic photosensitive member prepared in Example 75 was subjected to 5000 cycles of charging and exposure while setting initial dark-part potential Vd and light-part potential Vl to ca. −700 volts and ca. −150 volts respectively, thereby measuring a change in dark-part potential ΔVd and a change in light-part potential ΔVl. The results are shown in Table 4 below together with those of Examples and Comparative Example described below. In Table 4, +(plus) and −(minus) signs preceding the values of ΔVd and ΔVl represents an increase and a decrease, respectively, in terms of absolute value of potential.

EXAMPLES 86–89

Photosensitive members (Nos. 16, 18, 20 and 21) prepared in Examples 77, 79, 81 and 82, respectively were subjected to the charging-exposure cycle test in the same manner as in Example 85. The results are also shown in Table 4.

COMPARATIVE EXAMPLE 6

A photosensitive member (No. 24) prepared in Comparative Example 4 was subjected to the charging-exposure cycle test in the same manner as in Example 85. The results are also shown in Table 4.

TABLE 4

| Example | No. of photosensitive member | ΔVd (V) | ΔVl (V) |
|---|---|---|---|
| Ex. 85 | 14 | 0 | +15 |
| Ex. 86 | 16 | −10 | +15 |
| Ex. 87 | 18 | −5 | −10 |
| Ex. 88 | 20 | 0 | +20 |
| Ex. 89 | 21 | −5 | +10 |
| Comp. Ex. 6 | 24 | −110 | +105 |

The results in Table 4 above show that each photosensitive member according to the present invention exhibited little potential fluctuation in repetition of electrophotographic cycles.

EXAMPLE 90

An aluminum vapor-deposited polyethylene terephthalate film was provided with a 0.5 μm-thick undercoating layer of polyvinyl alcohol on its aluminum-deposited surface and further a 0.2 μm-thick charge generation layer of the same composition as in Example 82.

Then, a solution of 5 parts of styryl compound of the following formula:

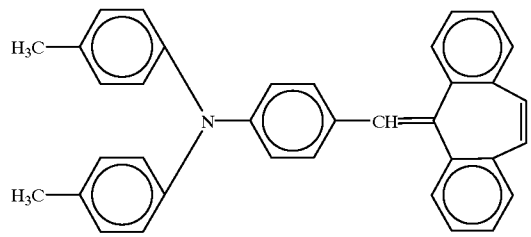

and 5 parts of polycarbonate resin ("Z-200" (trade name), mfd. by Mitsubishi Kagaku K.K.) in 40 parts of tetrahydrofuran was applied onto the charge generation layer and dried to form a 16 μm-thick charge transport layer, thereby providing an electrophotographic photosensitive member.

The thus-prepared photosensitive member was evaluated with respect to sensitivity and potential stability in the same manner as in Examples 74 and 85, whereby the following results were obtained.

Sensitivity=0.47 μJ/cm$^2$
ΔVd=−10 volts
ΔVl=+20 volts

EXAMPLE 91

An aluminum vapor-deposited polyethylene terephthalate film was provided with a 0.5 μm-thick undercoating layer of polyvinyl alcohol on its aluminum-deposited surface and further a 0.2 μm-thick charge generation layer of the same composition as in Example 67.

Then, a solution of 5 parts of benzidine compound of the following formula:

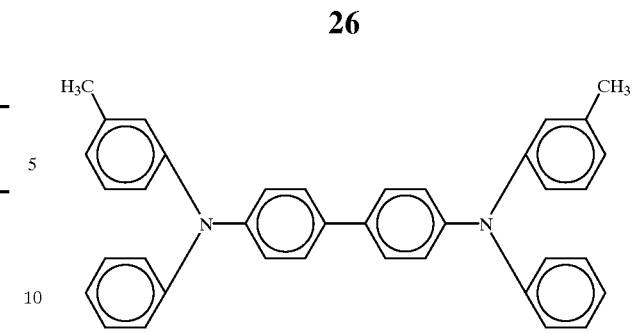

and 5 parts of polycarbonate resin ("Z-200" (trade name), mfd. by Mitsubishi Kagaku K.K.) in 40 parts of tetrahydrofuran was applied onto the charge generation layer and dried to form a 16 μm-thick charge transport layer, thereby providing an electrophotographic photosensitive member.

The thus-prepared photosensitive member was evaluated with respect to sensitivity and potential stability in the same manner as in Examples 74 and 85, whereby the following results were obtained.

Sensitivity=0.47 μJ/cm$^2$
ΔVd=−5 volts
ΔVl=+30 volts

EXAMPLE 92

Figure 60:
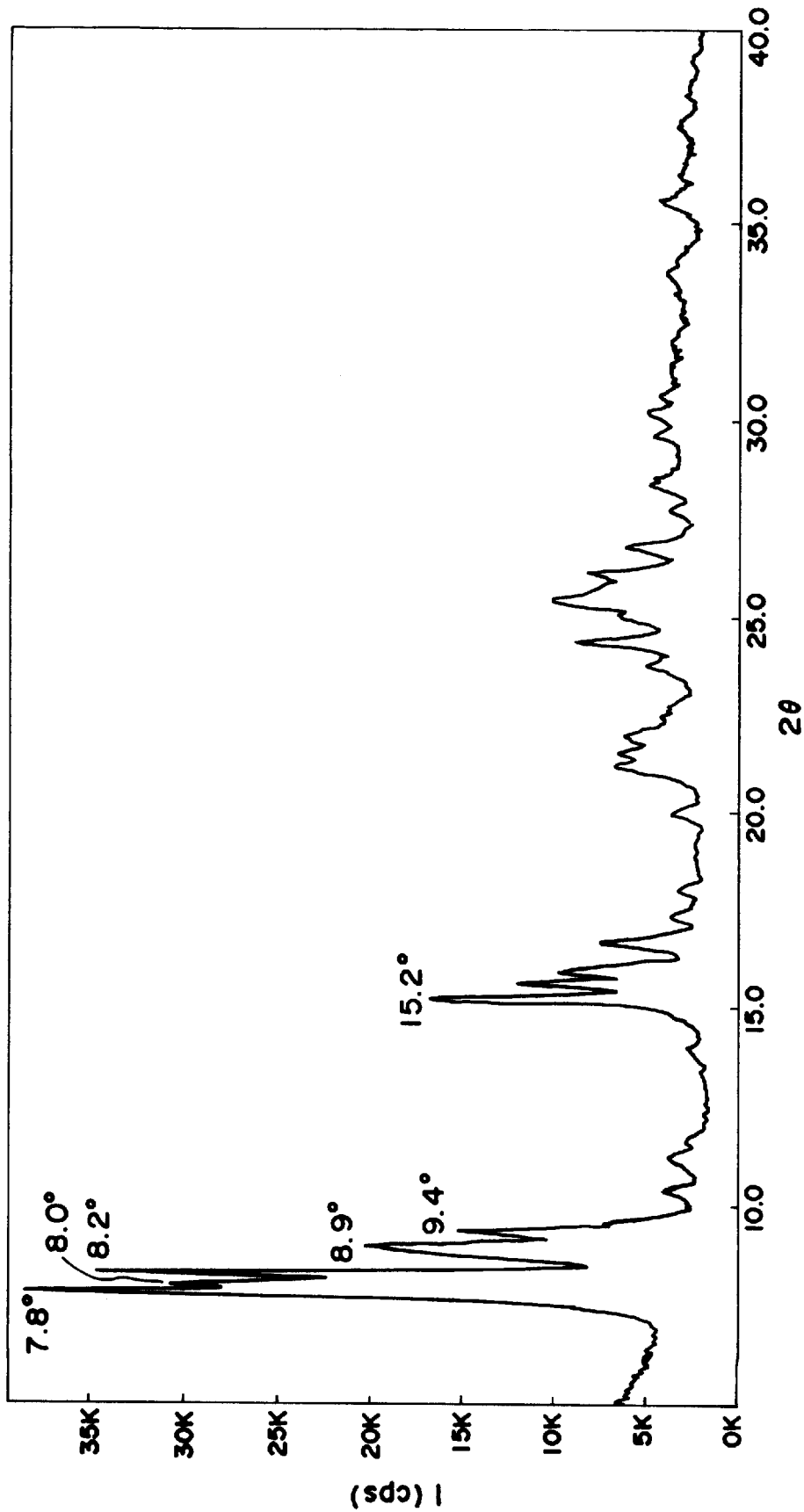
FIGS. 60–75 each show an X-ray diffraction pattern of a zirconium phthalocyanine according to the invention.
Figure 76:
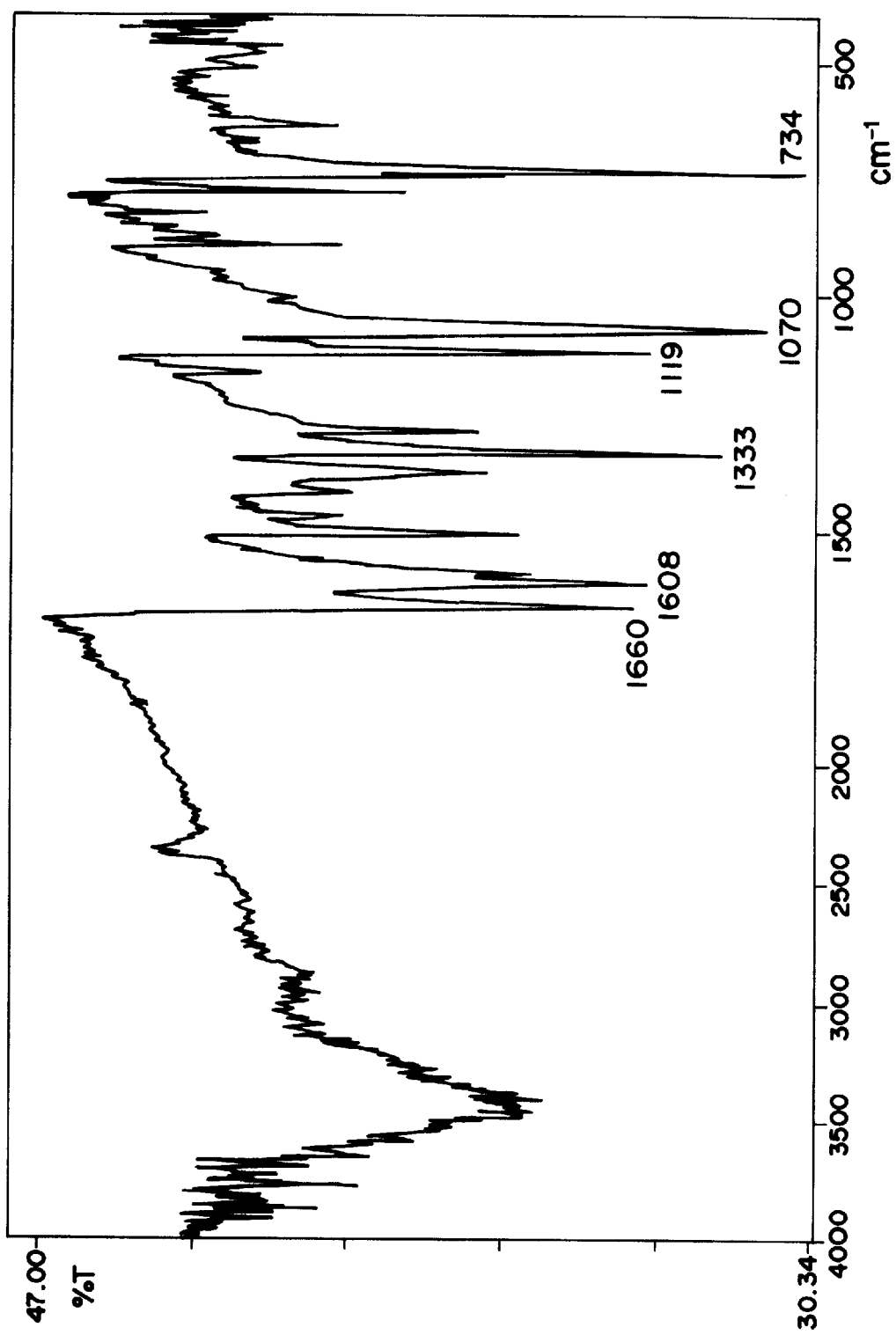
FIGS. 76 and 77 each show an infrared absorption spectrum of zirconium phthalocyanine according to the invention.

22 parts of phthalonitrile, 10 parts of zirconium tetrachloride and 100 parts of quinoline were stirred for 4 hours under heating at 180° C. in a nitrogen atmosphere, followed by cooling to 130° C. and filtration. The recovered solid was subjected to 3 times of washing with 200 parts of N,N-dimethylformamide at 130° C. for 2 hours under stirring, followed by filtration, washing with methanol on the filter and drying to obtain a crystal, which was found to comprise zirconium phthalocyanine with an X-ray diffraction pattern shown in FIG. 60 showing strong peaks at Bragg angles (2θ) of 7.8 deg., 8.0 deg. and 8.2 deg. The zirconium phthalocyanine also exhibited an infrared-absorption spectrum shown in FIG. 76.

The compound also exhibited a mass spectrum value (FAB-MS, matrix: NBA) of 619 (m/Z) and the following elementary analysis results ($C_{32}H_{18}N_8O_2Zr$):

| | C (%) | H (%) | N (%) |
|---|---|---|---|
| Calculated value | 60.26 | 2.84 | 17.57 |
| Measured value | 58.33 | 3.02 | 16.82 |

EXAMPLE 93

Figure 61:
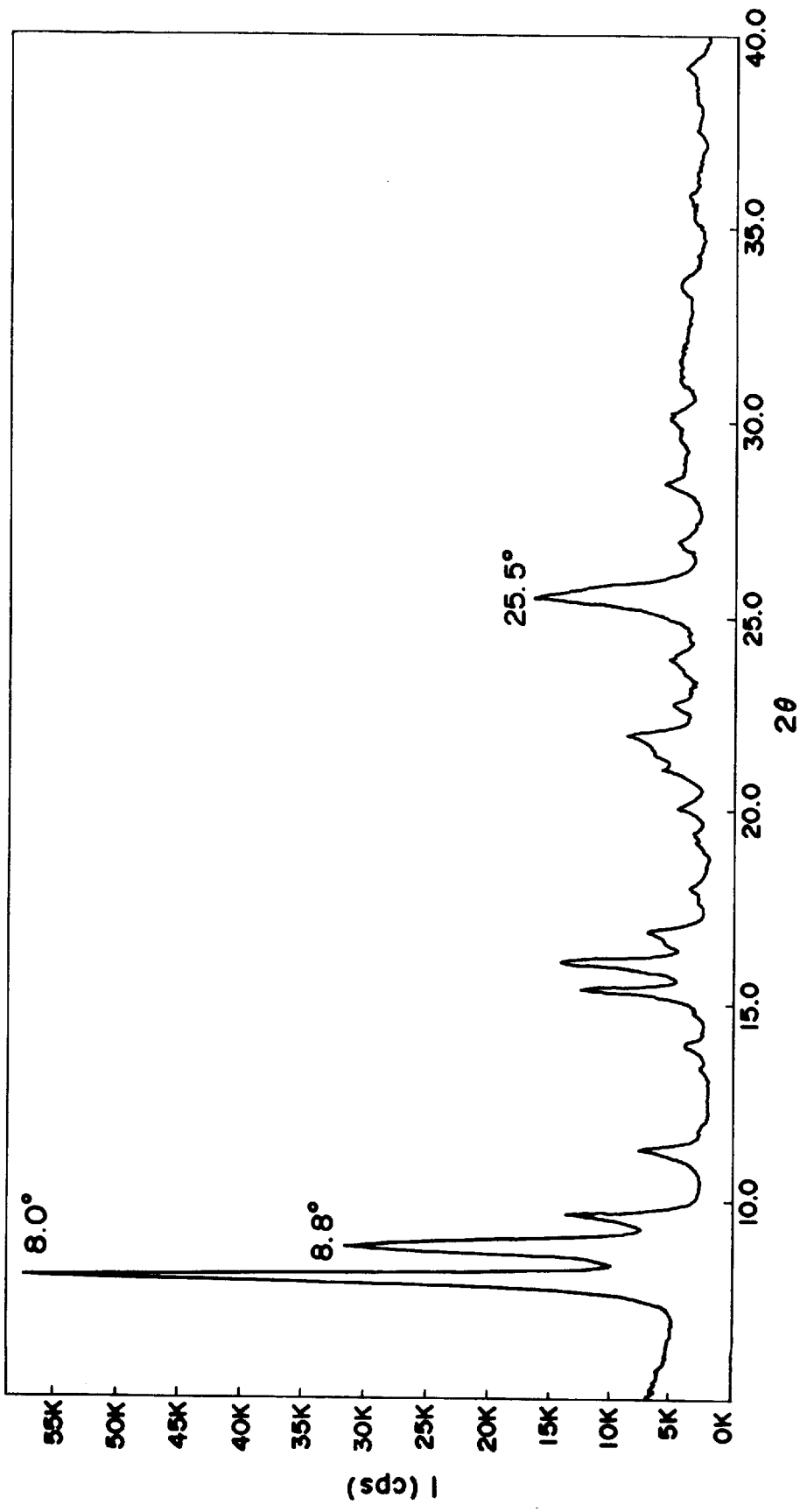
Figure 77:
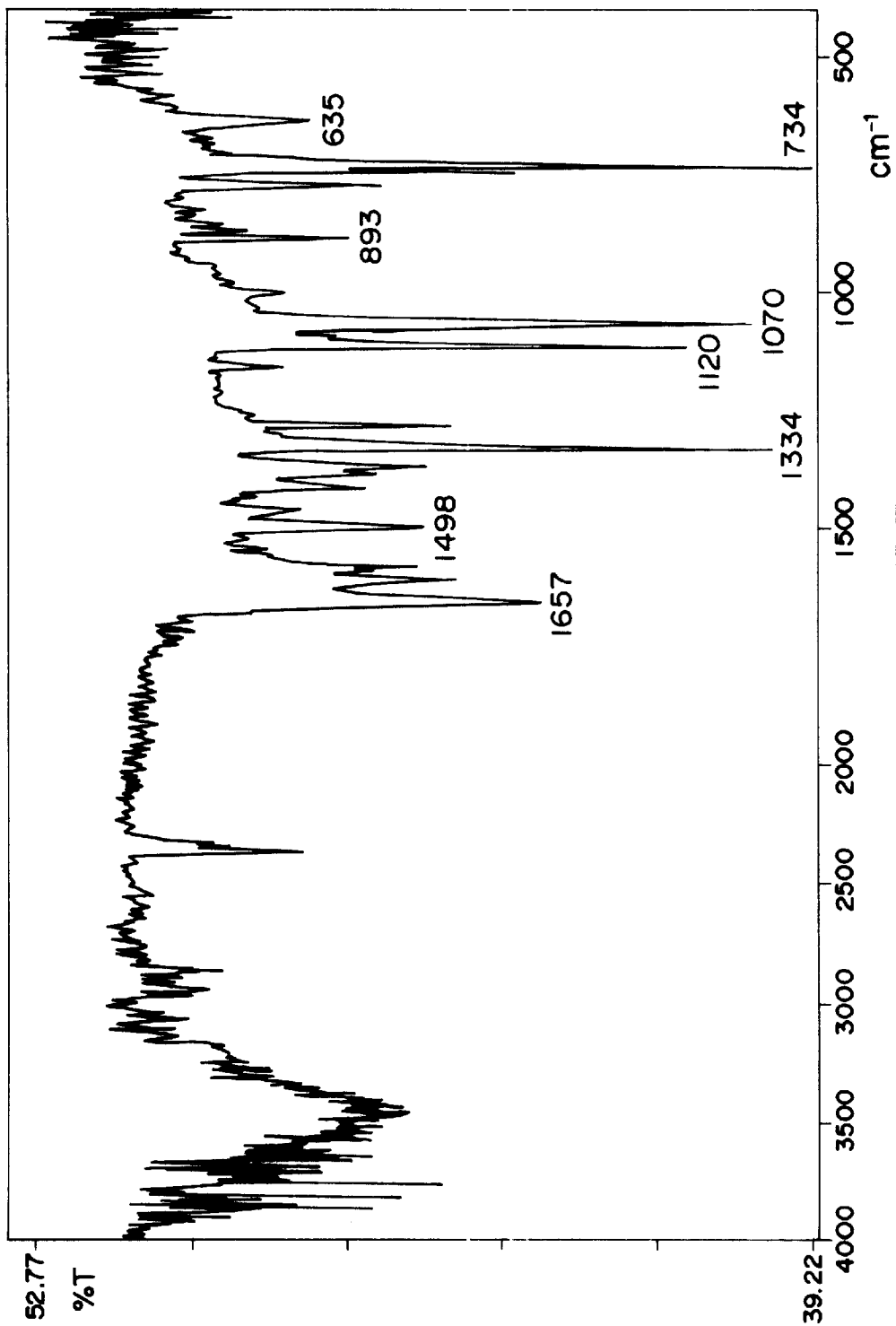

22 parts of phthalonitrile, 40 parts of zirconium tetrachloride and 440 parts of quinoline were stirred for 4 hours under heating at 180° C. in a nitrogen atmosphere, followed by cooling to 130° C. and filtration. The recovered solid was subjected to 3 times of washing with 200 parts of N,N-dimethylformamide at 130° C. for 2 hours under stirring, followed by filtration, washing with methanol on the filter and drying to obtain a crystal, which was found to comprise zirconium phthalocyanine with an X-ray diffraction pattern shown in FIG. 61 showing strong peaks at Bragg angles (2θ) of 8.0 deg. and 8.2 deg. The zirconium phthalocyanine also exhibited an infrared-absorption spectrum shown in FIG. 77.

The compound also exhibited a mass spectrum value (FAB-MS, matrix: NBA) of 619 (m/Z) and the following elementary analysis results ($C_{32}H_{18}N_8O_2Zr$):

|  | C (%) | H (%) | N (%) |
|---|---|---|---|
| Calculated value | 60.26 | 2.84 | 17.57 |
| Measured value | 59.56 | 2.78 | 17.35 |

EXAMPLE 94

Figure 62:
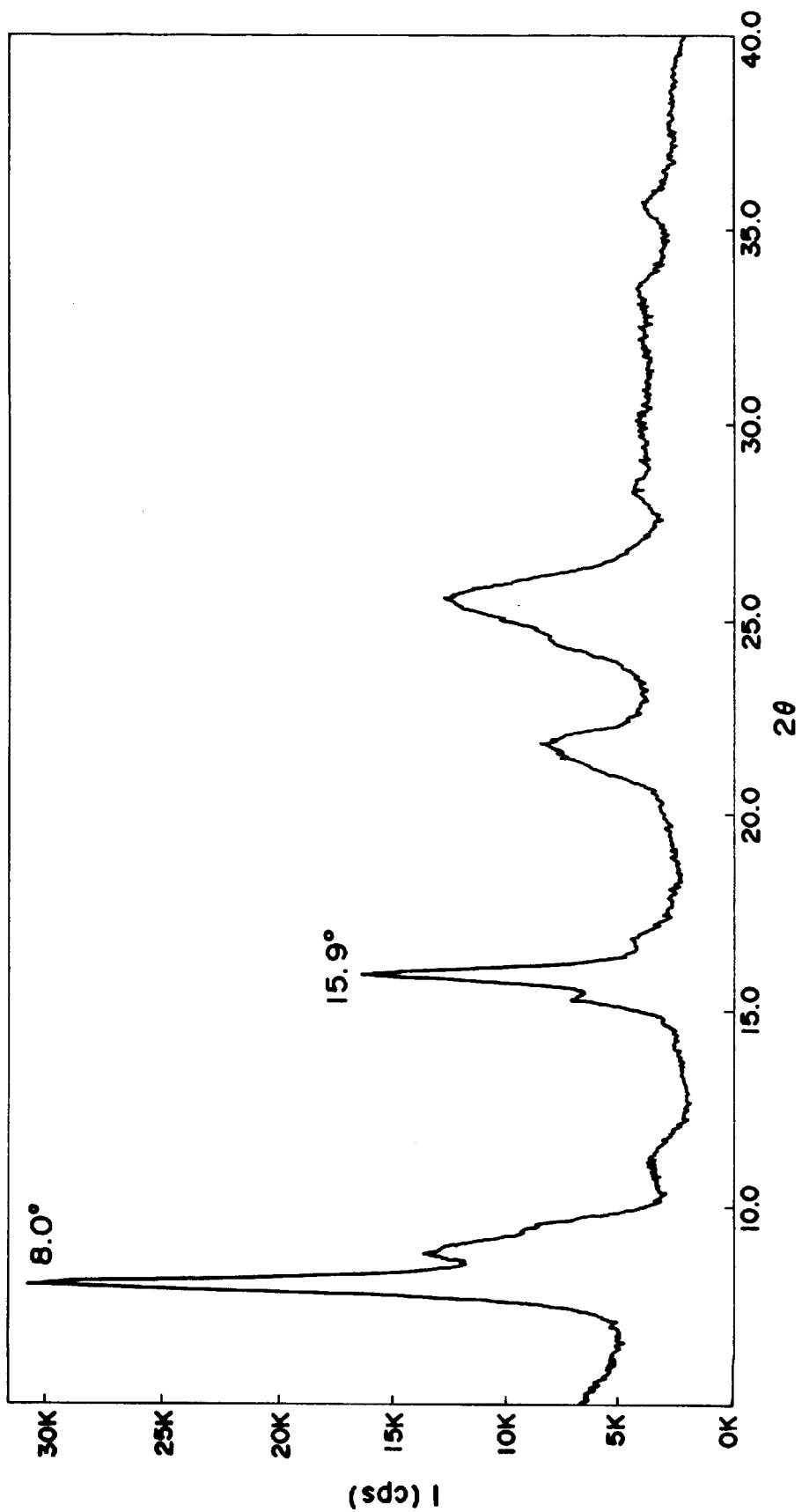

0.3 part of the crystal obtained in Example 92, 10 parts of N,N-dimethylformamide and 10 parts of 1 in-dia. glass beads were dispersed for 24 hours in a paint shaker, followed by filtration, washing with methanol and drying to recover a crystal, which was found to comprise zirconium phthalocyanine with an X-ray diffraction pattern shown in FIG. 62 showing a strong peak at a Bragg angle (2θ) of 8.0 deg.

EXAMPLE 95

Figure 63:
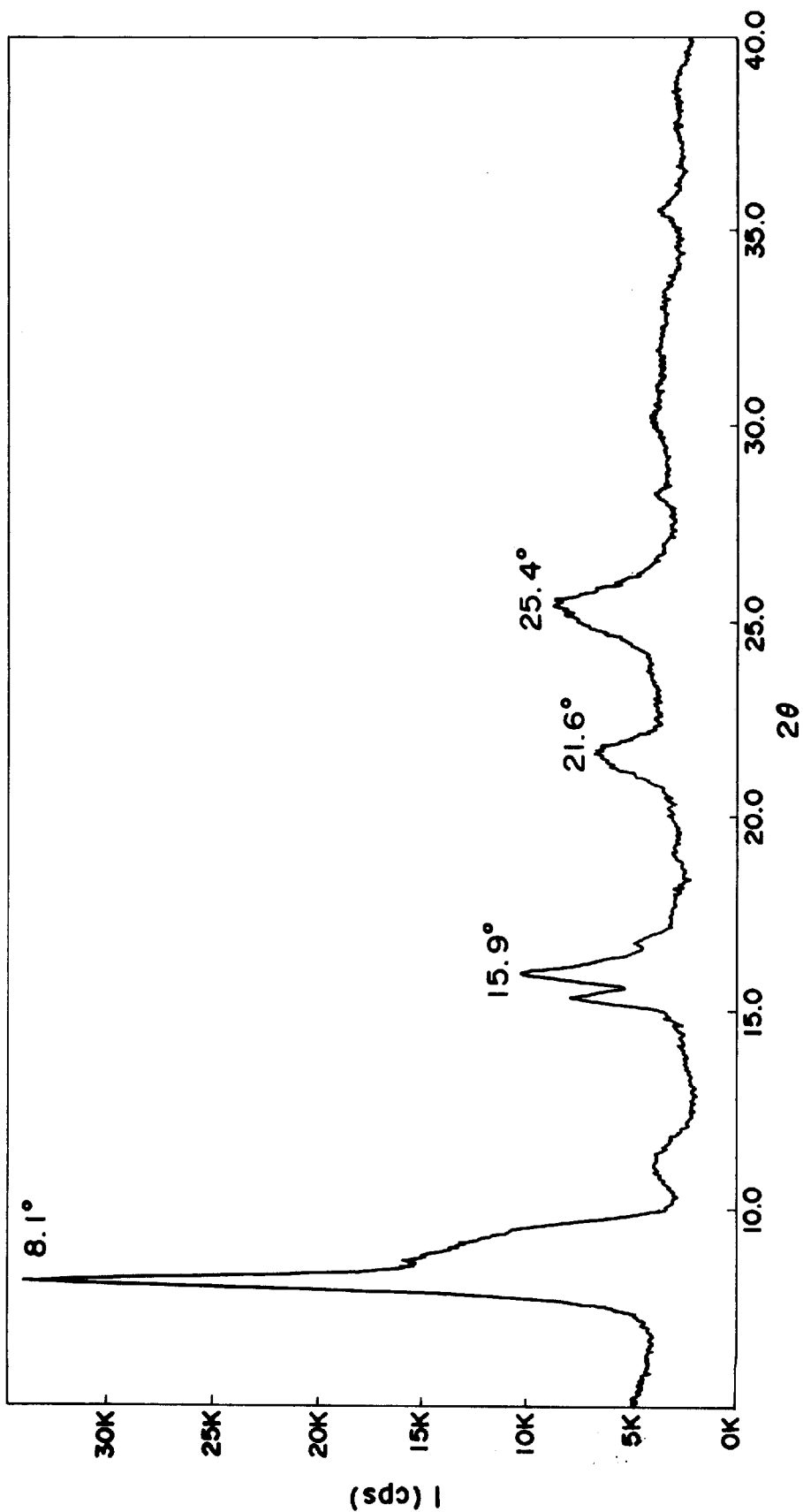

0.3 part of the crystal obtained in Example 92, 10 parts of tetrahydrofuran and 10 parts of 1 mm-dia. glass beads were dispersed for 24 hours in a paint shaker, followed by filtration, washing with methanol and drying to recover a crystal, which was found to comprise zirconium phthalocyanine with an X-ray diffraction pattern shown in FIG. 63 showing a strong peak at a Bragg angle (2θ) of 8.1 deg.

EXAMPLE 96

Figure 64:
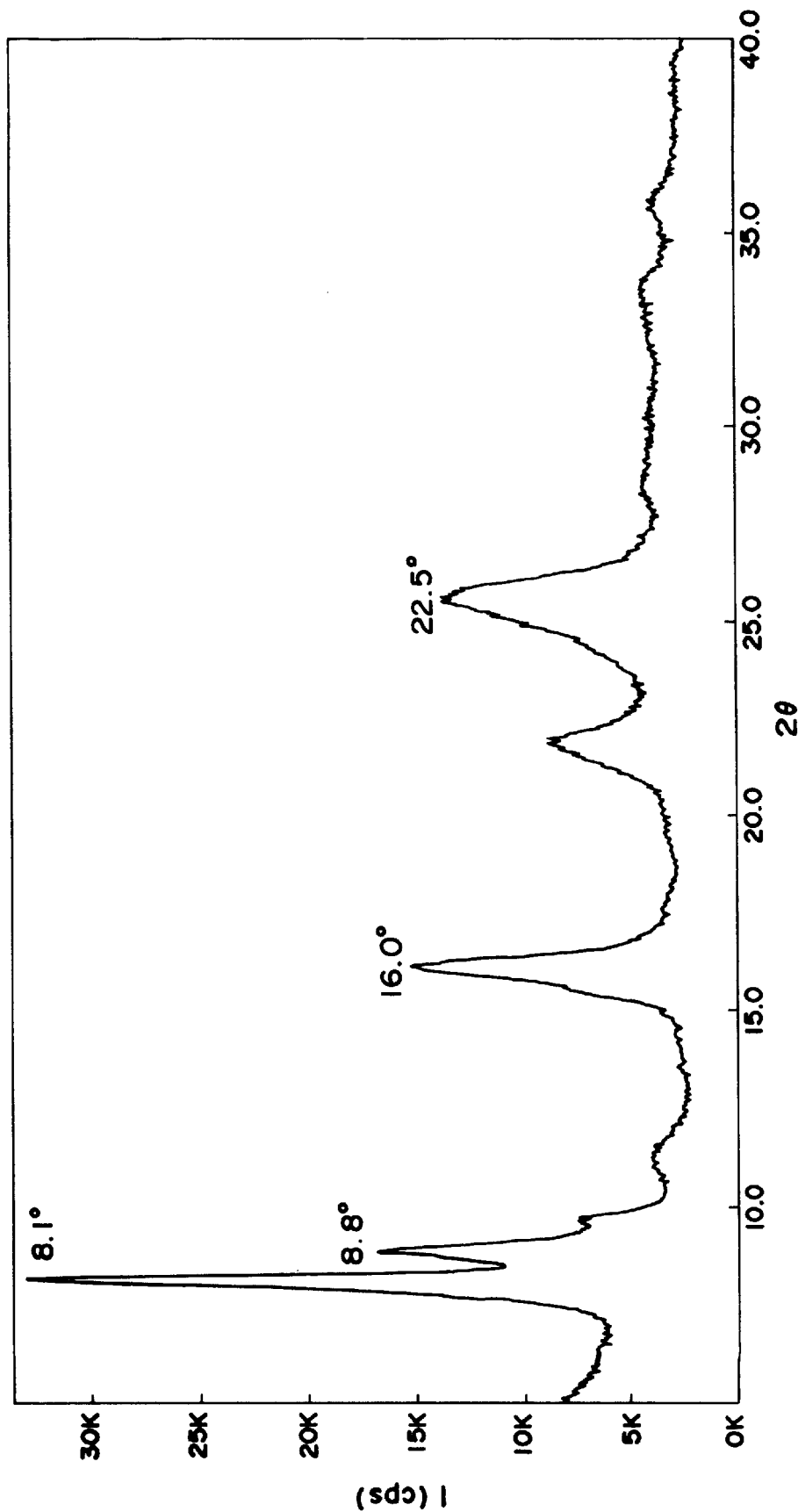

0.3 part of the crystal obtained in Example 92, 10 parts of methanol and 10 parts of 1 mm-dia. glass beads were dispersed for 24 hours in a paint shaker, followed by filtration, washing with methanol and drying to recover a crystal, which was found to comprise zirconium phthalocyanine with an X-ray diffraction pattern shown in FIG. 64 showing a strong peak at a Bragg angle (2θ) of 8.1 deg.

EXAMPLE 97

Figure 65:
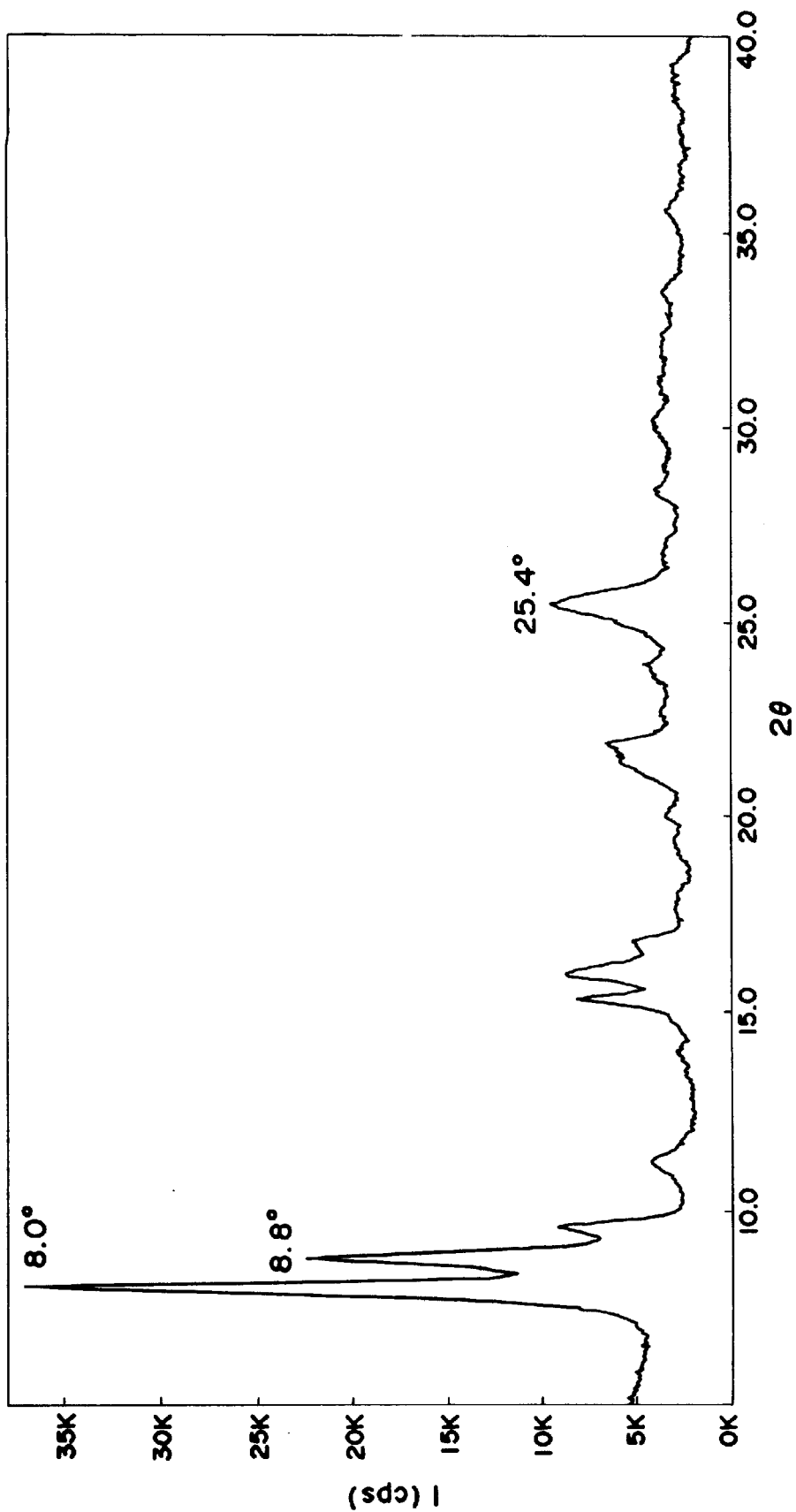

0.3 part of the crystal obtained in Example 92, 10 parts of monochlorobenzene and 10 parts of 1 mm-dia. glass beads were dispersed for 24 hours in a paint shaker, followed by filtration, washing with methanol and drying to recover a crystal, which was found to comprise zirconium phthalocyanine with an X-ray diffraction pattern shown in FIG. 65 showing a strong peak at a Bragg angle (2θ) of 8.0 deg.

EXAMPLE 98

Figure 66:
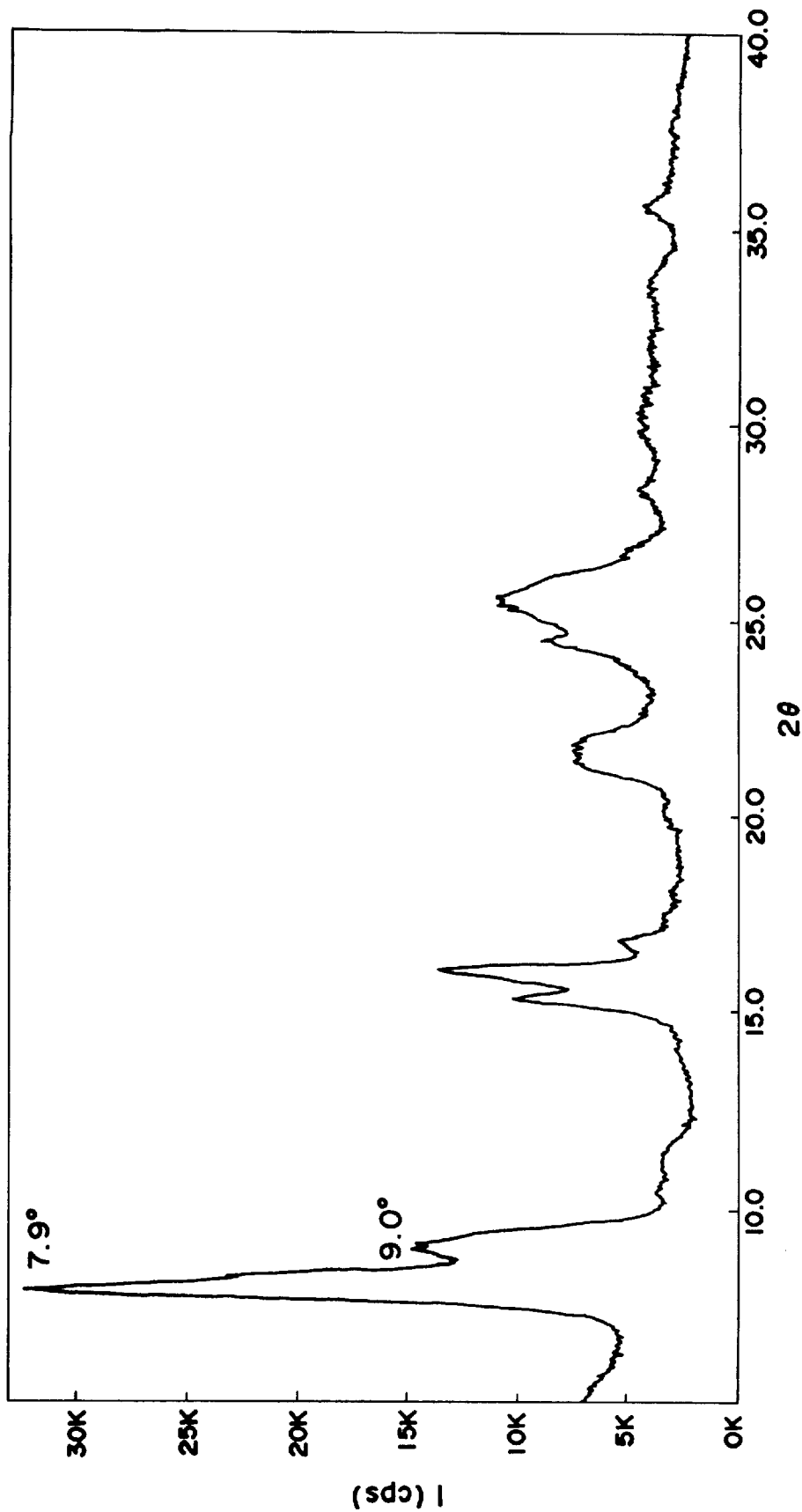

0.3 part of the crystal obtained in Example 93, 10 parts of N,N-dimethylformamide and 10 parts of 1 m-dia. glass beads were dispersed for 24 hours in a paint shaker, followed by filtration, washing with methanol and drying to recover a crystal, which was found to comprise zirconium phthalocyanine with an X-ray diffraction pattern shown in FIG. 66 showing a strong peak at a Bragg angle (2θ) of 7.9 deg.

EXAMPLE 99

Figure 67:
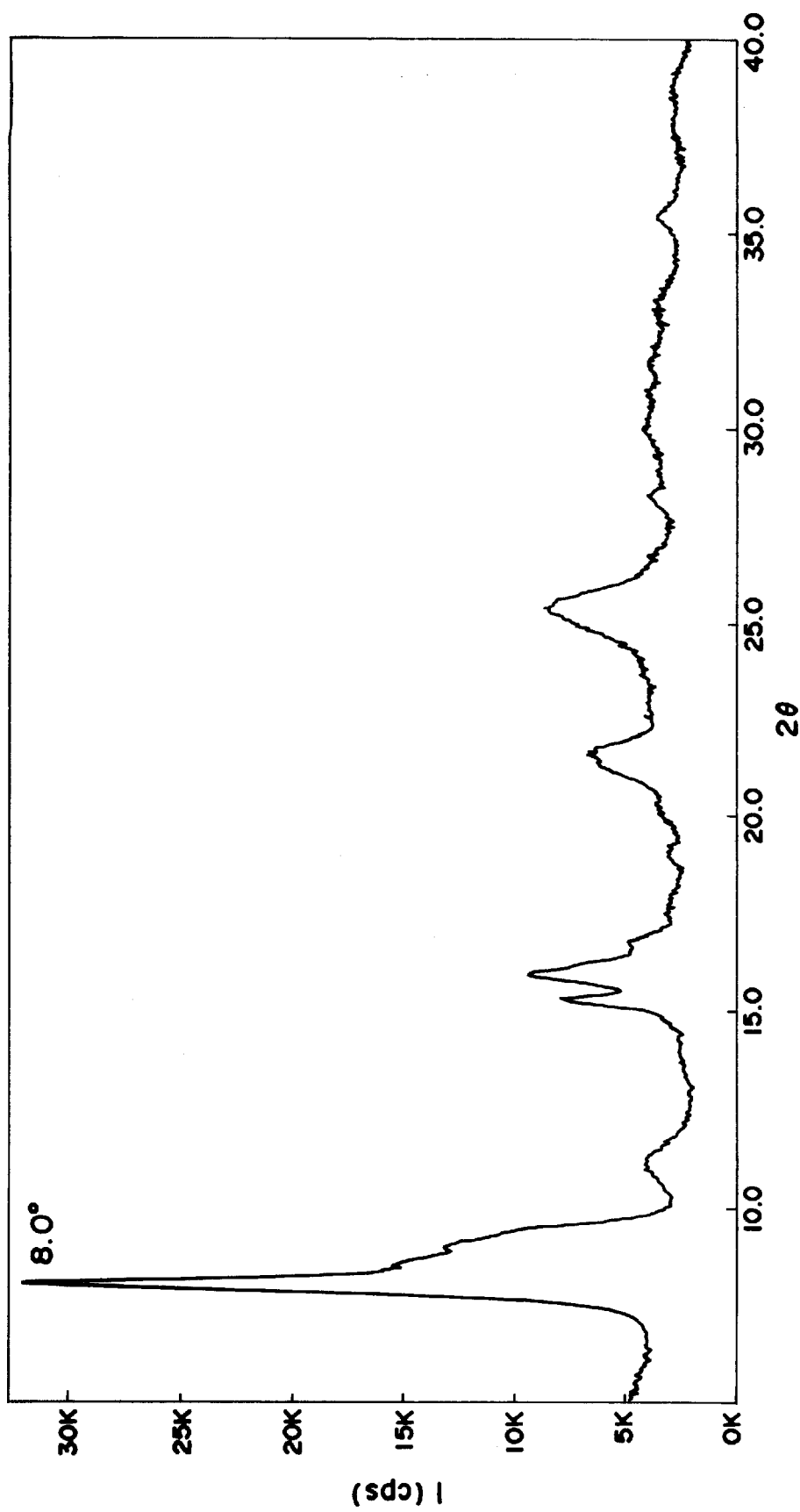

0.3 part of the crystal obtained in Example 93, 10 parts of tetrahydrofuran and 10 parts of 1 mm-dia. glass beads were dispersed for 24 hours in a paint shaker, followed by filtration, washing with methanol and drying to recover a crystal, which was found to comprise zirconium phthalocyanine with an X-ray diffraction pattern shown in FIG. 67 showing a strong peak at a Bragg angle (2θ) of 8.0 deg.

EXAMPLE 100

Figure 68:
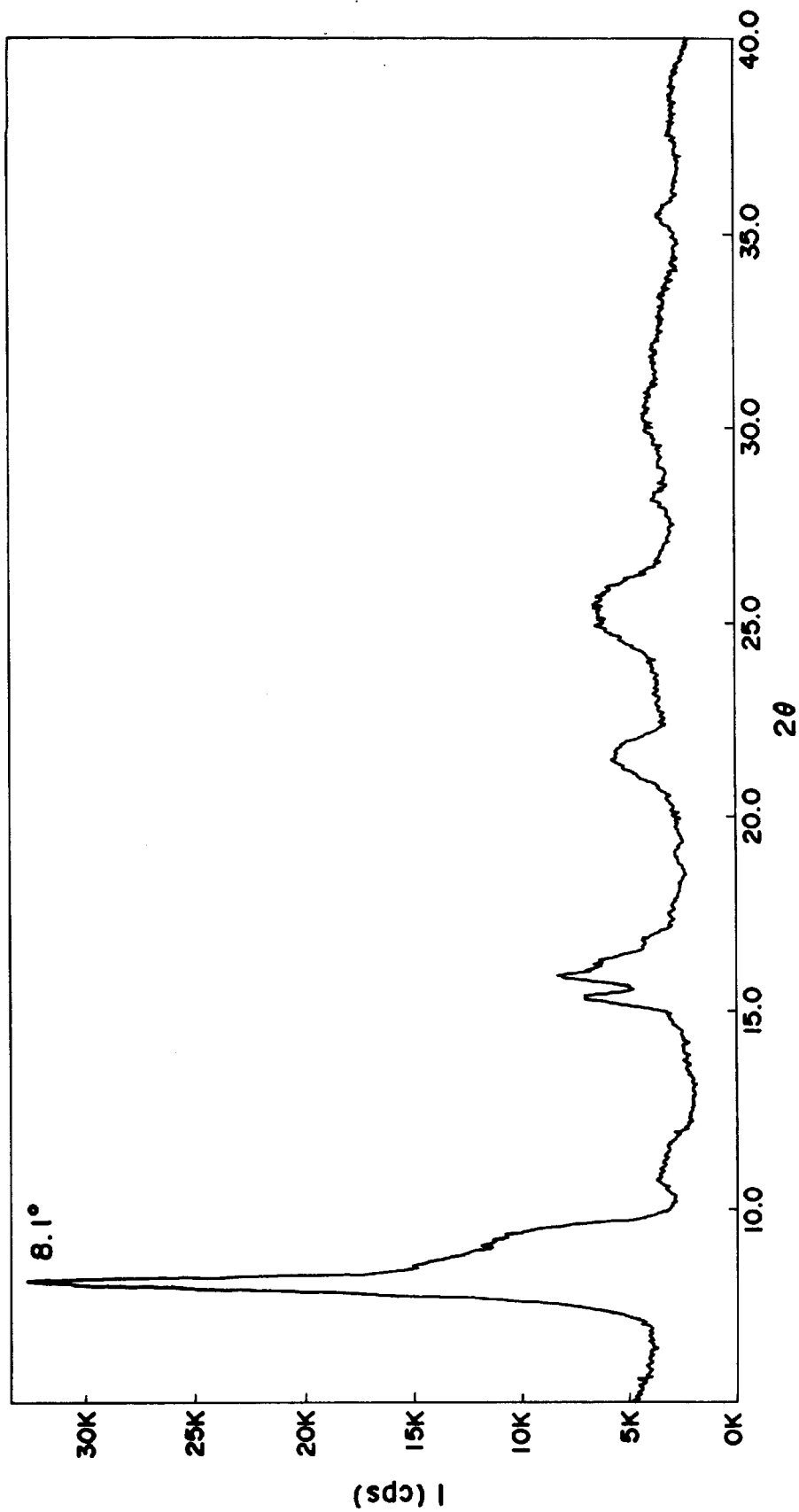

0.3 part of the crystal obtained in Example 93, 10 parts of chloroform and 10 parts of 1 mm-dia. glass beads were dispersed for 24 hours in a paint shaker, followed by filtration, washing with methanol and drying to recover a crystal, which was found to comprise zirconium phthalocyanine with an X-ray diffraction pattern shown in FIG. 68 showing a strong peak at a Bragg angle (2θ) of 8.1 deg.

EXAMPLE 101

Figure 69:
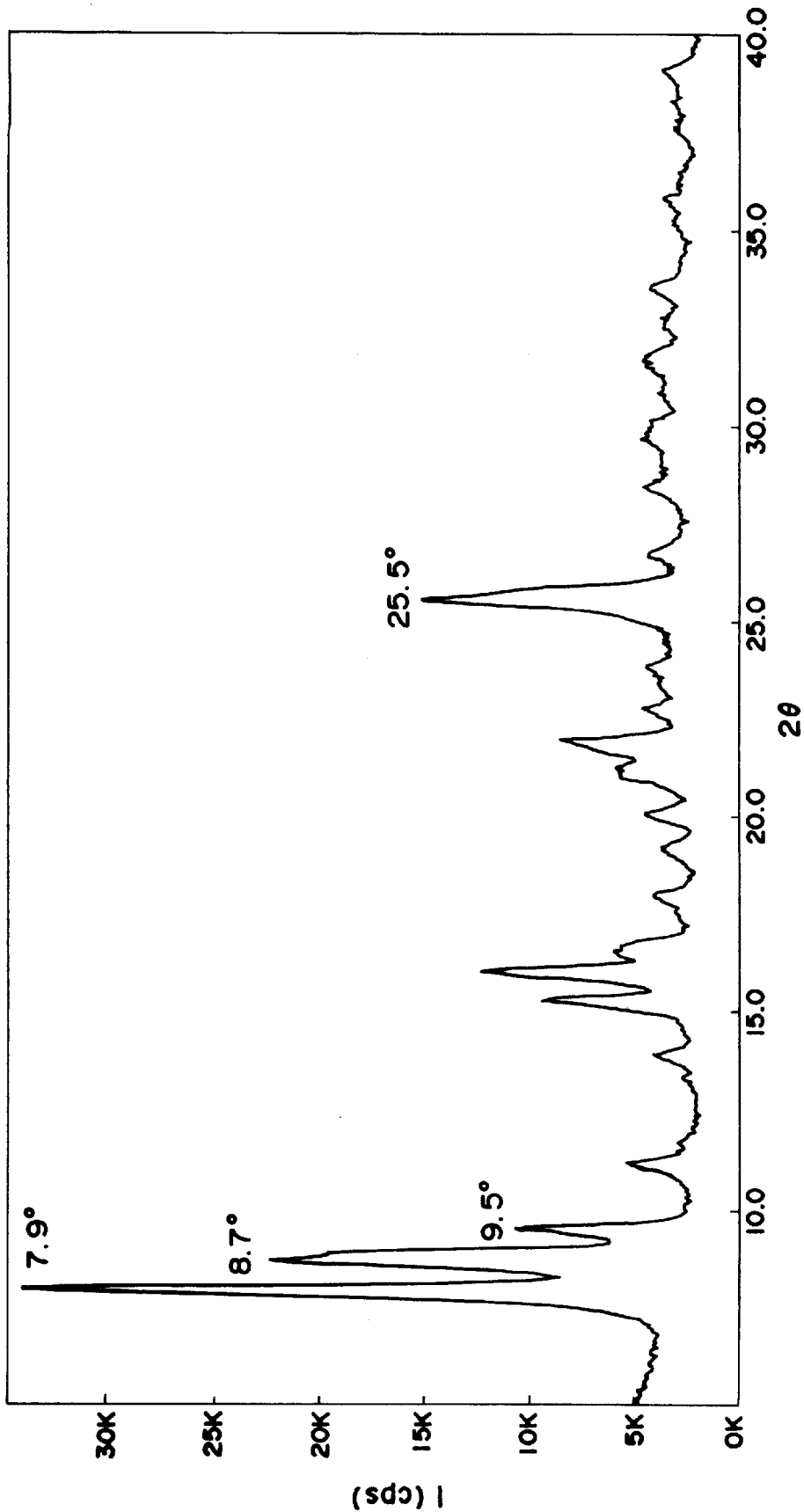

0.3 part of the crystal obtained in Example 93, 10 parts of monochlorobenzene and 10 parts of 1 mm-dia. glass beads were dispersed for 24 hours in a paint shaker, followed by filtration, washing with methanol and drying to recover a crystal, which was found to comprise zirconium phthalocyanine with an X-ray diffraction pattern shown in FIG. 69 showing strong peaks at Bragg angles (2θ) of 7.9 deg. and 8.7 deg.

Figure 70:
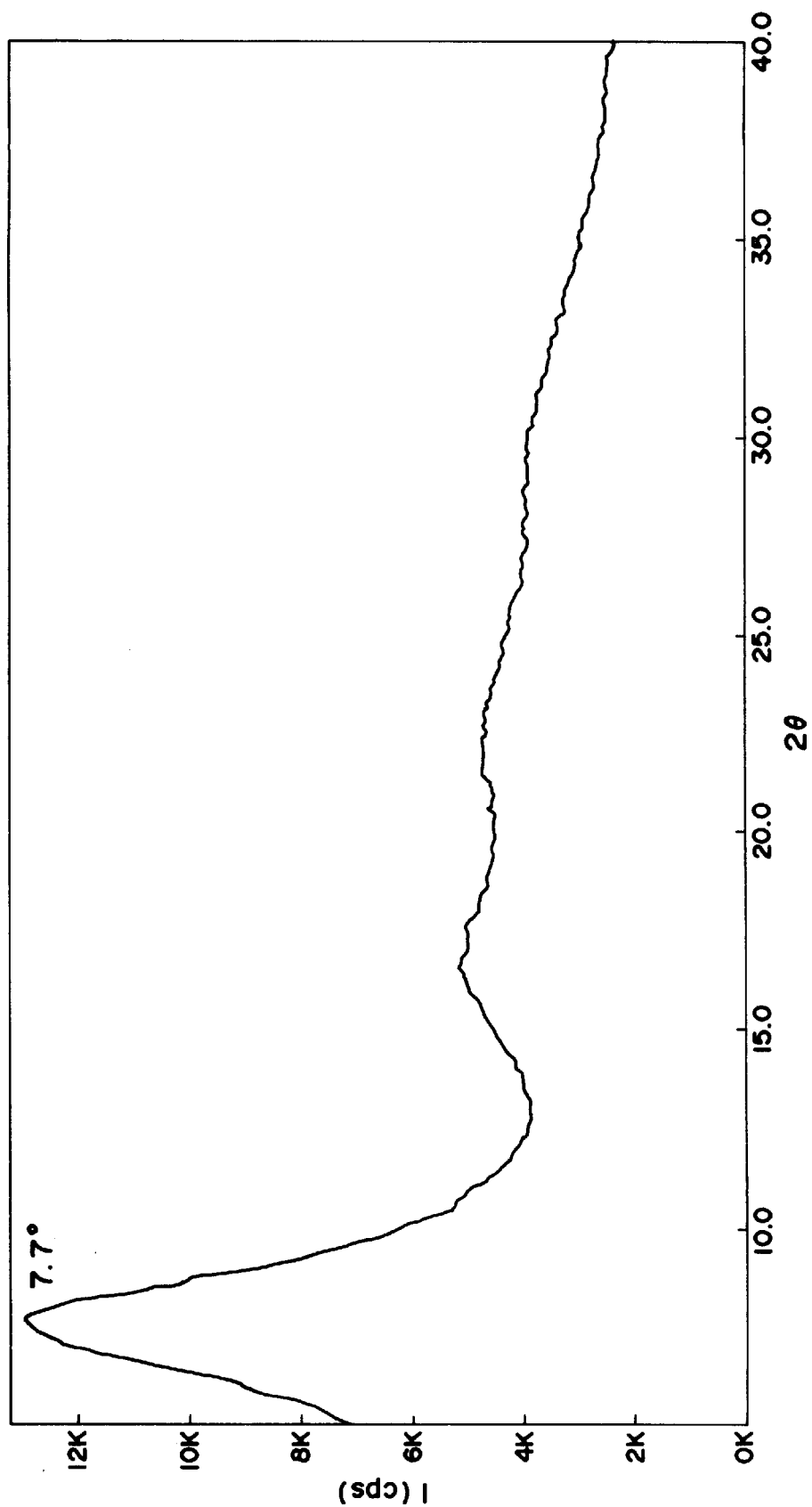

REFERENCE EXAMPLE 3 parts of the crystal obtained in Example 93 and 120 parts of 1 mm-dia. glass beads were dispersed for 24 hours in a paint shaker, followed by ultrasonic treatment in water, filtration and drying to recover zirconium phthalocyanine with an X-ray diffraction pattern shown in FIG. 70.

EXAMPLE 102

Figure 71:
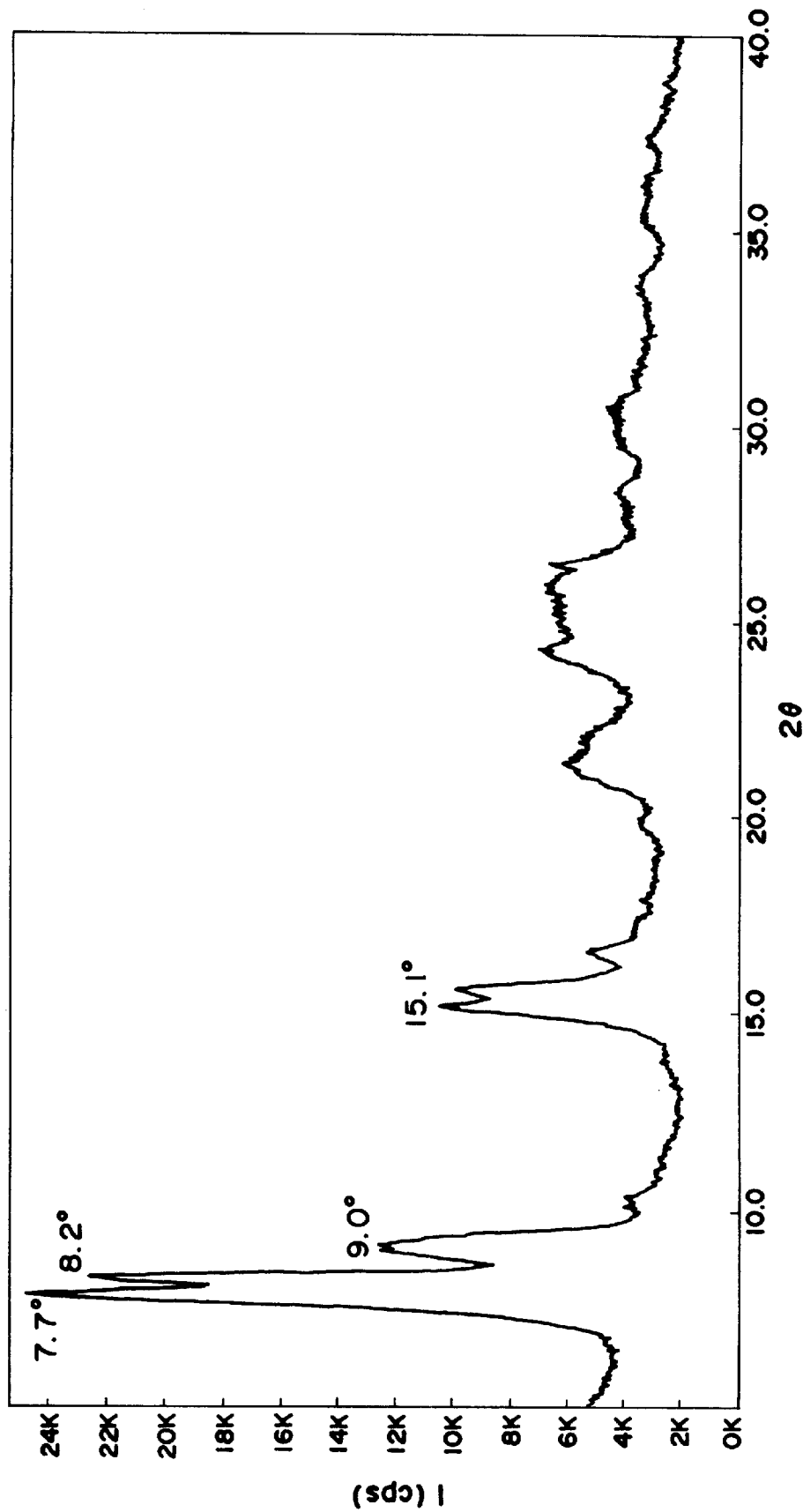

0.3 part of rather amorphous zirconium phthalocyanine obtained in Reference Example, 10 parts of N,N-dimethylformamide and 10 parts of 1 mm-dia. glass beads were dispersed for 24 hours in a paint shaker, followed by filtration, washing with methanol and drying to recover a crystal, which was found to comprise zirconium phthalocyanine with an X-ray diffraction pattern shown in FIG. 71 showing strong peaks at Bragg angle (2θ) of 7.7 deg. and 8.2 deg.

EXAMPLE 103

Figure 72:
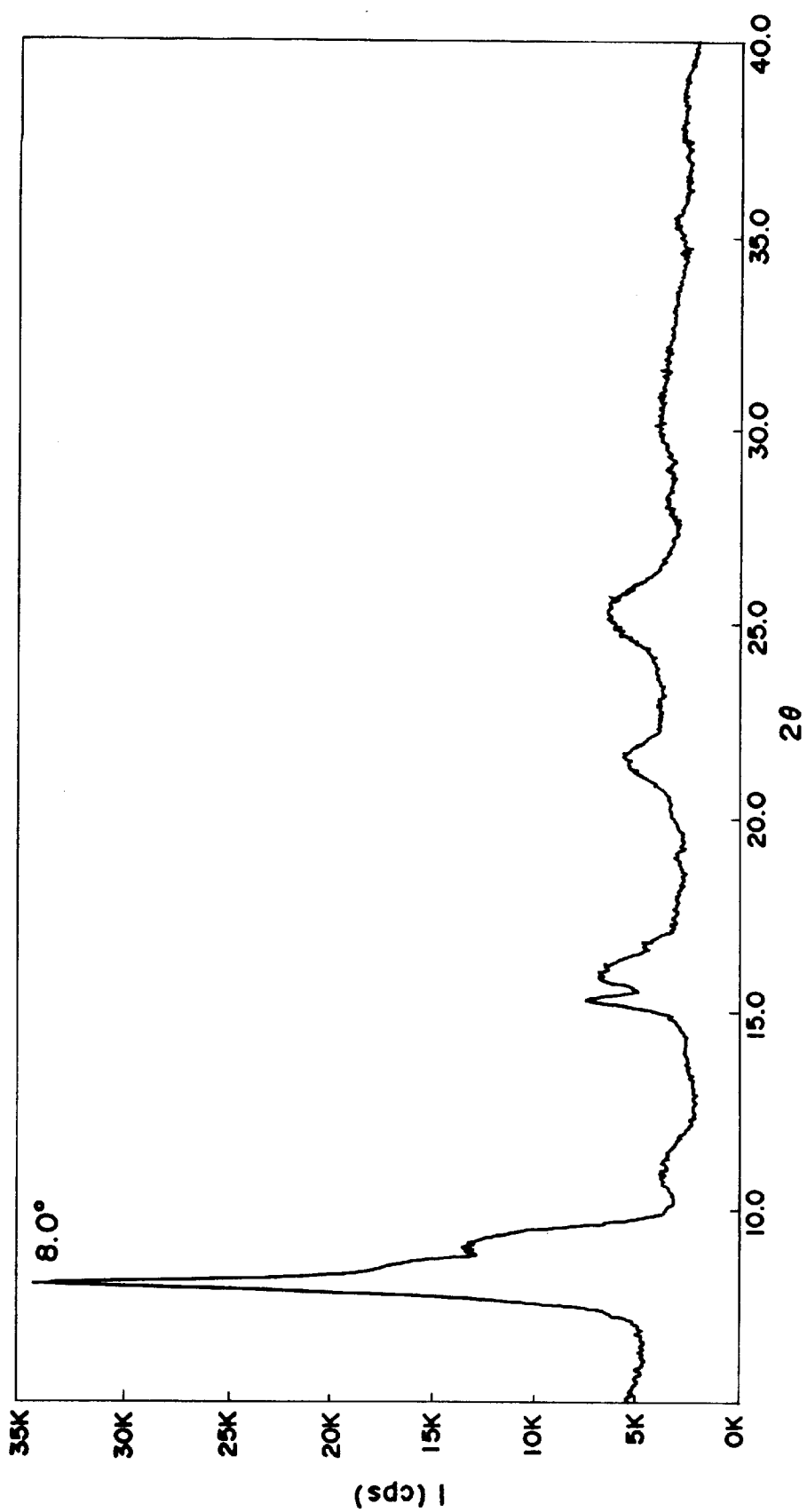

0.3 part of the crystal obtained in Example 93, 10 parts of tetrahydrofuran and 10 parts of 1 mm-dia. glass beads were dispersed for 24 hours in a paint shaker, followed by filtration, washing with methanol and drying to recover a crystal, which was found to comprise zirconium phthalocyanine with an X-ray diffraction pattern shown in FIG. 72 showing a strong peak at a Bragg angle (2θ) of 8.0 deg.

EXAMPLE 104

Figure 73:
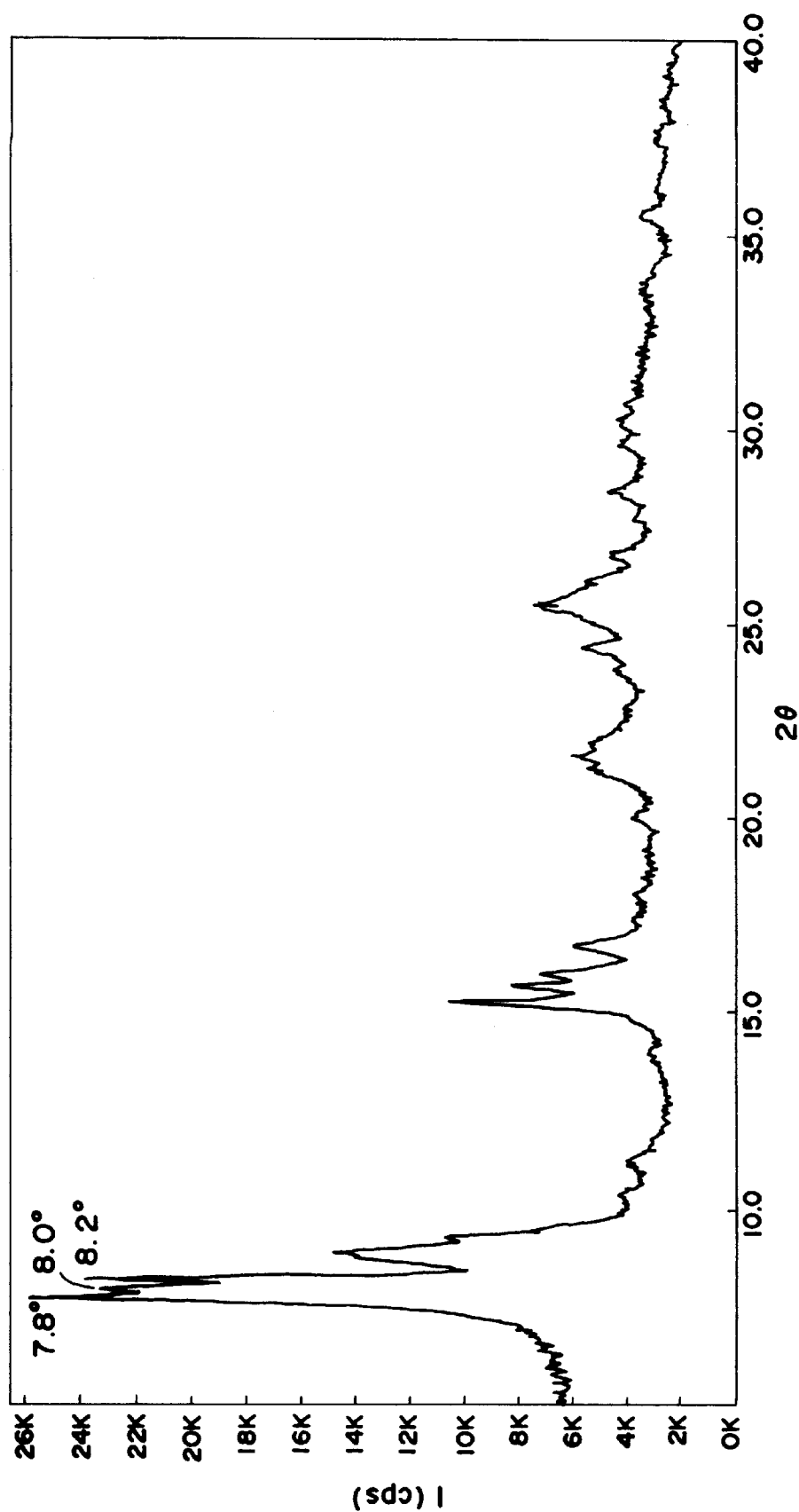

5 parts of the crystal obtained in Example 93 was treated for 4 hours in an automatic mortar ("ANM-150" (trade name), available from Nitto Kagaku K.K. and comprising a porcelain mortar and a porcelain pestle rotating at fixed speeds of 6 rpm and 100 rpm, respectively, in mutually reverse directions) to recover a crystal, which was found to comprise zirconium phthalocyanine with an X-ray diffraction pattern shown in FIG. 73 showing strong peaks at 7.8 deg., 8.0 deg. and 8.2 deg.

EXAMPLE 105

Figure 74:
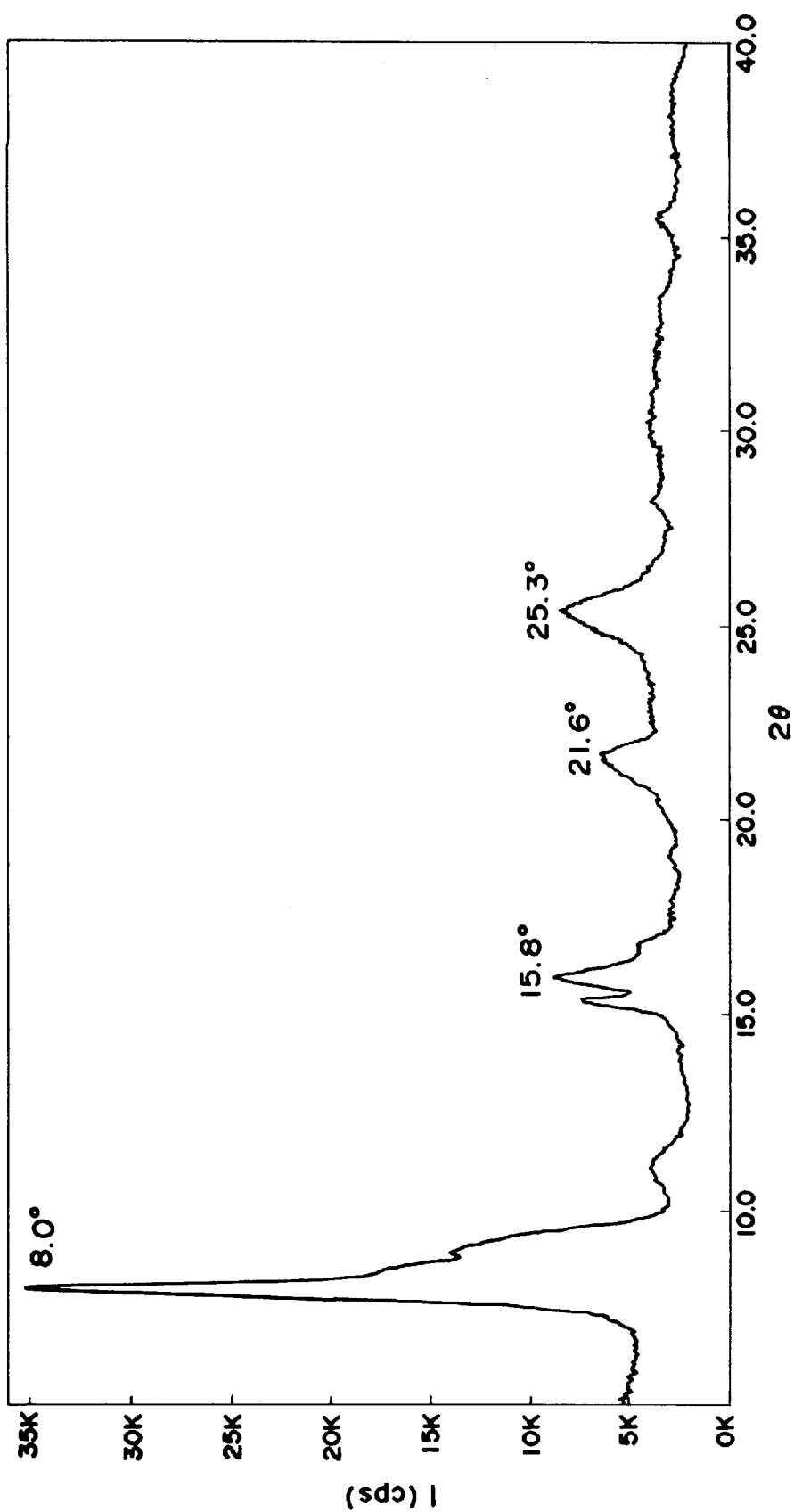

0.3 part of the crystal obtained in Example 104, 10 parts of tetrahydrofuran and 10 parts of 1 mm-dia. glass beads were dispersed for 24 hours in a paint shaker, followed by filtration, washing with methanol and drying to recover a crystal, which was found to comprise zirconium phthalocyanine with an X-ray diffraction pattern shown in FIG. 74 showing a strong peak at a Bragg angle (2θ) of 8.0 deg.

EXAMPLE 106

Figure 75:
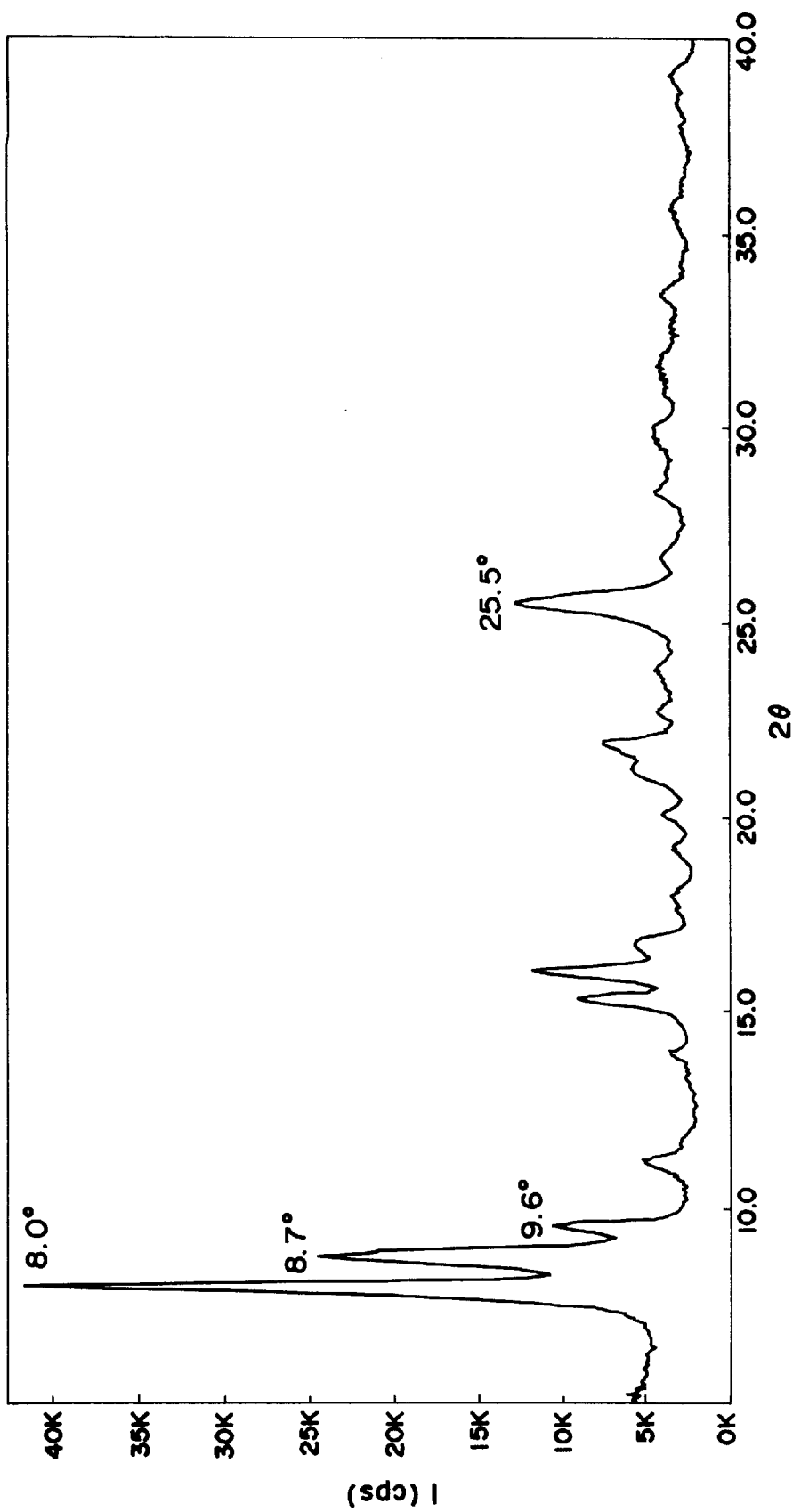

0.3 part of the crystal obtained in Example 104, 10 parts of monochlorobenzene and 10 parts of 1 mm-dia. glass beads were dispersed for 24 hours in a paint shaker, followed by filtration, washing with methanol and drying to recover a crystal, which was found to comprise zirconium phthalocyanine with an X-ray diffraction pattern shown in FIG. 75 showing a strong peak at a Bragg angle (2θ) of 8.0 deg.

Hereinbelow, some examples for preparation of electrophotographic photosensitive members by using zirconium phthalocyanines prepared above will be described.

EXAMPLE 107

An aluminum substrate was coated with a solution of 5 g of methoxymethylated nylon resin (Mw (weight-average molecular weight)=$3.2 \times 10^4$) and 10 g of alcohol-soluble copolymer nylon (Mw=$2.9 \times 10^4$) in 95 g of methanol by using a wire bar and dried to form a 1 μm-thick undercoating layer.

Then, 3 parts of the zirconium phthalocyanine prepared in Example 94 was added to a solution of 2 parts of polyvinylbutyral in 60 parts of cyclohexanone, and the mixture was dispersed together with 100 parts of 1 mm-dia. glass beads for 3 hours in a sand mill. The resultant dispersion was further diluted with 100 parts of ethyl acetate, and applied by a wire bar over the undercoating layer, followed by drying to form a 0.2 μm-thick charge generation layer.

Then, a solution of 5 parts of a triarylamine compound of the following formula:

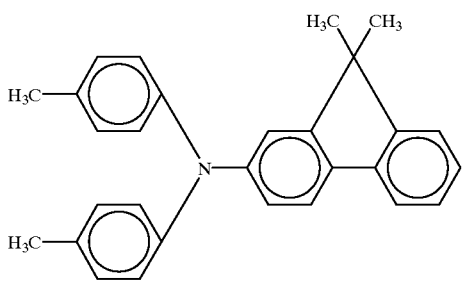

and 5 parts of polycarbonate resin ("Z-200" (trade name), mfd. by Mitsubishi Kagaku K.K.) in 35 parts of chlorobenzene was applied by a wire bar onto the charge generation layer and dried to form a 19 μm-thick charge transport layer, thereby providing an electrophotographic photosensitive member.

EXAMPLES 108–117

Electrophotographic photosensitive members were prepared in the same manner as in Example 107 except for using zirconium phthalocyanine prepared in the respective Examples shown in Table 5 below as charge generation materials instead of zirconium phthalocyanine prepared in Example 94.

COMPARATIVE EXAMPLE 7

An electrophotographic photosensitive member was prepared in the same manner as in Example 107 except for using ε-form copper phthalocyanine as a charge generation material instead of the zirconium phthalocyanine prepared in Example 94.

Each of the above-prepared photosensitive members was applied onto an aluminum cylinder to form a photosensitive drum, which was incorporated in a laser beam printer ("LBX-SX" (trade name), mfd. by Canon K.K.) and subjected to a sensitivity measurement wherein the photosensitive member was first charged to a dark-part potential of −700 volts and illuminated with laser light at a wavelength of 802 nm, thereby measuring a light quantity $E_{1/2}$ required to lower the potential of −700 volts down to a half (−350 volts) as a sensitivity.

The results are inclusively shown in Table 5 below.

TABLE 5

| Example | No. of photosensitive member | Zirconium phthalocyanine Ex. No. | $E_{1/2}$ (μJ/cm$^2$) |
|---|---|---|---|
| Ex. 107 | 26 | (Ex. 94) | 1.00 |
| Ex. 108 | 27 | (Ex. 95) | 0.75 |
| Ex. 109 | 28 | (Ex. 97) | 0.60 |
| Ex. 110 | 29 | (Ex. 98) | 1.40 |
| Ex. 111 | 30 | (Ex. 99) | 0.82 |
| Ex. 112 | 31 | (Ex. 100) | 0.75 |
| Ex. 113 | 32 | (Ex. 101) | 0.49 |
| Ex. 114 | 33 | (Ex. 102) | 1.50 |
| Ex. 115 | 34 | (Ex. 103) | 0.75 |
| Ex. 116 | 35 | (Ex. 104) | 0.58 |
| Ex. 117 | 36 | (Ex. 105) | 1.05 |
| Comp. Ex. 7 | 37 | ε-Cu | 1.42 |

Table 5 shows that each photosensitive member according to the present invention exhibited an excellent sensitivity.

EXAMPLE 118

The electrophotographic photosensitive member prepared in Example 108 was subjected to 5000 cycles of charging and exposure while setting initial dark-part potential Vd and light-part potential Vl to ca. −700 volts and ca. −150 volts respectively, thereby measuring a change in dark-part potential ΔVd and a change in light-part potential ΔVl. The results are shown in Table 2 below together with those of Examples and Comparative Example described below. In Table 2, +(plus) and −(minus) signs preceding the values of ΔVd and ΔVl represents an increase and a decrease, respectively in terms of absolute value of potential.

EXAMPLES 119–122

Photosensitive members (Nos. 28, 32, 34 and 35) prepared in Examples 109, 113, 115 and 116, respectively were subjected to the charging-exposure cycle test in the same manner as in Example 118. The results are also shown in Table 6.

COMPARATIVE EXAMPLE 8

A photosensitive member (No. 37) prepared in Comparative Example 7 was subjected to the charging-exposure cycle test in the same manner as in Example 118. The results are also shown in Table 6.

TABLE 6

| Example | No. of photosensitive member | ΔVd (V) | ΔVl (V) |
|---|---|---|---|
| Ex. 118 | 27 | −5 | +10 |
| Ex. 119 | 29 | −5 | +5 |
| Ex. 120 | 32 | 0 | +5 |
| Ex. 121 | 33 | +5 | +10 |
| Ex. 122 | 35 | −5 | +10 |
| Comp. Ex. 8 | 37 | −110 | +120 |

The results in Table 6 above show that each photosensitive member according to the present invention exhibited little potential fluctuation in repetition of electrophotographic cycles.

EXAMPLE 123

An aluminum vapor-deposited polyethylene terephthalate film was provided with a 0.5 µm-thick undercoating layer of polyvinyl alcohol on its aluminum-deposited surface and further a 0.2 µm-thick charge generation layer of the same composition as in Example 116.

Then, a solution of 5 parts of styryl compound of the following formula:

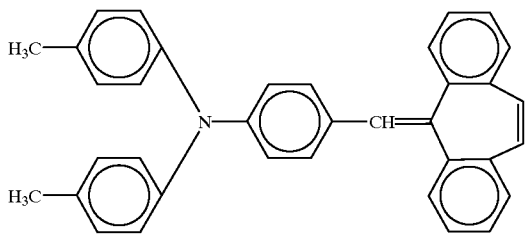

and 5 parts of polycarbonate resin ("Z-200" (trade name), mfd. by Mitsubishi Kagaku K.K.) in 40 parts of tetrahydrofuran was applied onto the charge generation layer and dried to form a 16 µm-thick charge transport layer, thereby providing an electrophotographic photosensitive member.

The thus-prepared photosensitive member was evaluated with respect to sensitivity and potential stability in the same manner as in Examples 107 and 118, whereby the following results were obtained.

$E_{1/2}$=0.60 µJ/cm$^2$
$\Delta Vd$=−5 volts
$\Delta V1$ =+10 volts

EXAMPLE 124

An aluminum vapor-deposited polyethylene terephthalate film was provided with a 0.5 µm-thick undercoating layer of polyvinyl alcohol on its aluminum-deposited surface and further a 0.2 µm-thick charge generation layer of the same composition as in Example 108.

Then, a solution of 5 parts of benzidine compound of the following formula:

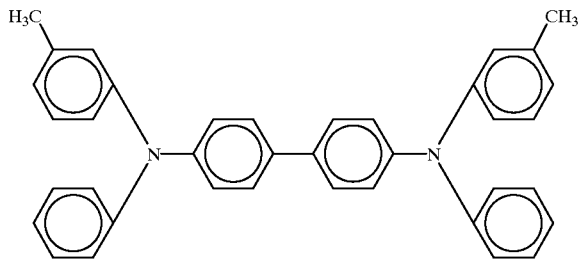

and 5 parts of polycarbonate resin ("Z-200" (trade name), mfd. by Mitsubishi Kagaku K.K.) in 40 parts of tetrahydrofuran was applied onto the charge generation layer and dried to form a 25 µm-thick charge transport layer, thereby providing an electrophotographic photosensitive member.

The thus-prepared photosensitive member was evaluated with respect to sensitivity and potential stability in the same manner as in Examples 107 and 118, whereby the following results were obtained.

$E_{1/2}$=0.40 µJ/cm$^2$
$\Delta Vd$=0 volt
$\Delta V1$=+15 volts

What is claimed is:
1. An electrophotographic photosensitive member, comprising a support, and a photosensitive layer formed on the support; said photosensitive layer containing iodogallium phthalocyanine having a crystal form selected from those characterized by X-ray diffraction patterns (a)–(e) shown below respectively obtained by a CuKα characteristic X-ray diffraction method:
   (a) having a strongest peak at a Bragg angle (2θ±0.2 deg.) of 9.6 deg. and free from another peak having an intensity of 30% or more of that of the strongest peak,
   (b) having a strongest peak and a second strongest peak at Bragg angles (2θ±0.2 deg.) of 9.4 deg. and 27.1 deg. wherein the second strongest peak has an intensity of at least 30% of that of the strongest peak,
   (c) having a strongest peak and a second strongest peak at Bragg angles (2θ±0.2 deg.) of 7.5 deg. and 27.7 deg.,
   (d) having a strongest peak and a second strongest peak at Bragg angles (2θ±0.2 deg.) of 7.5 deg. and 26.4 deg., and
   (e) having two peaks among a strongest peak, a second strongest peak and a third strongest peak at Bragg angles (2θ±0.2 deg.) of 8.8 deg. and 27.2 deg.

2. A photosensitive member according to claim 1, wherein the iodogallium phthalocyanine has a crystal form characterized by the X-ray diffraction pattern (a).

3. A photosensitive member according to claim 1, wherein the iodogallium phthalocyanine has a crystal form characterized by the X-ray diffraction pattern (b).

4. A photosensitive member according to claim 3, wherein the X-ray diffraction pattern (b) further shows strong peaks at Bragg angles (2θ±0.2 deg.) of 8.7 deg., 16.4 deg., 18.3 deg. and 19.5 deg.

5. A photosensitive member according to claim 1, wherein the iodogallium phthalocyanine has a crystal form characterized by the X-ray diffraction pattern (c).

6. A photosensitive member according to claim 5, wherein the X-ray diffraction pattern (c) further shows a strong peak at a Bragg angle (2θ±0.2 deg.) of 16.3 deg.

7. A photosensitive member according to claim 1, wherein the iodogallium phthalocyanine has a crystal form characterized by the X-ray diffraction pattern (d).

8. A photosensitive member according to claim 7, wherein the X-ray diffraction pattern (d) further shows a strong peak at a Bragg angle (2θ±0.2 deg.) of 16.3 deg.

9. A photosensitive member according to claim 1, wherein the iodogallium phthalocyanine has a crystal form characterized by the X-ray diffraction pattern (e).

10. A photosensitive member according to claim 9, wherein the X-ray diffraction pattern (e) further shows a strong peak at a Bragg angle (2θ±0.2 deg.) of 9.8 deg.

11. An electrophotographic photosensitive member, comprising a support, and a photosensitive layer formed on the support; said photosensitive layer containing bromogallium phthalocyanine having a crystal form selected from those represented by X-ray diffraction patterns (f)–(j) shown below respectively obtained by a CuKα characteristic X-ray diffraction method:
   (f) having a strongest peak at a Bragg angle (2θ±0.2 deg.) of 27.3 deg. and free from another peak having an intensity of 30% or more of that of the strongest peak,
   (g) having a strongest peak and a second strongest peak at Bragg angles (2θ±0.2 deg.) of 9.0 deg. and 27.1 deg., wherein the second strongest peak has an intensity of at least 30% of that of the strongest peak,
   (h) having a strongest peak and a second strongest peak at Bragg angles (2θ±0.2 deg.) of 7.4 deg. and 27.9 deg., (i) having a strongest peak and a second strongest peak at Bragg angles (2θ±0.2 deg.) of 7.5 deg. and 26.4 deg., and (j) having a strongest peak and a second strongest peak at Bragg angles (2θ±0.2 deg.) of 6.9 deg. and 26.7 deg.

12. A photosensitive member according to claim 11, wherein the bromogallium phthalocyanine has a crystal form characterized by the X-ray diffraction pattern (f).

13. A photosensitive member according to claim 11, wherein the bromogallium phthalocyanine has a crystal form characterized by the X-ray diffraction pattern (g).

14. A photosensitive member according to claim 13, wherein the X-ray diffraction pattern (g) further shows strong peaks at Bragg angles (2θ±0.2 deg.) of 9.7 deg., 18.2 deg. and 21.0 deg.

15. A photosensitive member according to claim 11, wherein the bromogallium phthalocyanine has a crystal form characterized by the X-ray diffraction pattern (h).

16. A photosensitive member according to claim 15, wherein the X-ray diffraction pattern (h) further shows a strong peak at a Bragg angle (2θ±0.2 deg.) of 16.2 deg.

17. A photosensitive member according to claim 11, wherein the bromogallium phthalocyanine has a crystal form characterized by the X-ray diffraction pattern (i).

18. A photosensitive member according to claim 17, wherein the X-ray diffraction pattern (i) further shows strong peaks at Bragg angles (2θ±0.2 deg.) of 16.3 deg and 24.9 deg.

19. A photosensitive member according to claim 11, wherein the bromogallium phthalocyanine has a crystal form characterized by the X-ray diffraction pattern (j).

20. A photosensitive member according to claim 19, wherein the X-ray diffraction pattern (j) further shows strong peaks at Bragg angles (2θ±0.2 deg.) of 13.6 deg. and 16.6 deg.

21. An electrophotographic photosensitive member comprising a support and a photosensitive layer formed on the support, said photosensitive layer containing zirconium phthalocyanine having a crystal from represented by an X-ray diffraction pattern having a strongest peak at a Bragg angle (2θ±0.2 deg.) in a range of 7.0–9.0 deg. as measured by a CuKα characteristic X-ray diffraction method.

22. An electrophotographic photosensitive member according to claim 21, wherein the strongest peak is at a Bragg angle (2θ±0.2 deg.) of 8.0 deg.

23. An electrophotographic photosensitive member according to claim 21 or 22, wherein the X-ray diffraction pattern further shows a strong peak at a Bragg angle (2θ±2.0 deg.) of 25.5 deg.

\* \* \* \* \*

UNITED STATES PATENT AND TRADEMARK OFFICE
CERTIFICATE OF CORRECTION

PATENT NO. : 6,245,472 B1
DATED : June 12, 2001
INVENTOR(S) : Masato Tanaka

It is certified that error appears in the above-identified patent and that said Letters Patent is hereby corrected as shown below:

<u>Column 3,</u>
Line 50, "($29\theta \pm 0.2$ deg.)" should read -- ($2\theta \pm 0.2$ deg.) --.

<u>Column 4,</u>
Line 17, "$m_1$, p," should read -- $m_1$, $p_1$, --;
Line 24, "process," should read -- processes, --; and
Line 35, "referred" should read -- referred to --.

<u>Column 5,</u>
Line 7, "referred" should read -- referred to --.

<u>Column 7,</u>
Line 1, "referred" should read -- referred to --.

<u>Column 10,</u>
Lines 6 and 22, "case" should read -- a case --; and
Line 7, "such s" should read -- such as --.

<u>Column 19,</u>
Line 2, "washing-with" should read -- washing with --; and
Line 48, "24.hours" should read -- 24 hours --.

<u>Column 20,</u>
Line 30, "1 m-dia." should read -- 1 mm-dia. --.

<u>Column 21,</u>
Line 30, "1 m-dia." should read -- 1 mm-dia. --; and
Line 62, "an" should read -- and --.

<u>Column 22,</u>
Line 13, "1 mi-dia." should read -- 1 mm-dia. --;
Line 15, "an" should read -- and --;
Line 25, "an" should read -- and --; and
Line 52, "1mm-dia." should read -- 1 mm-dia. --.

UNITED STATES PATENT AND TRADEMARK OFFICE
CERTIFICATE OF CORRECTION

PATENT NO. : 6,245,472 B1
DATED : June 12, 2001
INVENTOR(S) : Masato Tanaka

It is certified that error appears in the above-identified patent and that said Letters Patent is hereby corrected as shown below:

Column 27,
Line 11, "1 in-dia." should read -- 1 mm-dia. --; and
Line 48, "1 m-dia." should read -- 1 mm-dia. --.

Column 34,
Line 12, "from" should read -- form --.

Signed and Sealed this

Twenty-fifth Day of June, 2002

Attest:

JAMES E. ROGAN
Attesting Officer    Director of the United States Patent and Trademark Office